US012639316B2

(12) United States Patent
Hamid et al.

(10) Patent No.: US 12,639,316 B2
(45) Date of Patent: *May 26, 2026

(54) GENERATIVE CONTENT SERVICE WITH MULTI-PATH CONTENT PIPELINE

(71) Applicant: Atlassian Pty Ltd., Sydney (AU)

(72) Inventors: Shihab Hamid, Sydney (AU); Akshar Prasad, Bengaluru (IN); Shashank Prasad Rao, Bengaluru (IN); Phil Oye, Sydney (AU); Rahul Singh, Gurugram (IN)

(73) Assignee: ATLASSIAN PTY LTD., Sydney (AU)

( * ) Notice: Subject to any disclaimer, the term of this patent is extended or adjusted under 35 U.S.C. 154(b) by 148 days.

This patent is subject to a terminal disclaimer.

(21) Appl. No.: 18/622,787

(22) Filed: Mar. 29, 2024

(65) Prior Publication Data

US 2025/0217371 A1     Jul. 3, 2025

Related U.S. Application Data

(63) Continuation-in-part of application No. 18/399,541, filed on Dec. 28, 2023.

(51) Int. Cl.
G06F 16/2457     (2019.01)
G06F 9/451     (2018.01)
(Continued)

(52) U.S. Cl.
CPC ........ G06F 16/24578 (2019.01); G06F 9/451 (2018.02); G06F 16/243 (2019.01);
(Continued)

(58) Field of Classification Search
CPC ...... G06F 9/451; G06F 16/243; G06F 16/248; G06F 16/24578; G06F 40/174; G06F 40/30
See application file for complete search history.

(56) References Cited

U.S. PATENT DOCUMENTS

2016/0188292 A1* 6/2016 Carter .................. G10L 15/197
                                                              704/257
2020/0034379 A1* 1/2020 Kikuchi ................ G06F 16/338
                          (Continued)

FOREIGN PATENT DOCUMENTS

WO     WO2023/242540     12/2023

*Primary Examiner* — Seth A Silverman
(74) *Attorney, Agent, or Firm* — Brownstein Hyatt Farber Schreck, LLP

(57)     ABSTRACT

Embodiments described herein relate to systems and methods for automatically generating content for a generative content interface of a collaboration platform. The system may perform an intent analysis on a natural language user input to the generative content interface to determine an intent confidence score with respect to each of a set of request classifiers, the set of request classifiers comprising a first request classifier associated with a request for an action, a second request classifier associated with a request for information, and a third request classifier associated with a request for a contact. Based on the intent confidence scores of the request classifiers, the system may select a content store in which to search for content to satisfy a user's query.

20 Claims, 24 Drawing Sheets

(51) Int. Cl.
    *G06F 16/242*        (2019.01)
    *G06F 16/248*        (2019.01)
    *G06F 40/174*        (2020.01)
    *G06F 40/30*         (2020.01)

(52) U.S. Cl.
    CPC .......... *G06F 16/248* (2019.01); *G06F 40/174*
                   (2020.01); *G06F 40/30* (2020.01)

(56)            References Cited

U.S. PATENT DOCUMENTS

| | | | |
|---|---|---|---|
| 2023/0021797 A1 | 1/2023 | Gupta et al. | |
| 2023/0215425 A1* | 7/2023 | Sarikaya ............. | G06F 16/3329 |
| | | | 704/275 |
| 2025/0005263 A1* | 1/2025 | Mansour .............. | G06F 40/134 |

* cited by examiner

200

202 — SEARCH PORTAL

210

INTAKE SERVICE

CHAT SERVICE — 204

225 — PERSISTENCE MODULE

QUERY ANALYSIS SERVICE — 212

220

GENERATIVE CONTENT SERVICE

213 — INTENT ANALYSIS SERVICE

CONTENT SERVICE

PROMPT SERVICE

ANALYSIS MODULE A — 252

214 — CONTENT CREATION SERVICE

226

228

ANALYSIS MODULE B — 252

{ }

{ }

{ }

CONTENT STORE 1

CONTENT STORE 2

CONTENT STORE 3

232

230

240  242

250  252

260 — PROMPT MANAGEMENT SERVICE

270 — GENERATIVE OUPUT SERVICE

400a

PROMPT CONSTRUCTION ~402

GENERATIVE OUTPUT ENGINE(S) ~404

GENERATIVE OUTPUT ROUTER ~406

408

API REQUEST HANDLER

410

FRONTEND UI CONTROLLER

500

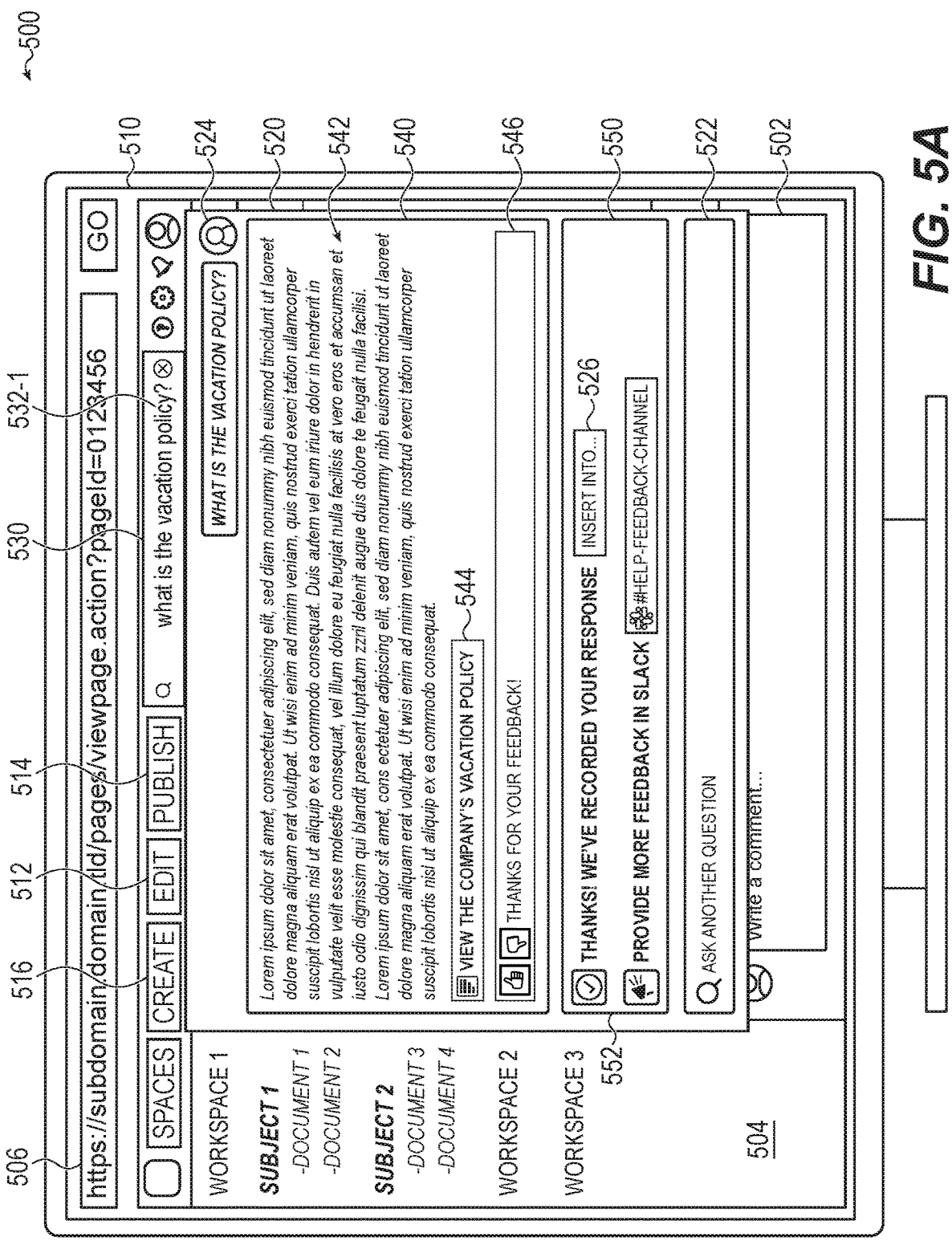

510

524

520

542

540

546

550

522

502

532-1

530

514

512

516

506 https://subdomain.domain/tld/pages/viewpage.action?pageId=0123456    GO

SPACES  CREATE  EDIT  PUBLISH    Q  what is the vacation policy?    ⊘ ⊗ ♥ ⊗

WORKSPACE 1

WHAT IS THE VACATION POLICY? ⊗ ⊗

*Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi.*

SUBJECT 1
-DOCUMENT 1
-DOCUMENT 2

*Lorem ipsum dolor sit amet, cons ectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.*

SUBJECT 2
-DOCUMENT 3
-DOCUMENT 4

📊 VIEW THE COMPANY'S VACATION POLICY    544

👍 THANKS FOR YOUR FEEDBACK!

WORKSPACE 2

🕐 THANKS! WE'VE RECORDED YOUR RESPONSE    INSERT INTO...    526

✋ PROVIDE MORE FEEDBACK IN SLACK    #HELP-FEEDBACK-CHANNEL

WORKSPACE 3

552

Q ASK ANOTHER QUESTION

504

⊗    Write a comment...

GENERATIVE CONTENT SERVICE WITH MULTI-PATH CONTENT PIPELINE

CROSS-REFERENCE TO RELATED APPLICATION(S)

This application is a continuation-in-part patent application of U.S. patent application Ser. No. 18/399,541, filed Dec. 28, 2023 and titled "Generative Interface for Multi-Platform Content," the disclosure of which is hereby incorporated herein by reference in its entirety.

TECHNICAL FIELD

Embodiments described herein relate to multitenant services of collaborative work environments and, in particular, to systems and methods for operating a generative content service that produces generative content based on multi-platform content resources.

BACKGROUND

An organization can establish a collaborative work environment by self-hosting, or providing its employees with access to, a suite of discrete software platforms or services to facilitate cooperation and completion of work. In some collaborative work environments, a large amount of user-generated content may be created across multiple platforms. It can be difficult to locate relevant content and even more difficult to synthesize answers to user search queries in an efficient an accurate manner. The systems and techniques described herein may be used to identify and extract relevant content from multiple platforms and present generative and curated results to a user in a generative content interface.

SUMMARY

Embodiments described herein relate to systems and methods for automatically generating content for a generative content interface of a collaboration platform. The system may perform an intent analysis on a natural language user input to the generative content interface to determine an intent confidence score with respect to each of a set of request classifiers, the set of request classifiers comprising a first request classifier associated with a request for an action, a second request classifier associated with a request for information, and a third request classifier associated with a request for a contact. Based on the intent confidence scores of the request classifiers, the system may select a content store in which to search for content to satisfy a user's query.

A computer-implemented method for providing a generative response to a user may include causing display of a graphical user interface of a frontend application of a content collaboration platform on a client device, the graphical user interface including a generative content interface. The method may further include, in response to a natural language user input provided to a generative content interface, performing a query analysis on the natural language user input to obtain a search feature set, and performing an intent analysis on the natural language user input to determine an intent confidence score with respect to each of a set of request classifiers, the set of request classifiers including a first request classifier associated with a request for an action, a second request classifier associated with a request for information, and a third request classifier associated with a request for a contact. The method may further include, in response to a natural language user input provided to a generative content interface, in accordance with a determination that a first intent confidence score associated with the first request classifier satisfies an intent confidence condition, performing a first search of an issue tracking platform content store using the search feature set, including performing a search of a set of predefined forms and performing a search of a set of issue records, wherein respective issue records in the set of issue records are associated with respective predefined forms of the set of predefined forms, and causing a first response to be presented, in the generative content interface, the first response including content associated with a result from the first search. The method may further include, in response to a natural language user input provided to a generative content interface and in accordance with a determination that no respective intent confidence score satisfies the intent confidence condition, performing a second search of the issue tracking platform content store using the search feature set, performing a third search of a knowledge base content store using the search feature set, performing a fourth search of a user contact content store using the search feature set, and causing a second response to be presented, in the generative content interface, the second response including content associated with at least one result from the second search, the third search, or the fourth search.

Performing the search of the set of predefined forms may include searching the set of predefined forms, using the search feature set, to identify a first set of candidate predefined forms, performing the search of the set of issue records includes searching the set of issue records, using the search feature set, to identify a set of candidate issue records, and identifying, in an issue record of the set of candidate issue records, an identifier of a second set of candidate predefined forms. The method may further include receiving, from a response confidence analysis model, a ranking of at least a subset of the first set of candidate predefined forms and at least a subset of the second set of candidate predefined forms, and the content associated with the first result includes content associated with a highest ranking candidate predefined form.

The natural-language user input may be provided by a user, the result from the first search may include an identifier of a predefined form of the set of predefined forms, the predefined form may define a user-fillable data structure having a set of input fields, and the method may further include retrieving user data associated with the user, and populating an input field of the set of input fields of the predefined form with the user data. The user data may be first user data, the input field may be a first input field, and the first response further includes a prompt requesting second user data from the user, the second user data corresponding to a second input field of the set of input fields of the predefined form, and the method may further include receiving, in the generative content interface, second user data from the user, and populating a second input field of the set of input fields of the predefined form with the second user data. The method may further include, in response to a determination that the predefined form has been populated, automatically creating an issue record, in the issue tracking platform, that includes the predefined form.

The method may further include providing, as input to a response confidence analysis model that is configured to predict a responsiveness of results from the first search, the second search, and the third search to the natural language input, results from the second search, results from the third search, and results from the fourth search. The method may further include receiving, from the response confidence analysis model, a ranking of at least a subset of the results from the second search, the third search, and the fourth search, and causing a response to be presented, in the generative content interface, the response including content associated with a highest ranking search result.

The result from the first search may include an identifier of a predefined form of the set of predefined forms, and the first response includes a summary of the predefined form, and a link to the predefined form.

A computer-implemented method for providing a generative response using content selected from a set of candidate content stores may include causing display of a graphical user interface of a frontend application of a content collaboration platform on a client device, the graphical user interface including a generative content interface, in response to a natural language user input provided to a generative content interface performing a query analysis on the natural language user input to obtain a search feature set, and performing an intent analysis on the natural language user input to determine an intent confidence score with respect to each of a set of request classifiers, the set of request classifiers including a first request classifier associated with a request for an action, a second request classifier associated with a request for information, and a third request classifier associated with a request for a contact. The method may further include, in accordance with a determination that a first intent confidence score associated with the first request classifier satisfies an intent confidence condition, performing a first search of an issue tracking platform content store using the search feature set, performing the first search including performing a search of a set of predefined forms and performing a search of a set of issue records, wherein respective issue records in the set of issue records are associated with respective predefined forms of the set of predefined forms, in accordance with a determination that a result of the first search satisfies a result confidence condition, causing a first response to be presented in the generative content interface, the first response including content from the issue tracking platform content store, in accordance with a determination that the result of the first search fails to satisfy the result confidence condition performing a second search of a knowledge base content store using the search feature set, performing a third search of a user contact content store using the search feature set, and causing a second response to be presented in the generative content interface, the second response including content from at least one of the knowledge base content store or the user contact content store.

The natural-language user input may be provided by a user, the result from the first search may include an identifier of a predefined form of the set of predefined forms, the predefined form may define a user-fillable data structure having a set of input fields, and the method may further include retrieving user data associated with the user, and populating an input field of the set of input fields of the predefined form with the user data. The user data may be first user data, the input field may be a first input field, and the first response may further include a prompt requesting second user data from the user, the second user data corresponding to a second input field of the set of input fields of the predefined form. The method may further include receiving, in the generative content interface, second user data from the user, and populating a second input field of the set of input fields of the predefined form with the second user data.

The feature set may be a keyword feature set including a set of keywords extracted from the natural language user input, the query analysis may be a first query analysis, the method may further include performing a second query analysis on the natural language user input to obtain a semantic feature set, and performing the first search further includes searching the issue tracking platform content store using the second feature set.

The result from the first search may include an identifier of a predefined form of the set of predefined forms, and the first response includes a summary of the predefined form, and a link to the predefined form.

A computer-implemented method for providing a generative response using content selected from a set of candidate content stores may include causing display of a graphical user interface of a frontend application of a content collaboration platform on a client device, in response to a natural language user input provided to a generative content interface, performing a query analysis on the natural language user input to obtain a search feature set, performing an intent analysis on the natural language user input to determine an intent confidence score with respect to each of a set of request classifiers, the set of request classifiers including a first request classifier associated with a request for an action, a second request classifier associated with a request for information, and a third request classifier associated with a request for a contact, performing a first search of an issue tracking platform content store, using the search feature set, to identify a candidate form, performing a second search of the knowledge base content store, using the search feature set, to identify a candidate knowledge base document, performing a third search of the user contact content store, using the search feature set, to identify a candidate user contact, and providing, as input to a response confidence analysis model that is configured to predict a responsiveness of results from the first search, the second search, and the third search to the natural language input results from the first search and a first intent confidence score associated with the first request classifier, results from the second search and a second intent confidence score associated with the second request classifier, and results from the third search and a third intent confidence score associated with the third request classifier. The method may further include receiving, from the response confidence analysis model, a ranking of at least a subset of the results from the first search, the second search, and the third search, the ranking based at least in part the first, second, and third intent confidence scores, and causing a response to be presented, in the generative content interface, the response including content associated with a highest ranking search result.

Performing the first search of the issue tracking platform content store may include performing a search of a set of predefined forms, using the search feature set, to identify a first set of candidate predefined forms, performing a search of a set of issue records, using the search feature set, to identify a set of candidate issue records, and identifying, in an issue record of the set of candidate issue records, an identifier of a second set of candidate predefined forms. The method may further include receiving, from a response confidence analysis model, a ranking of at least a subset of the first set of candidate predefined forms and at least a subset of the second set of candidate predefined forms, and the content associated with the highest ranking search result includes content associated with a highest ranking candidate predefined form.

The natural-language user input may be provided by a user, the results from the first search may include an identifier of a predefined form of the set of predefined forms, the predefined form may define a user-fillable data structure having a set of input fields, and the method may further include retrieving user data associated with the user, and populating an input field of the set of input fields of the predefined form with the user data.

A computer-implemented method for providing, in response to a user query, a generative response including an identifier of a predefined form, the predefined form having a user-fillable data structure, includes: causing display of a graphical user interface of a frontend application of a content collaboration platform on a client device, in response to a natural language user input provided to a generative content interface: analyzing the natural language user input to obtain a search feature set, using the search feature set, searching a first content store of an issue tracking platform to identify a set of predefined forms responsive to the natural language user input, each predefined form of the set of predefined forms including a respective user-fillable data structure, in response to a determination that a highest search confidence score associated with the set of predefined forms satisfies a confidence criteria, causing a first response to be provided in the generative content interface, the first response including an identifier of a first predefined form of the set of predefined forms associated with the highest search confidence score, and in response to a determination that a highest search confidence score associated with the set of predefined forms fails to satisfy the confidence criteria: using the search feature set, searching a second content store of the issue tracking platform to identify an issue record related to the search feature set, identifying, in the issue record, an identifier of a second predefined form that was used in the completion of an issue associated with the issue record and that is responsive to the natural language user input, and causing a second response to be provided in the generative content interface, the second response including an identifier of the second predefined form.

The issue record may include a user-generated description of the issue associated with the issue record, and searching the second content store to identify the issue record related to the search feature set may include searching, with the search feature set, the user-generated description of the issue associated with the issue record. Searching the second content store to identify the issue record related to the search feature set may include performing a search of issue records associated with a completed issue status.

The natural-language user input may be provided by a user, and the method may further include retrieving user data associated with the user, populating a first input field of the first predefined form with the user data, prompting the user for second user data, receiving, in the generative content interface, the second user data, populating a second input field of the first predefined form with the second user data, and in response to a determination that the first predefined form has been populated, automatically creating a new issue record, in the issue tracking platform, that includes the first predefined form.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

6

Figure 1:
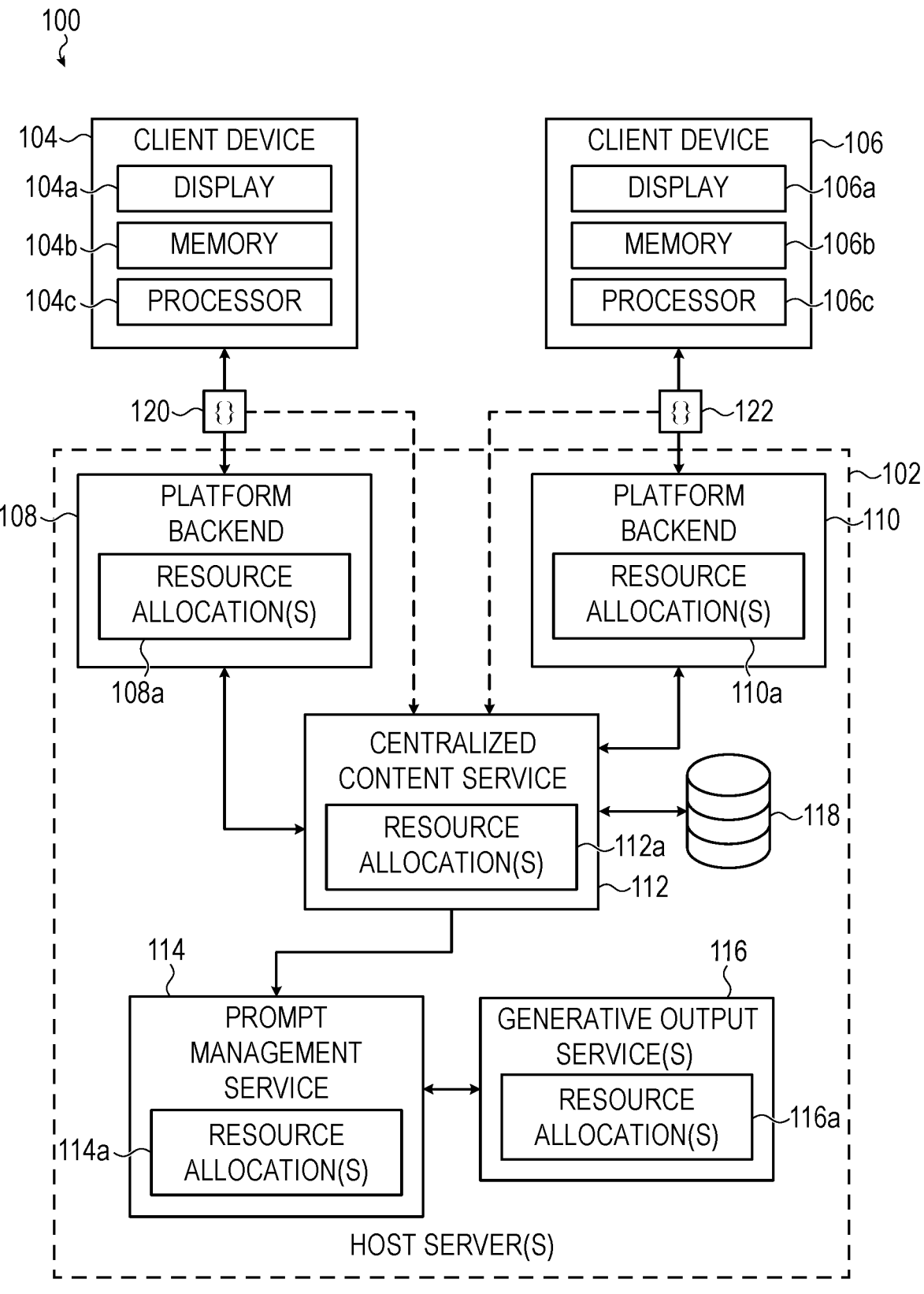

FIG. 1 depicts a simplified diagram of a system, such as described herein that can include and/or may receive input from a generative output service.

Figure 2A:

FIG. 2A depicts an example system for providing a generative answer interface for a content collaboration platform.

Figure 2B:
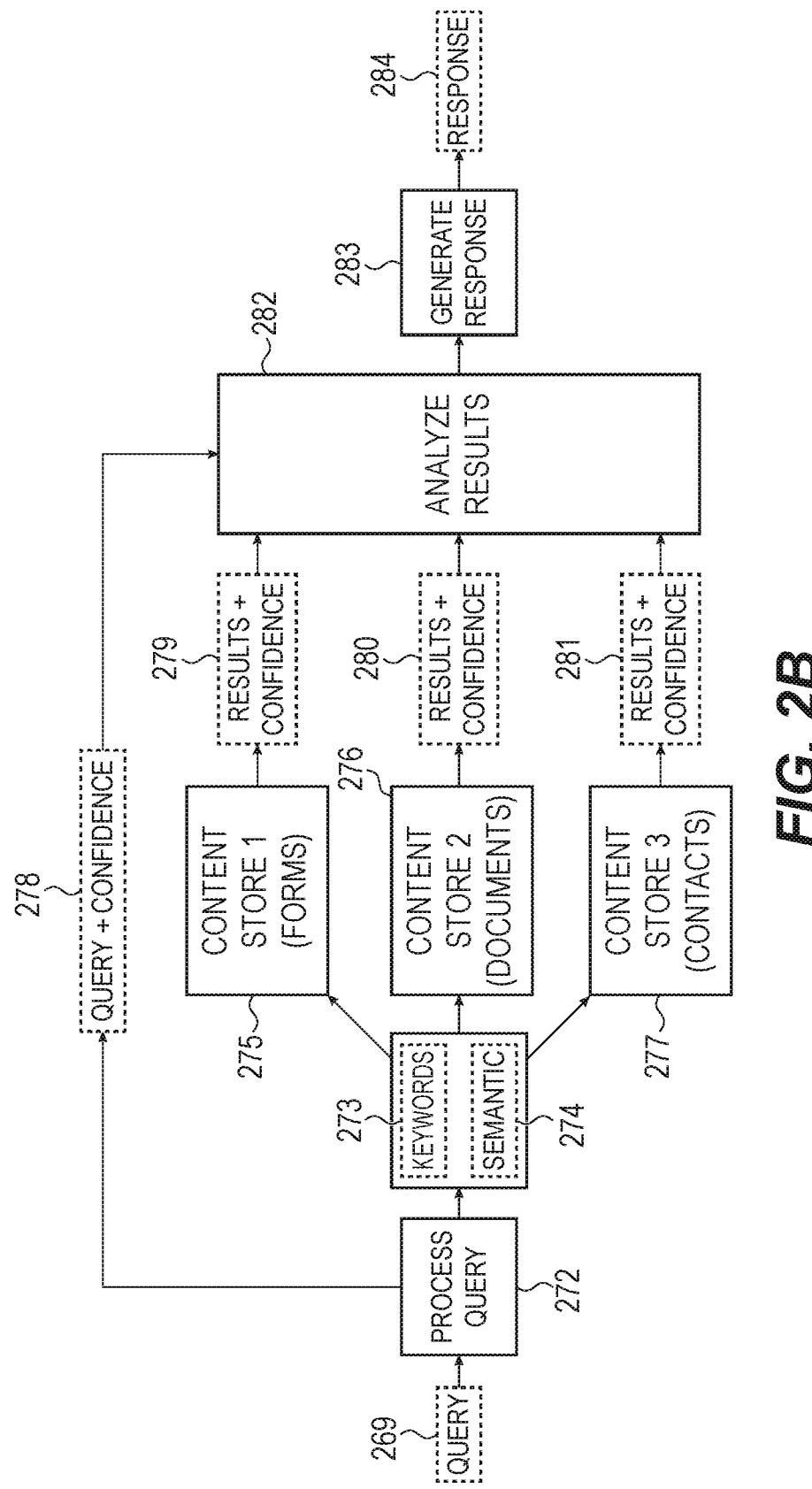
Figure 2C:
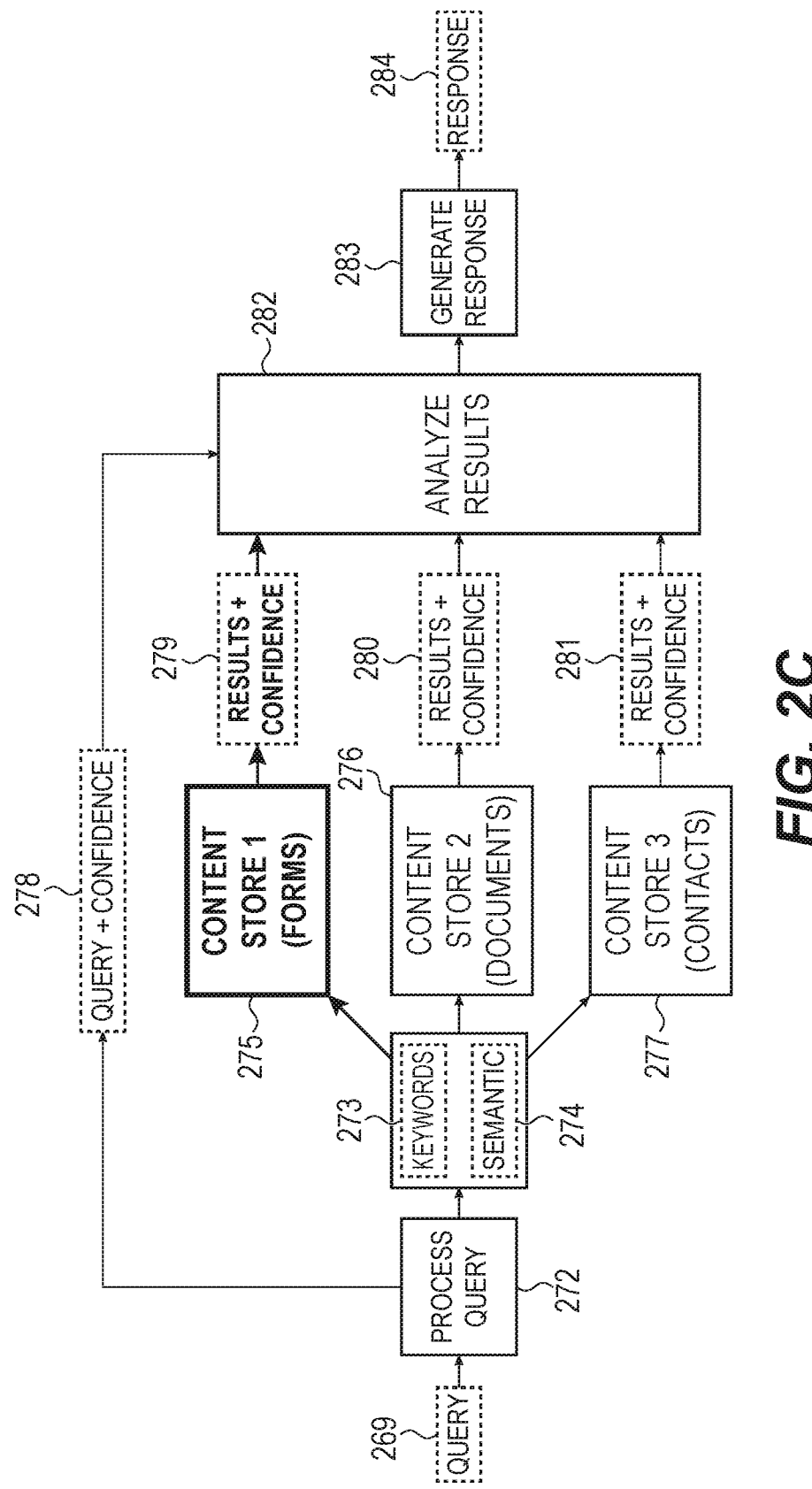
Figure 2D:
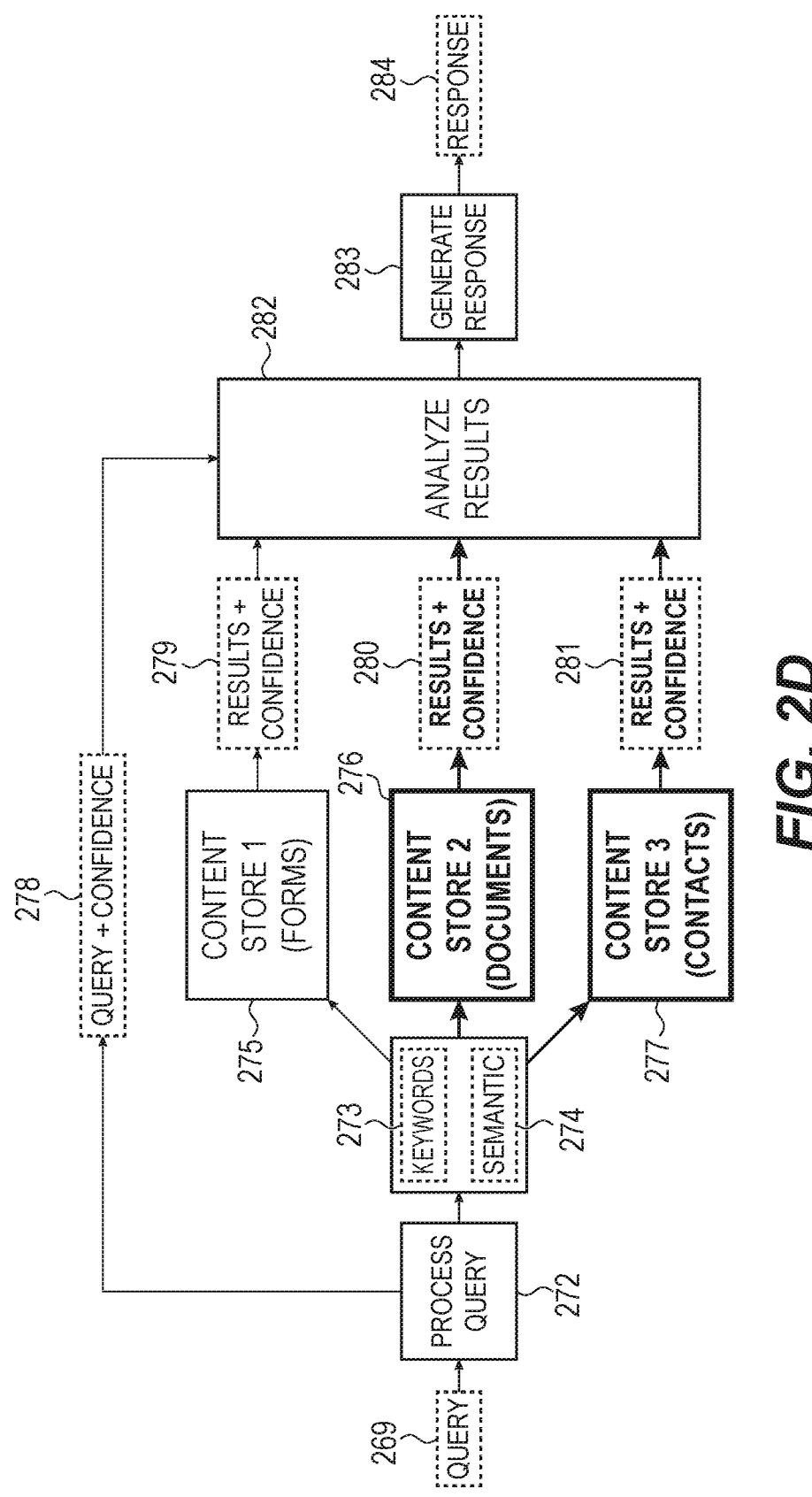

FIGS. 2B-2D depict example processing operations for identifying content, in a content collaboration platform, that is relevant to a user's query.

Figure 2E:
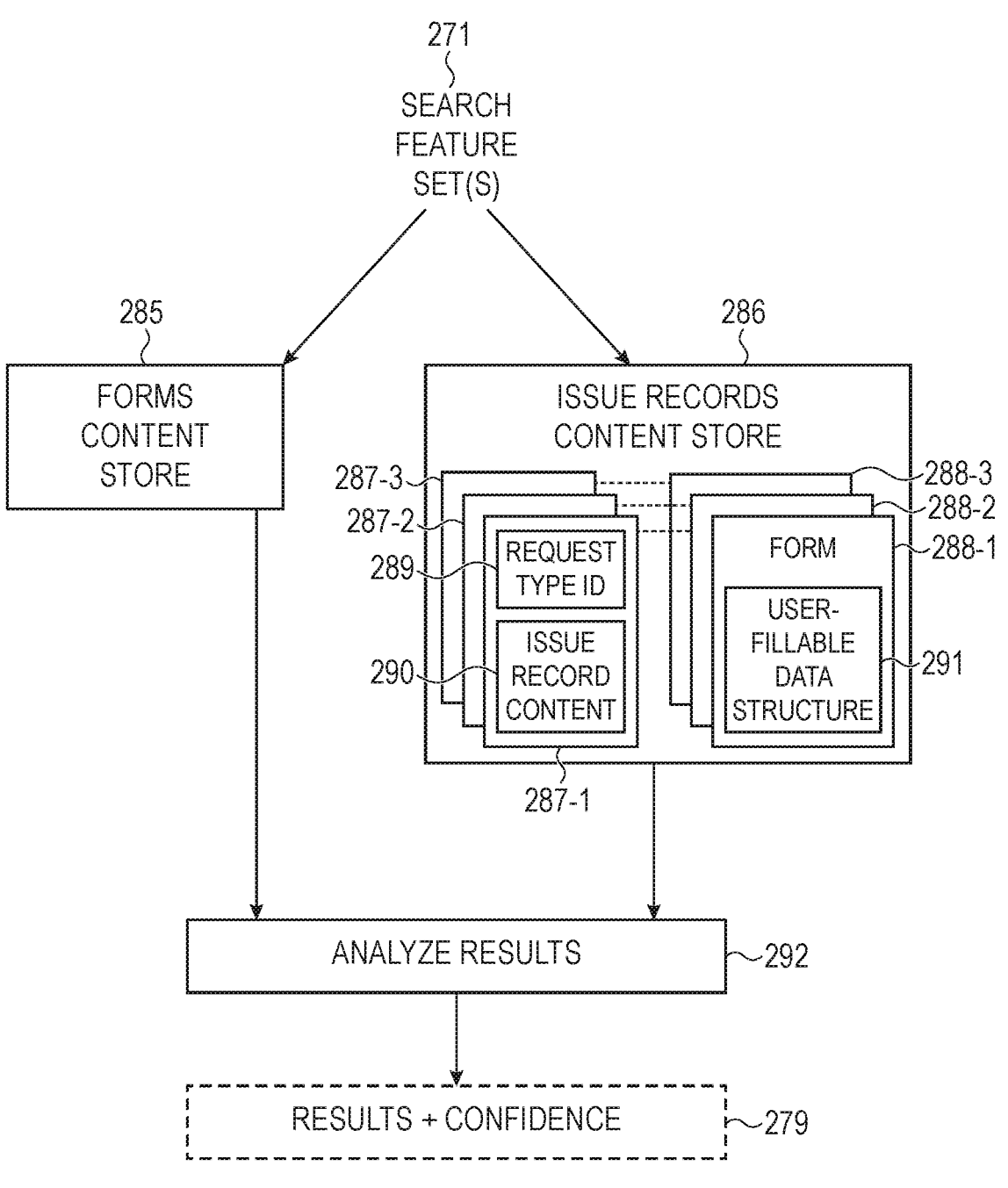

FIG. 2E depicts an example processing operation for identifying forms, in an issue tracking platform, that are relevant to a user's query.

Figure 3A:
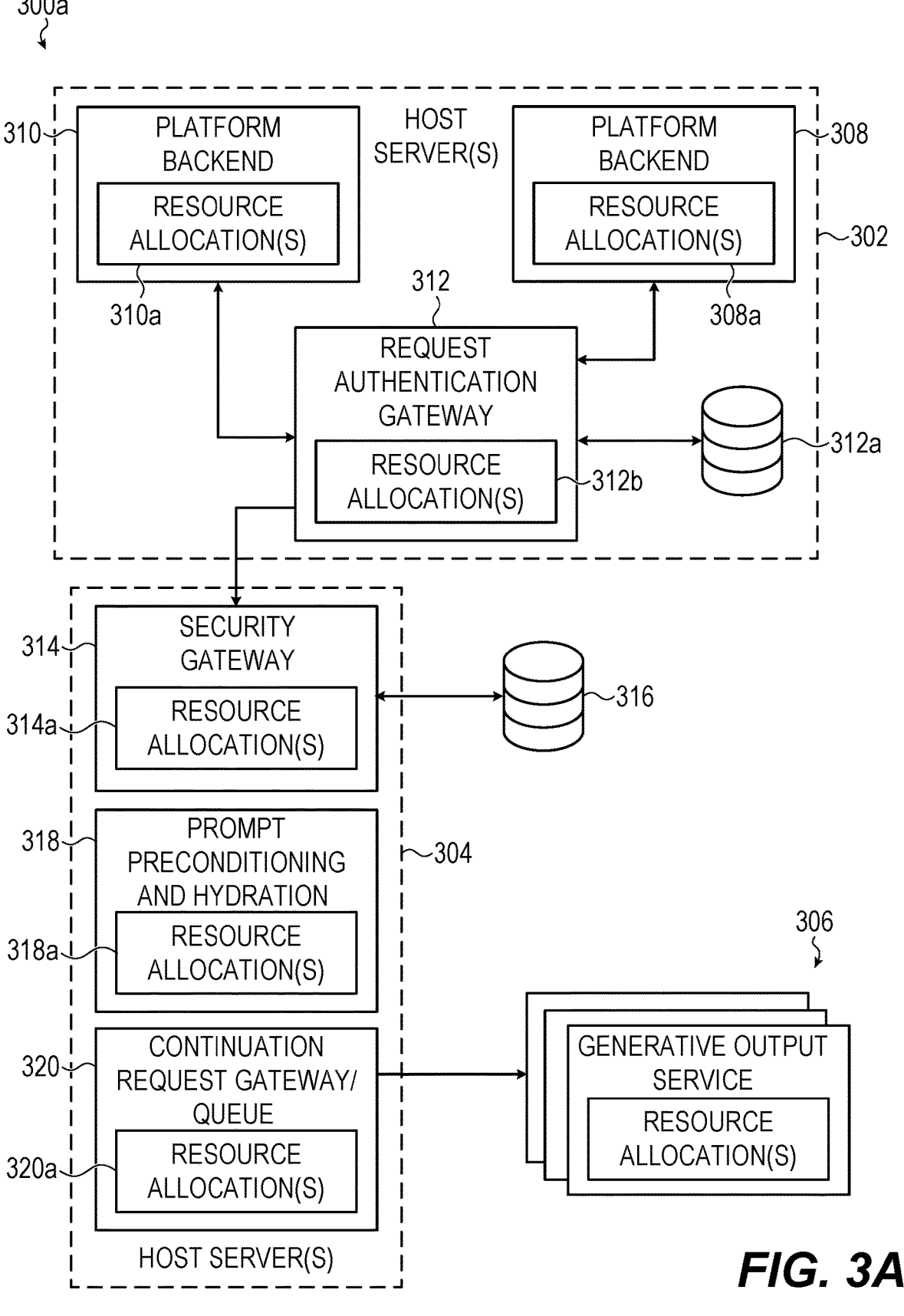

FIG. 3A depicts a simplified diagram of a system, such as described herein that can include and/or may receive input from a generative output service.

Figure 3B:
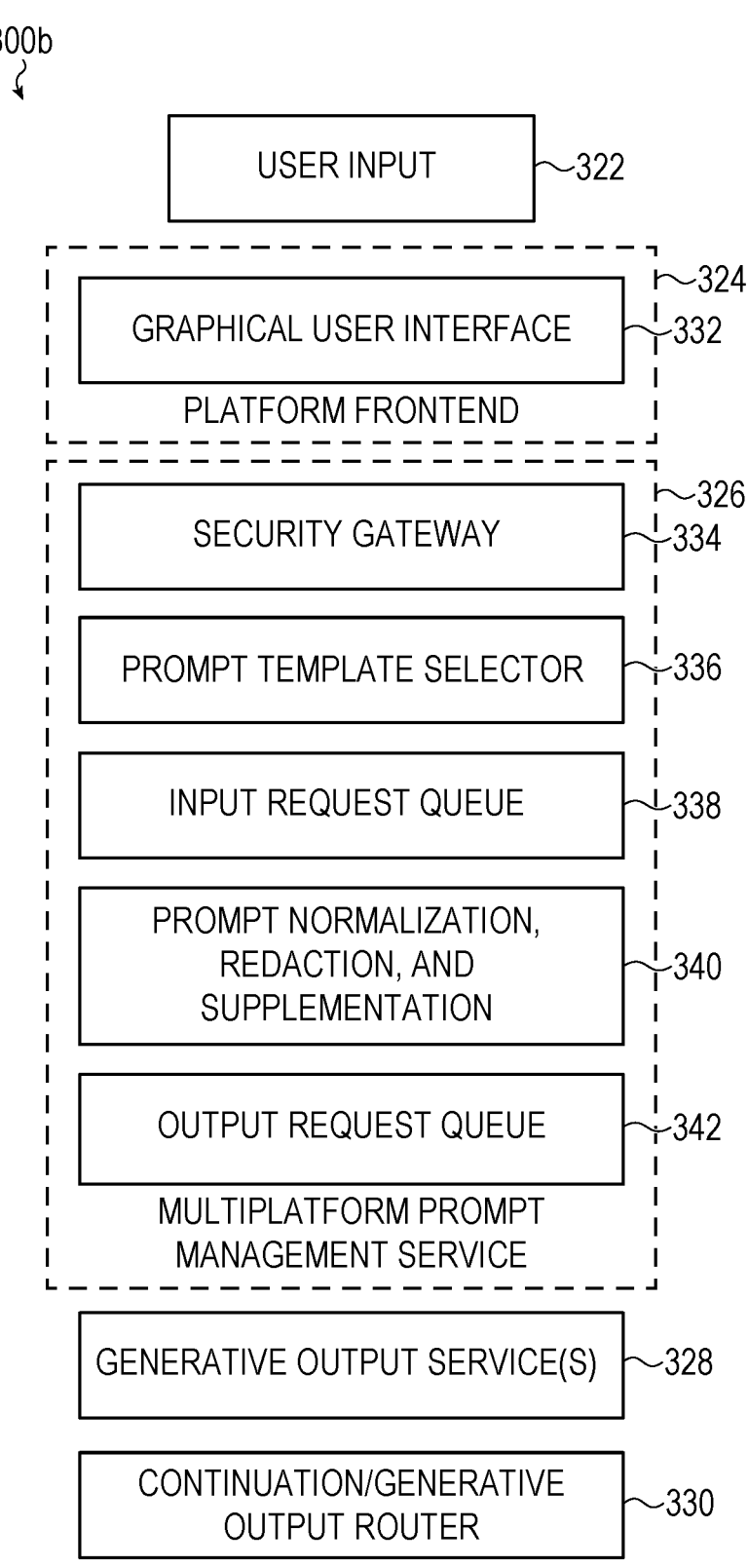

FIG. 3B depicts a functional system diagram of a system that can be used to implement a multiplatform prompt management service.

Figure 4A:
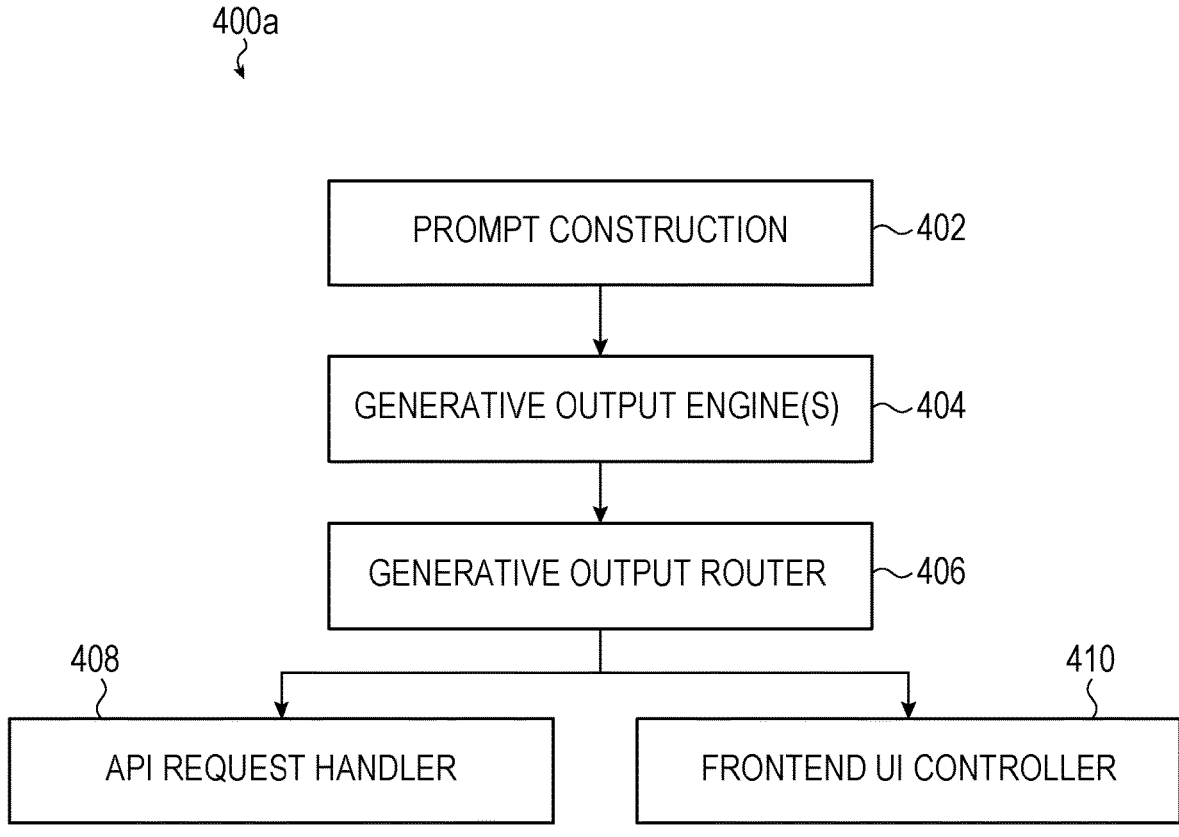

FIG. 4A depicts a simplified system diagram and data processing pipeline.

Figure 4B:
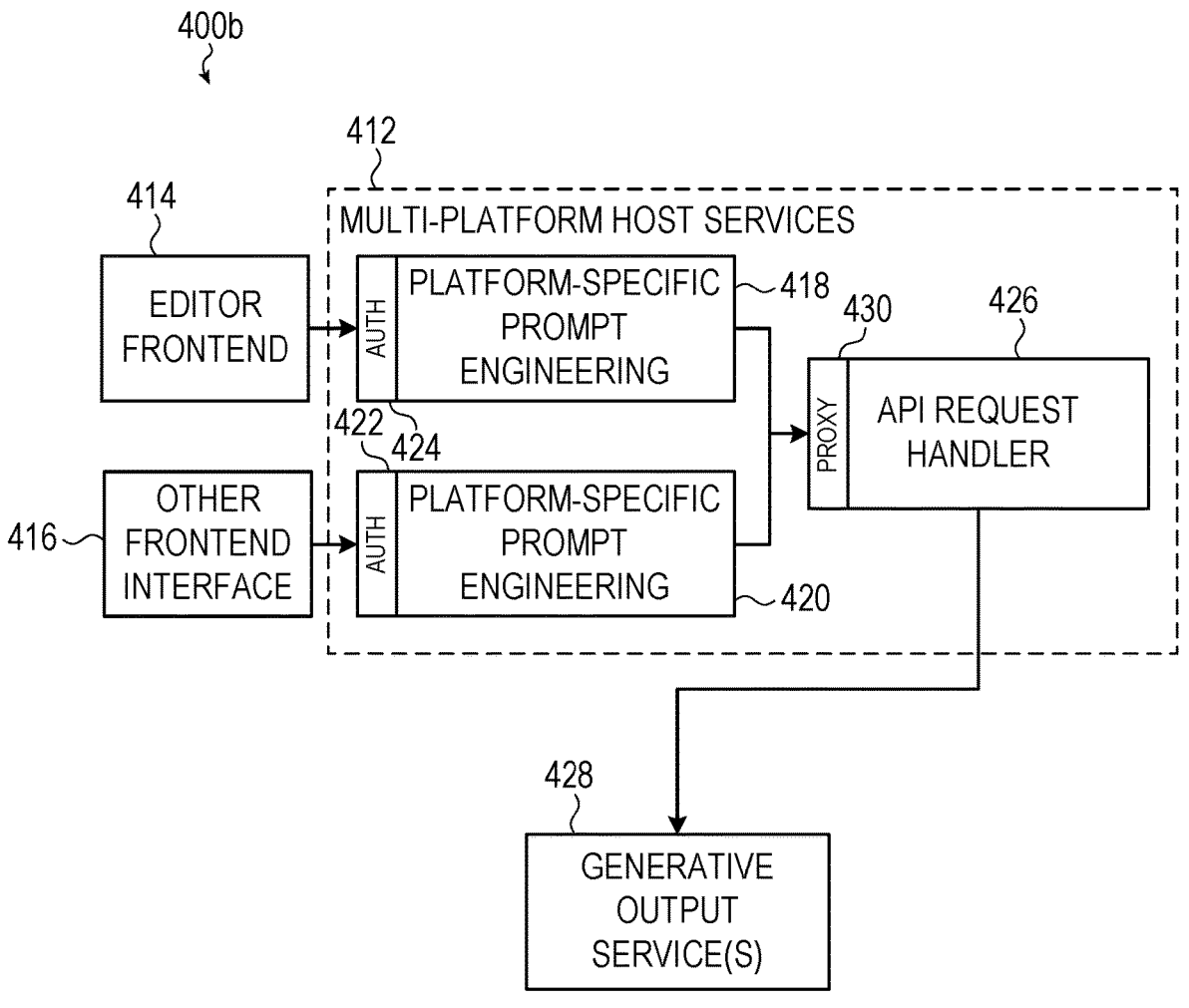

FIG. 4B depicts a system providing multiplatform prompt management as a service.

FIGS. 5A-5F depict example graphical user interfaces of a content collaboration platform having a generative answer interface.

Figure 6A:
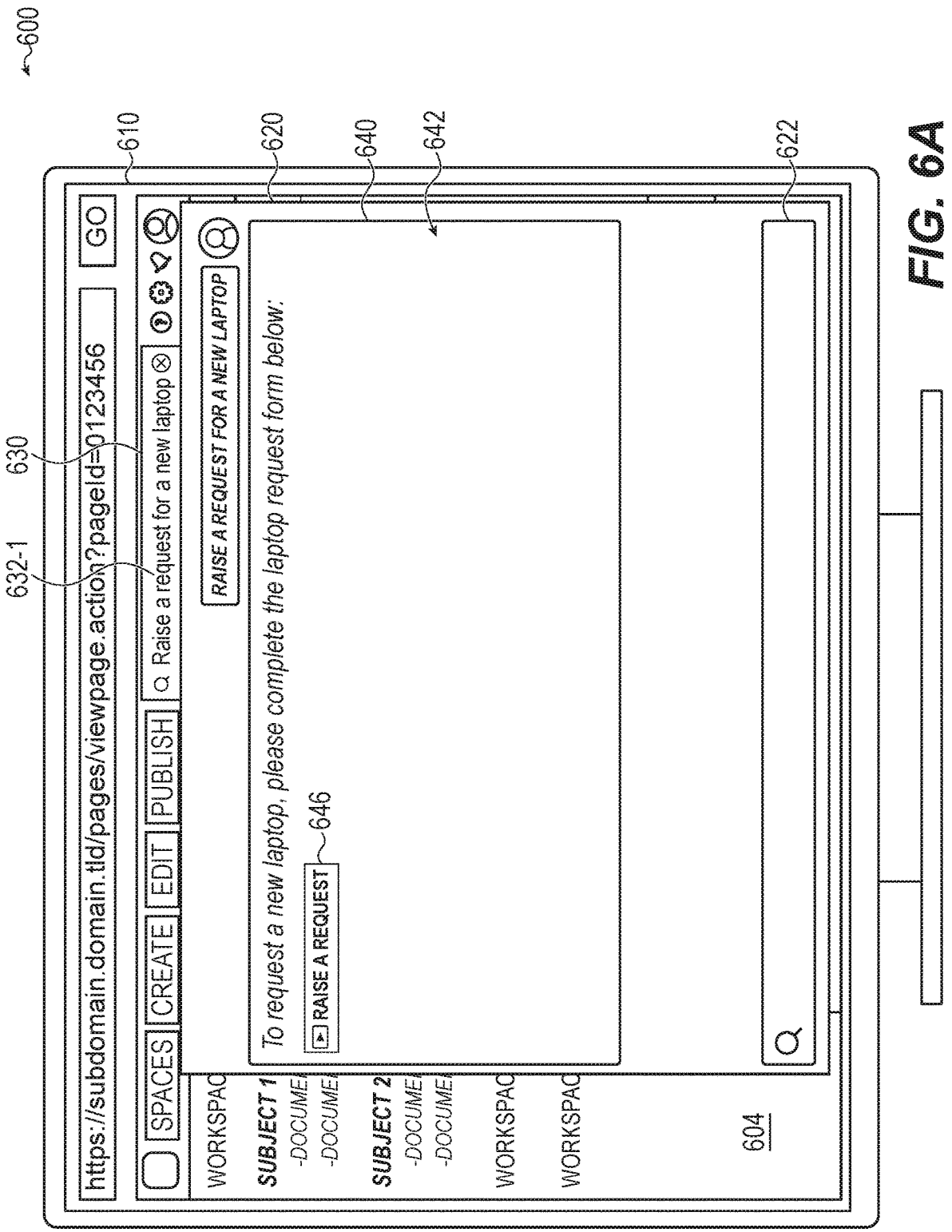
Figure 6B:
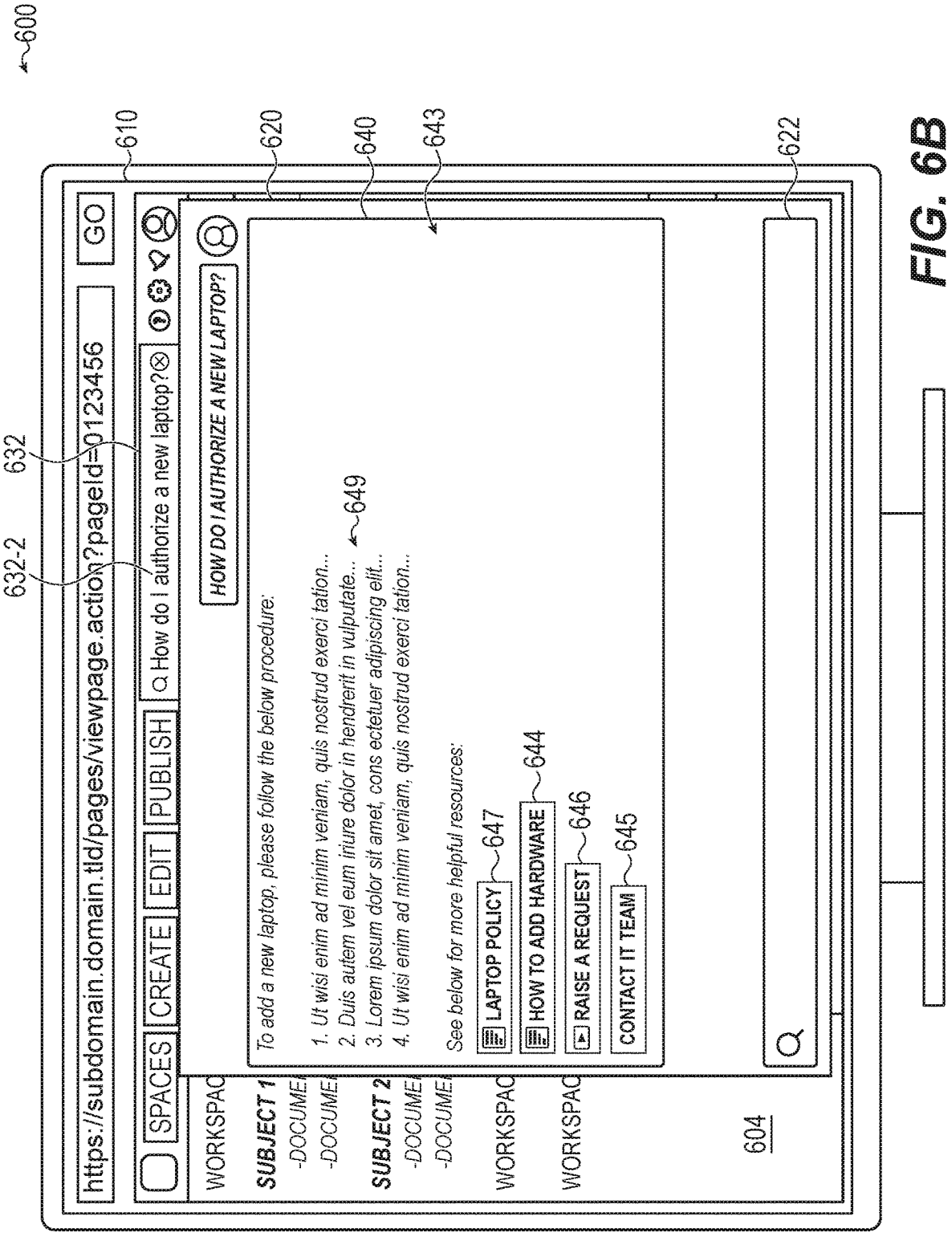

FIGS. 6A-6B depict example graphical user interfaces of a content collaboration platform having a generative answer interface.

Figure 7:
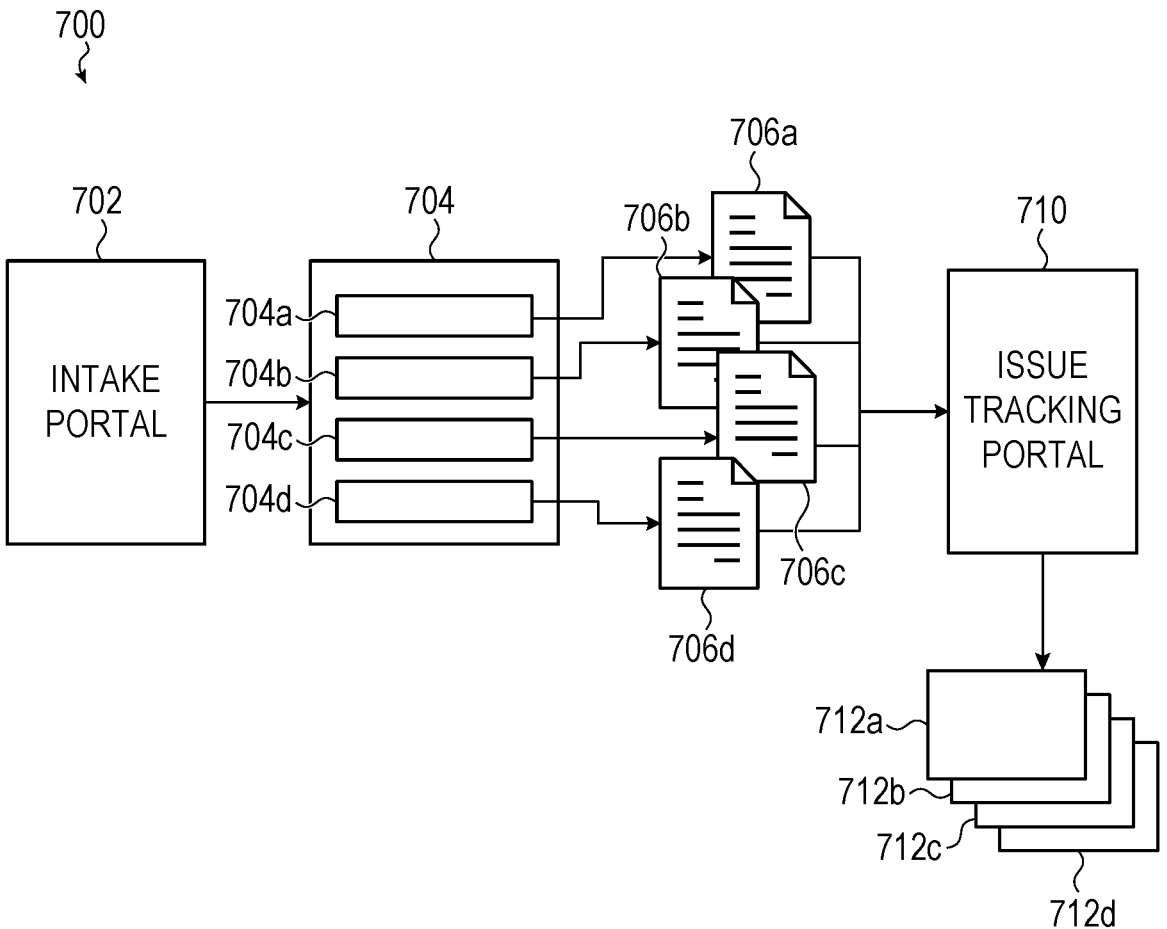

FIG. 7 depicts an example schematic of an issue tracking platform.

Figure 8A:
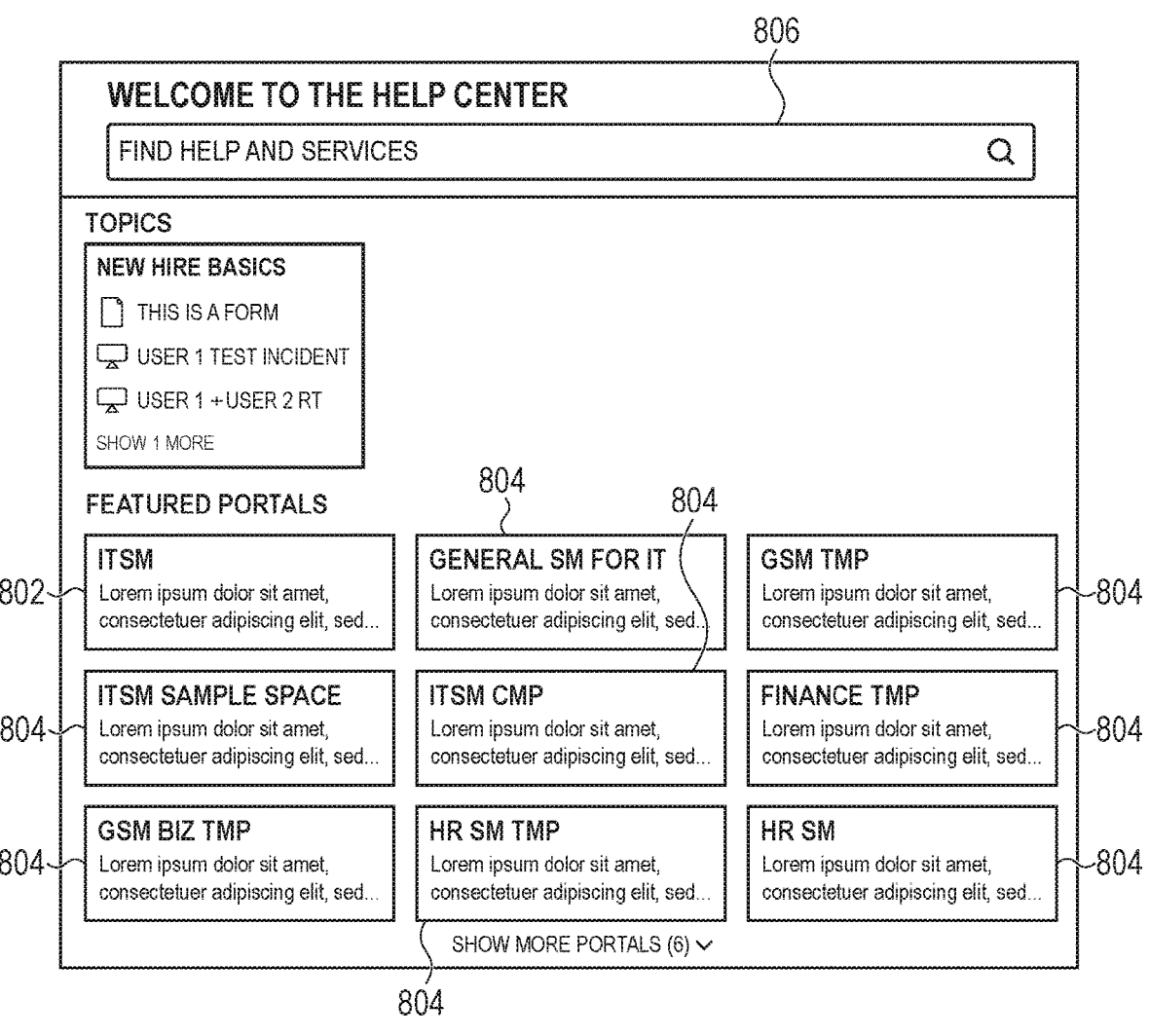
Figure 8B:
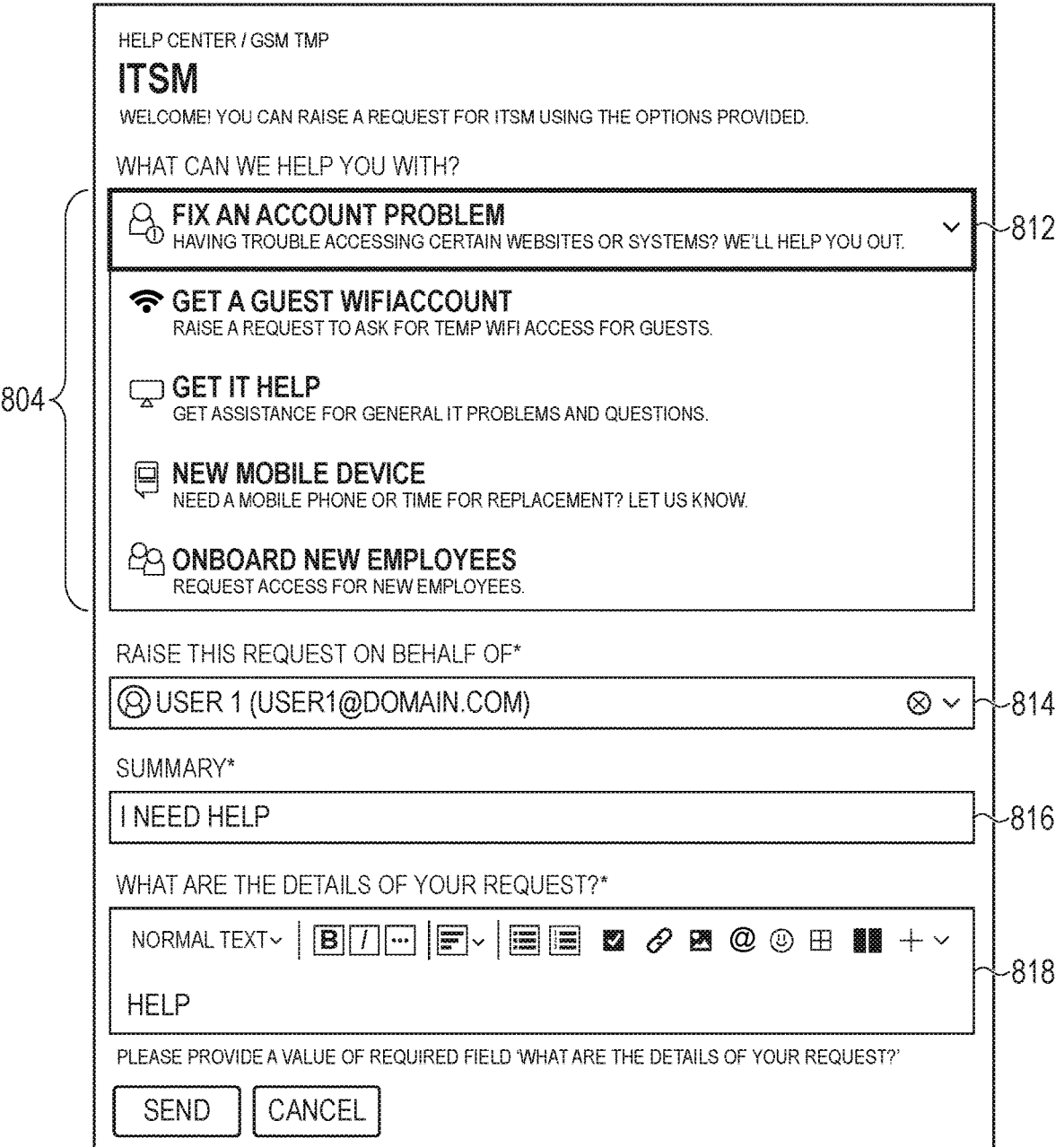

FIG. 8A-8B depicts an example portal for an issue tracking platform.

Figure 8C:
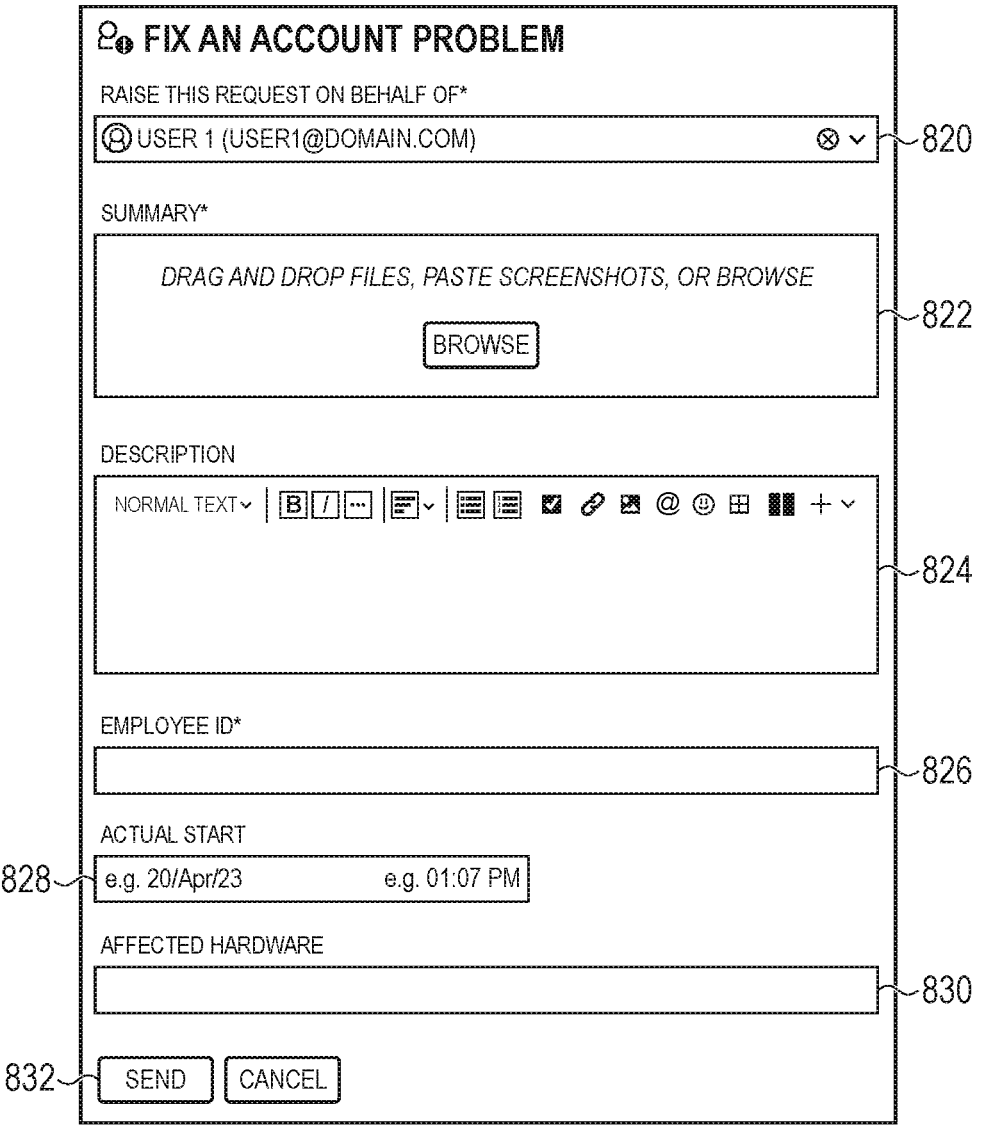

FIG. 8C depicts an example issue-creation form.

Figure 9:
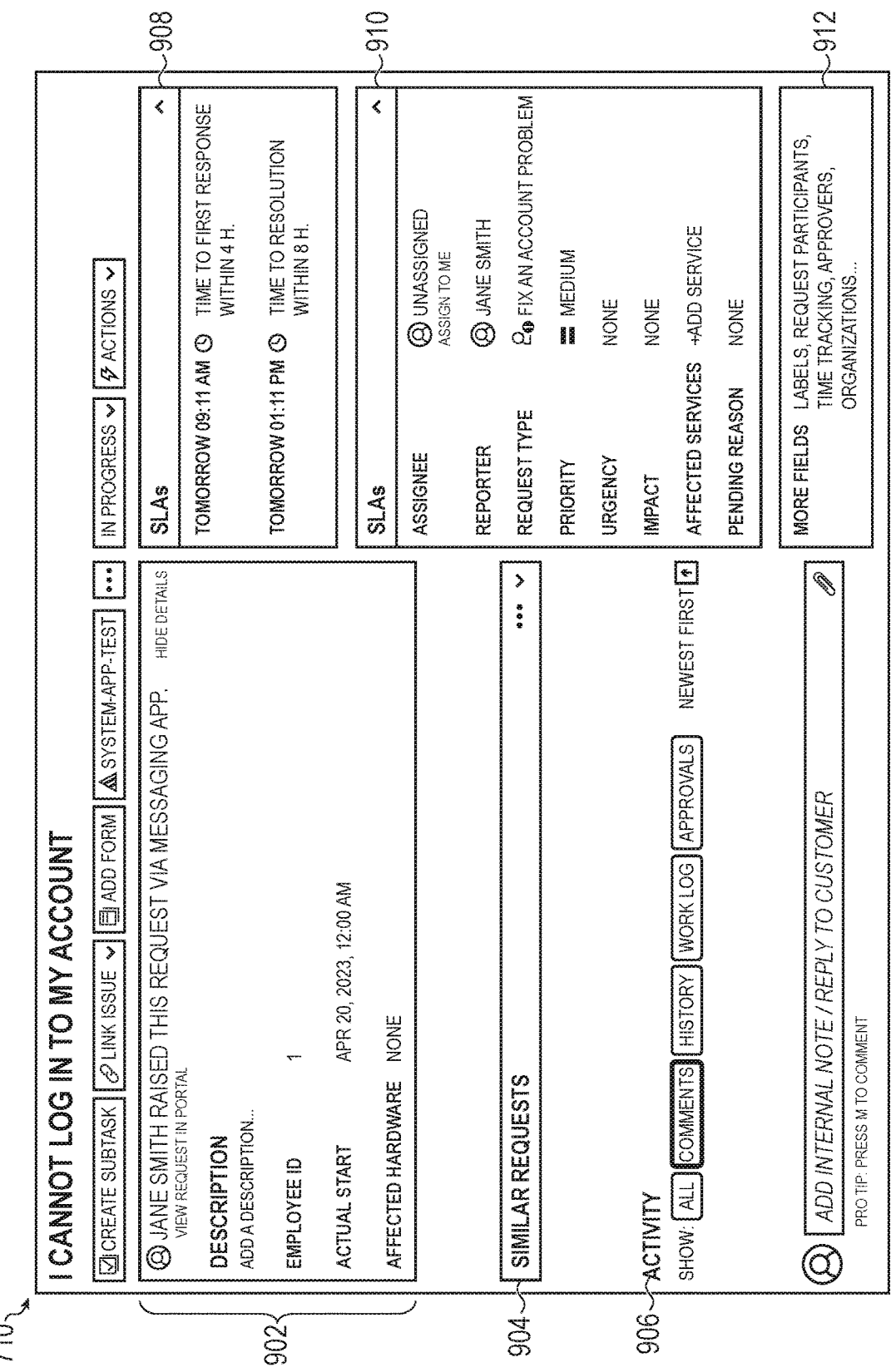

FIG. 9 depicts an example graphical user interface of an issue view in an issue tracking platform.

Figure 10:
Figure 10:
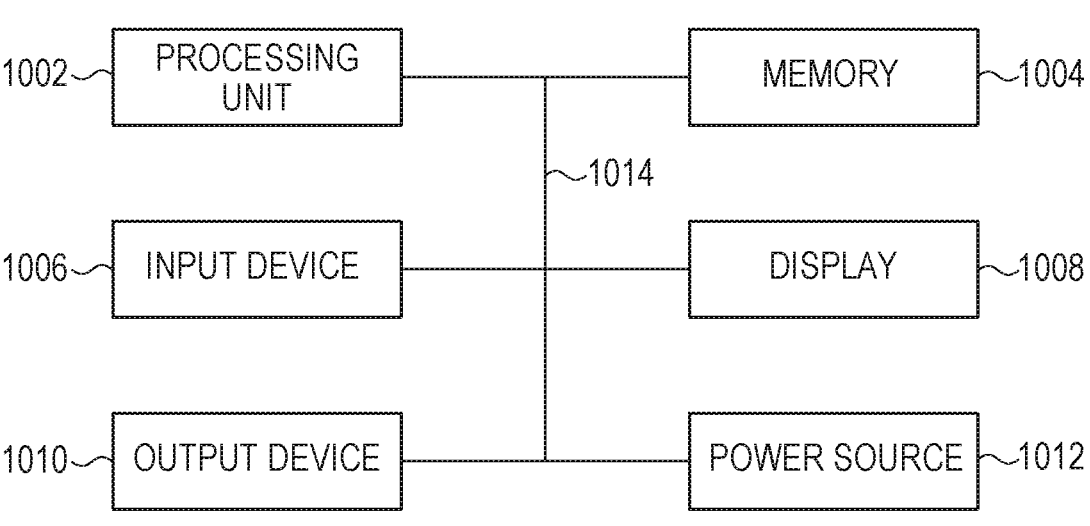

FIG. 10 shows a sample electrical block diagram of an electronic device.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically generating content, generating API requests and/or request bodies, structuring user-generated content, and/or generating structured content in collaboration platforms, such as documentation systems, issue tracking systems, project management platforms, and the like. The systems and techniques described herein are directed to a generative content service that can serve as a centralized cross-platform resource that is able to service a broad range of inquiries. Specifically, the system and techniques can be used to synthesize content in response to a natural language query or other user input. The generative content service may be integrated with one or more collaboration platforms hosting content items (e.g., pages, knowledge base documents, issues, forms, issue ticket records, source code, and documentation) that can be used to synthesize an automatically generated answer, links to relevant content, and/or summaries of content. As a centralized portal or service, the generative content service may be able to provide specialized or curated responses that are tailored to be relevant and actionable based on the user's natural language input. In one particular example, a generative content interface of a generative content service is integrated with a knowledge base system and is able to provide generative content (e.g., answers, responses, etc.) based on documents in the knowledge base that are responsive or relevant to the user's query. In another example, a generative content interface of a generative content service is integrated with an issue tracking platform and is able to provide generative content (e.g., answers, responses, etc.) relevant to issues and projects related to the natural language input and, in some cases, may provide links to forms (e.g., forms with user-fillable data structures) that can be used to create issues or otherwise resolve the user's query. In some cases, the generative content service may automatically prepopulate the data structures of identified forms based on a user's natural language inputs and other information about the user, and may even provide guided, conversational assistance in completing the identified forms. While specific examples provided herein are directed to issue tracking platforms and other content collaboration platforms, the same or similar techniques can be applied in a variety of contexts and for a variety of different platforms.

In some implementations, the generative content interface is configured to receive user input including natural language text that may include a natural language question, search string, or natural language query request. The generative content interface may be integrated with a graphical user interface of a collaboration platform, a search interface, a chat interface, or other graphical user interface. In response to a user input, the graphical user interface may include search results, links to suggested content and, in some instances, a link to a form or email that can be used to provide additional operations. The response may also include a pre-populated form or email, which may be prepopulated based on a chat history or other natural language inputs provided by the user, as well as existing user data. The response may also include follow-up questions that are tailored to further completing a form that is relevant to the user's inquiry. For example, if a generative content service determines that a user's inquiry may be satisfied by the creation or submission of a particular form, the generative content service may first prepopulate the form with information from the chat history and existing user data, and then formulate natural language responses (e.g., questions) that will elicit a response from the user to assist in further completing the form. In this way, the generative content service may provide comprehensive services to the user via the generative content interface.

The generative content interface is able to service a broad range of inquiries and requests for assistance. The generative content interface may be operated by a generative content service that is adapted to interface with, and produce responses based on content from, multiple platforms or sources, each platform or source hosting native content that may vary widely from other platforms in the system. For example, the generative content service may be configured to search within a knowledge base (which may include documents, user-generated data, content pages, etc.), an issue tracking platform (which may include issue records, workflows, forms, etc.), and a user contact database (which may include contact information of system users, associations between users, etc.). The generative content service may produce generative responses based on content retrieved from these sources. Such sources may have distinct content types, and the content from a given source may generally be used for different purposes. For example, knowledge base documents may be used to provide information about a topic, while forms or workflows in an issue tracking system may be used to initiate requests or actions within the collaboration platform, while a user contact database may be used to store user contact information and relationships between various users (e.g., which teams or projects the users in the collaboration platform are associated with).

While having access to multiple different types of content from multiple different platforms may allow the generative content service to service a broad range of inquiries and requests for assistance, simply searching among all of the content in response to a query may not provide the best user experience. For example, a user query of "new laptop" may return knowledge base documents related to "new laptop setup operations," even though the user is actually trying to initiate a request for a new laptop (e.g., via a form or workflow). Accordingly, in order to improve the quality of the responses and the overall user experience of the generative content service, the generative content service may perform an intent analysis on the user query (e.g., using natural language processing techniques) to identify the intent of the user. The generative content service can then focus its searching and response generation on only those content items that are likely to be most relevant to the user's query. Thus, for example, the intent analysis may determine that the query "new laptop" is associated with a user intent to request a new laptop, rather than a request for laptop setup operations. As such, the generative content service can limit its initial search to an issue tracking platform that contains the forms, workflows, and/or other resources that are used to issue a request for a new laptop (as opposed to a knowledge base or user contact data store, which would not contain such resources). In this way, the generative content service can provide responses that are more likely to be responsive to the user's actual intent.

In some cases, however, even if the user's intent can be determined with a high degree of confidence, the content in a particular platform or data store may not provide an adequate response to the user's request. For example, a user may issue a query such as "new laptop request form." From this query, the generative content service described herein may correctly determine the user's intent, and thus determine that the most salient search results will be in an issue tracking platform (which stores and/or uses request forms). If no such form exists in the issue tracking platform, the user's request would not be satisfied. However, information that may help the user may still be found in other platforms or data stores. For example, a knowledge base data store may include a document that describes how to request a new laptop, and a user contact data store may include contact information of an individual to whom new laptop requests can be sent.

In order to achieve the advantages of the tailored search pipeline (e.g., selecting a particular knowledge base based on a determination of the user's intent) while still providing comprehensive results, the generative content system described herein may use a response confidence analysis model to determine a response confidence score for its search results. For example, after determining a user intent and selecting an appropriate platform in which to search (e.g., a platform that is likely to satisfy the user's intent), the generative content service searches in the identified platform to obtain search results. Those search results (and/or a response based on the search results) may be provided to the response confidence analysis model, along with the initial user query (e.g., the natural language input provided by the user), and optionally an intent confidence score determined from the natural language input (e.g., indicating a confidence in a determination that the user's intent was accurately identified). The response confidence analysis model may evaluate the search results (and/or the response) in view of the natural language input to determine a confidence score the results are responsive to the query.

If the response confidence analysis model returns a high confidence score for the initial search (e.g., a score that satisfies a confidence condition), the generative content service may provide a response based on those results (and optionally without even searching in platforms that are not relevant to the user's intent). However, if the confidence score is low (e.g., does not satisfy the confidence condition), the generative content service may search other platforms or content stores (e.g., ones that had a lower intent confidence score), and/or provide results from the other platforms or content stores. (In some cases, the generative content service searches multiple platforms or content stores simultaneously so that all results are available for evaluation, even though the service will provide only results from the platform with the highest intent confidence score and/or results that have a highest result confidence score.)

In some cases, the response confidence analysis model may also use confidence values associated with the search operations and/or the intent analysis when determining the response confidence scores. For example, the intent analysis of a natural language input may return an intent confidence score for each of a set of request classifiers. Additionally, a search operation to identify content items in a particular platform (e.g., searching for forms in an issue tracking platform) may return results as well as search confidence values for each result. In some cases, these confidence values may be used by the response confidence analysis model to determine the relative confidence or quality of a given response. Thus, for example, if search results or responses from multiple different platforms have the same or similar search confidence scores (e.g., a knowledge base document and a form from an issue tracking platform are both predicted to be equally responsive to a user's query), the intent confidence scores for those platforms may determine which response is ultimately presented to the user (or which response is presented first or more prominently). Continuing the example, if the intent confidence score for the knowledge base was higher than the issue tracking platform, indicating that the user is likely trying to obtain information rather than complete a form, then the generative content service may initially or preferentially provide a response that includes content from or based on the knowledge base document.

As described herein, the generative content service may produce generative responses that are based on portions of content extracted from multiple different platforms or sources, such as a knowledge base data store, an issue tracking platform content store, a user contact data store, and the like. As described herein, a knowledge base data store may store documents or other user-generated content of a content collaboration platform, and a user contact data store may store contact information of users and associations between users. One type of content resource that may be stored in association with an issue tracking platform (and which may be provided to a user in response to a query) are forms. Forms may be defined by (or include) data structures that include user-fillable fields and that are used to resolve or complete an issue or user query. For example, in the context of a content collaboration platform as described herein, forms may be used to generate requests, send messages, complete workflows, or the like. As such, forms may be a significant tool for satisfying a user query provided to a generative content interface. As a specific example, a user may input a query to a generative content interface in order to request vacation leave, which is a request that may be achieved in the context of a content collaboration platform by completion and/or submission of a form. In response to the query, the generative content service may identify an appropriate form (e.g., in a content store that includes forms), optionally pre-fill the user-fillable fields of the form, and provide the form (and/or a link to the form) to the user. (The generative content service may also automatically submit a form or generate an issue ticket using the form.) As another specific example, a user may input a query to request a new computer or other office device. In response to the query, the generative content service may identify an appropriate form, optionally pre-fill the user-fillable fields of the form, and provide the form (and/or a link to the form) to the user (and/or automatically create an issue ticket with the form). While various example forms are described herein, it will be understood that these are merely exemplary, and other types of forms may also be included. For example, forms may be provided for requesting software updates or changes, creating work tasks, creating bug reports, changing employee records (e.g., changing benefit elections), or the like.

In order to find and provide a form that is relevant to a user's query, the generative content service may search in a data store that includes forms or portions of forms. For example, the generative content service may search text, metadata, or other information in the forms in order to identify a form that satisfies the query. Examples of search techniques for identifying a suitable form in response to a query are described herein. The generative content service may then provide the form to the user, and/or assist the user in completing the form (e.g., prepopulating the user-fillable fields).

In some cases, some search operations may not return any forms that would satisfy a user's query (e.g., they may not find any forms that meet a threshold search confidence criteria for the query). For example, a user who wants to request a vacation day may provide a query to a generative content interface such as "take day for doctor's appointment." This request may be accomplished in the context of a given work environment by the submission of a "paid leave request form." However, the initial form search may not identify this form due to the lack of matching terms between the query and the form (or for any other reason), and thus the user would not be provided with an adequate or helpful response.

In order to provide comprehensive search results for forms, even when direct searching does not identify a suitable result, the generative content service described herein may leverage the links between existing issue records and their associated forms in order to provide additional avenues for identifying relevant results. In particular, a content collaboration platform as described herein may include or be associated with an issue tracking system. The issue tracking system may be used to generate, store, track, and otherwise manage issue records. Issue records may be or be defined by data structures, and may include content such as a title, issue description, issue status, user identifier(s) (e.g., of the user to whom the issue relates, the user who created the issue record, etc.), due date, or the like. Additionally, an issue record may be associated with a particular form (or forms) that are used to resolve the issue. For example, when creating an issue record, a user may select a request-type identifier for the issue record. A request-type identifier may uniquely identify the type of request associated with the issue record, and may be associated with a particular workflow or manner of completing the associated issue. In some case, the request-type identifier may also be associated with a particular form or forms in the content collaboration platform that are used to complete the issue. For example, if a user wishes to request a vacation day, an issue record may be generated for that request, and the issue record may be associated with a request-type identifier of "vacation request." Upon selecting this identifier, the issue record may be associated with a particular form (e.g., "vacation request form"), and the form may be provided to a user so that it can be completed (and/or the system may prompt a user to provide information in order to complete the form).

Due to the association between issue records and forms, the generative content service may leverage the content of the issue records in order to retrieve potentially relevant forms for responding to a user query. More particularly, in addition to (or instead of) searching the forms themselves (e.g., form text, metadata, titles, descriptions, form field identifiers, etc.), the generative content service may search issue records to find issues that are similar to or may be responsive to a user's query, and identify responsive forms due to their association with the issue records. Continuing the example from above, the query "take day for doctor's appointment" may not return any form results when simply searching among the available forms. However, an issue tracking system may include issues where other users have made similar requests, and for which the "paid leave request form" was used. For example, the issue tracking system may have an issue record where a user requested "vacation day for medical reason," and another issue record where a user requested "day off for doctor visit," each of which are associated with a request-type identifier that is linked to the "paid leave request form." Thus, even if a first search operation does not return the appropriate form, the generative content service described herein may still identify a responsive form by leveraging the existing links between issue records and forms.

Using the link between an issue record and a form may be particularly advantageous for various reasons. For example, request-type identifiers may be selected for a given issue record by a human operator who understands the user's query and is knowledgeable of the available forms. Thus, there is a strong likelihood that the associated form will be responsive to the query that gave rise to the issue. Moreover, the system may limit its search to (or provide greater weight to) issues that are marked as being successfully completed. Thus, if the generative content service identifies an issue record that is similar to a user's query, there can be a high degree of confidence that the form used to resolve the issue will also resolve the user's query.

In order to generate a generative response using results from the searching and result analysis operations described herein, the generative content service may collect content received from each of the multiple platforms or content resources and then select portions of the received content that are predicted to be most relevant or responsive to the user input. In one example, the generative content service may process the identified content (e.g., knowledge base documents, forms, user contact records, etc.) to generate an aggregated set of text snippet portions, each text snippet portion extracted from a block of text or other element of the received content. Each text snippet may be evaluated with respect to the user input in order to rank the snippets or select a subset of snippets which can be used for a prompt. As described herein, a prompt, including at least a portion of the user input, predetermined query prompt language, and the subset of snippet portions, may be provided to a generative output service, which may include a large language model or other predictive content generation model. In response to a given prompt, the generative output service may provide a generative response that is unique to the prompt that was provided.

All or a portion of the generative response may be displayed to the user in the generative content interface. As described herein, postprocessing may be performed on the generative response in order to identify system objects or references that can be replaced with selectable elements linked to or otherwise associated with the system objects. Additionally, other system resources, including selectable forms, template emails, and other resources may be generated and provided to the user in the generative content interface. This may facilitate further operations from the centralized service and allow the user to leverage existing resources in respective platforms or services that are associated with the centralized service.

With respect to use within a content collaboration platform, automatically generated content can supplement, summarize, format, and/or structure existing tenant-owned user-generated content created by a user while operating a software platform, such as described herein. In one embodiment, user-generated content can be supplemented by an automatically generated summary or answer. The generated summary may be rendered or displayed in a generative content interface and, in some cases, may be inserted into user generated content of a content item managed by the respective platform. In yet other examples, the generated summary may be transmitted to another application, messaging system, or notification system. For example, a generated document summary can be attached to an email, a notification, a chat or information technology service management (ITSM) support message, or the like, in lieu of being attached or associated with the content it summarizes. In yet other examples, multiple disparate user-generated content items, stored in different systems or in different locations, can be collapsed together into a single summary or list of summaries.

The generative content interface, and/or the generative content service more generally, may be adapted to handle a wide range or inquires or natural language question inputs drawing from the user generated content provided by one or more of the collaboration platforms. In some cases, the generative content interface may be adapted for an ITSM environment. For example, automatically generated content can summarize and/or link to one or more documents that outline troubleshooting steps for common problems. In these examples, the customer experiencing an issue can receive, through the interface, one or more suggestions that summarize steps outlined in comprehensive documentation, link to a relevant portion of comprehensive documentation, and/or prompt the customer to provide more information. In another case, a service agent can be assisted by automatically generated content that summarizes steps outlined in comprehensive documentation and/or one or more internal documentation tools or platforms, provides links to relevant portions of comprehensive help documentation, and/or prompts the service agent to request more information from the customer. In some cases, generated content can include questions that may help to further narrowly characterize the customer's problem. More generally, automatically gener- ated content can assist either or both service agents and customers in an ITSM or self-help environment.

In addition to embodiments in which automatically gen- erated content is generated in respect of existing user- generated content (and/or appended thereto), automatically generated content, as described herein, can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user- specific, API-specific, and/or tenant-specific authentication tokens that can be presented to the API for authentication and authorization purposes.

The foregoing embodiments are not exhaustive of the manners by which automatically generated content can be used in multi-platform computing environments, such as those that include more than one collaboration tool. More generally and broadly, embodiments described herein include systems configured to automatically generate con- tent within environments defined by software platforms. The content can be directly consumed by users of those software platforms or indirectly consumed by users of those software platforms (e.g., formatting of existing content, causing exist- ing systems to perform particular tasks or sequences of tasks, orchestrating complex requests to aggregate informa- tion across multiple documents or platforms, and so on) or can integrate two or more software platforms together (e.g., reformatting or recasting user generated content from one platform into a form or format suitable for input to another platform).

Scalable Network Architecture for Automatic Content Gen- eration

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output services" or "generative output engines." A system incorporating or instantiating a generative output service or engine can be referred to as a "generative output system." Broadly, the term "generative output service" or "generative output engine" may be used to refer to any combination of com- puting resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output service can be any suitably formatted string of characters, in any natural language or text encoding. In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, por- tions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output service as described herein can be formatted/encoded according to any suitable encoding (e.g., ISO, Unicode, ASCII as examples). In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash char- acter, any text input after the slash character can be consid- ered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output service, such as described herein. The generative output service receives, as input, a modified prompt and provides a continuation of that prompt as output which can be directed to an appropriate recipient, such as the graphical user interface operated by the user that initiated the request or such as a separate platform. Many configu- rations and constructions are possible.

Large Language Models

An example of a generative output service of a generative content system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output service may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as "generated text" or "generated output" provided by a generative output service as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output service type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>".

In addition, the LLM may be configured to replace the substring "pending" with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Services & Generative Output Systems

Independent of training and/or configuration of one or more underlying engines or services (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output service.

The generative output service can be configured to expose one or more API endpoint, such as for configuration or for receiving input prompts. The generative output service can be further configured to provide generated text output to one or more subscribers or API clients. Many suitable interfaces can be configured to provide input to and to received output from a generative output service, as described herein.

For simplicity of description, the embodiments that follow reference generative output services and generative output services configured to exchange structured data with one or more clients, such as the input and output queues described above. The structured data can be formatted according to any suitable format, such as JSON or XML. The structured data can include attributes or key-value pairs that identify or correspond to subparts of a single response from the generative output service.

For example, a request to the generative output service from a client can include attribute fields such as, but not limited to: requester client ID; requester authentication tokens or other credentials; requester authorization tokens or other credentials; requester username; requester tenant ID or credentials; API key(s) for access to the generative output service; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
    "prompt": "Generate five words of placeholder text in
        the English language.",
    "API_KEY": "hx-Y5u4zx3kaF67AzkXK1hC",
    "user_token": "PkcLe7Co2G-50AoIVojGJ"
}
```

Similarly, a response from the generative output service can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
    "response": "Hello world text goes here.",
    "generation_time_ms": 2
}
```

In some embodiments, a prompt provided as input to a generative output service can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output service, as described herein, how an input format is structured and/or how output should be provided by the generative output service.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output service as described herein.

In many cases, a particular engineered prompt template can be selected based on a desired task for which output of the generative output service may be useful to assist. For example, if a user requires a summary of a particular document, the user input prompt may be a text string comprising the phrase "generate a summary of this page." A software instance configured for prompt preconditioning—which may be referred to as a "preconditioning software instance" or "prompt preconditioning software instance"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output service.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences. For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output service. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated to the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output service may be:

```
{
    "raw_prompt": summarize the edits to this page made
        by my team since I last visited this page",
    "modified_prompt": "Generate a summary of each
        paragraph tagged with an editId attribute matching
        editId=1, editId=51, editId=165, editId=99 within
        the following HTML-formatted content: [HTML-
        formatted content of the page]."
}
```

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output service. For example, a snippet selected from a database and appended to the modified prompt may be:

{"snippet123_table_from_tasks": "The table should be formatted as a three-column table with multiple rows. The leftmost column should be titled 'Title' and the corresponding content of each row of this column should be the title attribute of a task. The middle column should be titled 'Created Date' and the corresponding content of each row of this column should be the creation date of the task. The rightmost column should be titled 'Status' and the corresponding content of each row of this column should be the status attribute of the selected task."
}

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:
{
    "modified_prompt": "Find all tasks assigned to User 1234 dating from Jan. 1, 2023-Jan. 14, 2023 (inclusive). Create a table in which each found task corresponds to a respective row of that table. The table should be formatted as a markdown table, in plain text, with a three columns. The leftmost column should be titled 'Title' and the corresponding content of each row of this column should be the title attribute of a respective task. The middle column should be titled 'Created Date' and the corresponding content of each row of this column should be the creation date of the respective task. The rightmost column should be titled 'Status' and the corresponding content of each row of this column should be the status attribute of the respective task."
}

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output service as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output service in a chain of prompts and responses. For example, a prompt may call for a summary of all documents related to a particular project. In this case, a prompt engineering service may coordinate and/or orchestrate several requests to a generative output service to summarize a first document, a second document, and a third document, and then generate an aggregate response of each of the three summarized documents. In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output service to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output service.

The prompt engineering service may access a user profile of the respective user and identify content having access permissions that are consistent with a role, permissions profile, or other aspect of the user profile.

In other embodiments, a prompt engineering service may be configured to request that the generative output service append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output service may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example, a class of request that requires a generative output service to resource from multiple pages may have different authorization enforcement mechanisms or workflows than a class of request that requires a generative output service to resource from only a single location.

These foregoing examples are not exhaustive. Many suitable techniques for managing permissions in a prompt engineering service and generative output service system may be possible in view of the embodiments described herein.

More generally, as noted above, a generative output service may be a portion of a larger network and communications architecture as described herein. This network can include input queues, prompt constructors, engine selection logical elements, request routing appliances, authentication handlers and so on.

Collaboration Platforms Integrated with Generative Output Services

Embodiments described herein are focused to leveraging generative output services to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. These types of platforms may be generally referred to herein as "collaboration platforms" or "content collaboration platforms."

In one example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output service, as described herein, in order to automatically generate structured or unstructured content within environments defined by those systems.

In some implementations, a content collaboration platform may include a documentation system, also referred to herein as a documentation platform, which can leverage a generative output service to provide a generative content interface to provide synthesized or generated responses leveraging content items hosted by the system. The documentation system may also leverage a generative output service to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on. As described with respect to examples provided herein, a documentation system can store user-generated content in electronic documents or electronic pages, also referred to herein simply as documents or pages. The documents or pages may include a variety of user-generated content including text, images, video and links to content provided by other platforms. The documentation system may also save user interaction events including user edit action, content viewing actions, commenting, content sharing, and other user interactions. The document content in addition to select user interaction events may be indexed and searchable by the system. In some examples, the documentation system may organize documents or pages into a document space, which defines a hierarchical relationship between the pages and documents and also defines a permissions profile or scheme for the documents or pages of the space.

In some implementations, a content collaboration platform may include an issue tracking system or task management system (also referred to herein as issue tracking platforms or issue management platforms). The issue tracking system may also leverage a generative output service to provide a generative content interface to provide synthesized or generated responses leveraging content items (e.g., issues or tasks) hosted by the system. The issue tracking system may also leverage a generative output service to, without limitation: summarize issues; summarize portions of issues or fields of issues; summarize multiple selected issues, tasks, or events; generate issue templates; pre-populate fields of forms or form templates; and so on. As described with respect to examples provided herein, an issue tracking system can manage various issues or tasks that are processed in accordance with an automated workflow. The workflow may define a series of states that the issue or task must traverse before being completed. The system may also track user interaction events, issue state transitions, and other events that occur over the lifecycle of the issue, which may be indexed and searchable by the system.

More broadly, it may be appreciated that a single organization may be a tenant of multiple software platforms, of different software platform types. Generally and broadly, regardless of configuration or purpose, a software platform that can serve as source information for operation of a generative output service as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform, also referred to as a frontend or client application, may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system or platform, a code repository system or platform (also referred to as a source-code management system or platform), and/or a documentation system or platform.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration platforms to advance individual projects or goals. For example, for a single software development project, a software development team may use (1) a code repository to store project code, executables, and/or static assets, (2) a documentation platform to maintain documentation related to the software development project, (3) an issue tracking platform to track assignment and progression of work, and (4) a messaging service or platform to exchange information directly between team members. However, as organizations grow, as project teams become larger, and/or as software platforms mature and add features or adjust user interaction paradigms over time, using multiple software platforms can become inefficient for both individuals and organizations. Further, as described herein, it can be difficult to locate content or answer queries in a multiplatform system having diverse content and data structures used to provide the various content items. As described herein, a generative content service may be adapted to access multi-platform content and provide generative responses that bridge various content item types and platform structures.

These foregoing and other embodiments are discussed below with reference to FIGS. 1-10. The detailed description given herein with respect to these figures is for explanation only and should not be construed as limiting.

User Input Resulting in Generative Output

FIG. 1 depicts a simplified diagram of a system, such as described herein that can include and/or may receive input from a generative output service as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location. The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output service (which may be provided by or part of the generative output service 116) that can be leveraged to provide unique intelligent functionality to each respective backend. For example, the generative output service can be configured to receive prompts, such as described above, to modify, create, or otherwise perform operations against content stored by each respective software platform.

By centralizing access to the generative output service in this manner, the generative output service can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms maybe instantiated over physical resources provided by the set of host servers 102. Once instantiated, the first platform backend 108 and the second platform backend 110 can each communicably couple to a centralized content service 112. The centralized content service may be a search interface, generative content service or, in some cases, a centralized editing service which may also referred to more simply as an "editor" or an "editor service."

In implementations in which the centralized content service 112 is a search interface, the service 112 may be instantiated or implemented in response to a user input provided to a frontend application in communication with one of the platform backends 108, 110. The service 112 may cause display of a search interface including or integrated with a generative content interface. The service 112 may be configured to leverage authenticated user sessions between multiple platforms in order to access content and provide aggregated or composite results to the user. The service 112 may be instantiated as a plugin to the respective frontend application, may be integrated with the frontend application or, in some implementations, may be instantiated as a separate and distinct service or application instance.

In implementations in which this centralized content service 112 is an editing service, the centralized content service 112 may be referred to as a centralized content editing frame service 112. The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content service 112 that can be called by each respective frontend whenever it is required to present the user of that respective frontend with an interface to edit text.

For example, the documentation platform's frontend may call upon the centralized content service 112 to render, or assist with rendering, a user input interface element to receive user text input in a generative content interface of a documentation platform or system. Similarly, the issue tracking platform's frontend may call upon the centralized content service 112 to render, or assist with rendering, a user input interface element to receive user text input in a generative content interface. In these examples, the centralized content service 112 can parse text input provided by users of the documentation platform frontend and/or the issue tracking platform backend, monitoring for command and control keywords, phrases, trigger characters, and so on.

Additionally, a generative content interface, or an interface for accessing a generative content service, may be provided in the graphical user interfaces of various different platforms and/or services. For example, a documentation platform, an issue tracking platform, and a messaging platform may each include a respective user interface element to provide access to the generative content service. In some cases, other types of access points may be provided for the generative content service, such as via a web site or web portal, a dedicated generative content interface, a chat interface (which may be a feature that is included in the user interface of any platform, such as a pop-up chat interface), or the like. The generative content service may be accessed via email (e.g., a user may engage in an email exchange with the generative content service).

In some cases, the generative content service may operate in the same or substantially the same manner regardless of the particular platform or interface through which the user interacts with the generative content service. For example, the generative content service may provide a same or similar generative response or series of responses regardless of the initial access point for the user's query. In some cases, the generative content service may provide different generative responses based at least in part on the initial access point for the user's query. For example, the generative content service may rank certain types of results or responses higher based on the initial access point. For example, if a user issues a request to the generative content service in an issue tracking platform, the generative content service may rank results that relate to issues, issue workflows, or forms associated with issues higher than results that relate to documentation or knowledge base documents. As another example, if a user issues a request to the generative content service in a messaging platform, the generative content service may rank results that relate to other users within the system (e.g., suggested users to contact) higher than results that relate to documentation or knowledge base documents.

In many cases, for example, the centralized content service 112 can implement a slash command service that can be used by a user of either platform frontend to issue commands to the backend of the other system. As described herein, the centralized content service 112 may cause display of a generative content interface having input regions and controls that can be used to receive user input and provide commands to the system.

In one example, the user of the documentation platform frontend can input a slash command to the content editing frame, rendered in the documentation platform frontend supported by the centralized content service 112, in order to type a prompt including an instruction to create a new issue or a set of new issues in the issue tracking platform. Similarly, the user of the issue tracking platform can leverage slash command syntax, enabled by the centralized content service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized content service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content service 112 can be extended to include additional features and functionality-such as a user input field, selectable control, a slash command processor, or other user interface element-which, in turn, can automatically be leveraged by any further platform that incorporates a generative content interface, and/or otherwise integrates with the centralized content service 112 itself. In this example, commands or input facilitated by the generative content interface can be used to receive prompt instructions from users of either frontend. These prompts can be provided as input to a prompt engineering/prompt preconditioning service (such as the prompt management service 114) that, in turn, provides a modified user prompt as input to a generative output service 116.

The generative output service 116 may be hosted over the host servers 102 or, in other cases, may be a software instance instantiated over separate hardware. In some cases, the generative output service 116 may be a third party service that serves an API interface to which one or more of the host services and/or preconditioning service can communicably couple.

The generative output service 116 can be configured as described above to provide any suitable output, in any suitable form or format. Examples include content to be added to user-generated content, API request bodies, replacing user-generated content, and so on.

In addition, a centralized content service 112 can be configured to provide suggested prompts to a user as the user types. For example, as a user begins typing a slash command in a frontend of some platform that has integrated with a centralized content service 112 as described herein, the centralized content service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content service 112 can be configured to suggest one or more prompts that can be provided as input to a generative output service 116 as described herein to perform a useful task, such as summarizing content rendered within the centralized content service 112, reformatting content rendered within the centralized content service 112, inserting cross-links within the centralized content service 112, and so on.

The ordering of the suggestion list and/or the content of the suggestion list may vary from user to user, user role to user role, and embodiment to embodiment. For example, when interacting with a documentation system, a user having a role of "developer" may be presented with prompts, content, or functionality associated with tasks related to an issue tracking system and/or a code repository system. Alternatively, when interacting with the same documentation system, a user having a role of "human resources professional" may be presented with prompts, content, or functionality associated with manipulating or summarizing information presented in a directory system or a benefits system, instead of the issue tracking system or the code repository system.

More generally, in some embodiments described herein, a centralized content service 112 can be configured to suggest to a user one or more prompts that can cause a generative output service 116 to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein refence systems and methods for sharing user interface elements rendered by a centralized content service 112 and features thereof (such as input fields or a slash command processor), between different software platforms in an authenticated and secure manner. For simplicity of description, the embodiments that follow reference a configuration in which a centralized content editing frame service is configured to implement user input fields, selectable controls, a slash command processor, or other user interface elements.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized content service 112. Information can be transacted by and between the frontend, the first platform backend 108 and the centralized content service 112 in any suitable manner or form or format. In many embodiments, as noted above, the client device 104 and in particular the first platform frontend can be configured to send an authentication token 120 along with each request transmitted to any of the first platform backend 108 or the centralized content service 112 or the preconditioning service or the generative output service 116.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized content service 112. Information can be transacted by and between the frontend, the second platform backend 110 and the centralized content service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content service 112 can provide uniform feature sets to users of either the client device 104 or the client device 106. For example, the centralized content service 112 can implement a user input field, selectable controls, a slash command processor, or other user interface element to receive prompt input and/or preconfigured prompt selection provided by a user of the client device 104 to the first platform and/or to receive input provided by a different user of the client device 106 to the second platform.

As noted above, the centralized content service 112 ensures that common features, such as user input interpretation, slash command handling, or other input techniques are available to frontends of different platforms. One such class of features provided by the centralized content service 112 invokes output of a generative output service, such as the generative output service 116.

For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content service 112. The user input may include a prompt to be continued by the generative output service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output service, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the centralized content service 112 to return to a suitable backend application, to in turn return to or perform a task for the benefit of a client device such as the client device 104 or the client device 106. More particularly, it may be appreciated that although FIG. 1 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the centralized content service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative output service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to ${user} with a due date in the next 2 days." In this example, the token/field/ variable ${user} can be replaced with a user identifier corresponding to the user currently operating a client device.

This insertion of an unambiguous user identifier can be performed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative output service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "${user prompt}. Provide output of any table in the form of a tab delimited table formatted according to the markdown specification." In this example, the variable ${user prompt} may be replaced with the user prompt such that the entire prompt received by the generative output service 116 can include the user prompt and the example sentence describing how a table should be formatted.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/ memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized content service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative output service 116 may be provided by an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative content services, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particularly data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

FIG. 2A depicts an example system 200 for providing generative content. The system 200 can be used to operate or produce a generative content interface, as described with respect to user interface examples of FIGS. 5A and 6B, described below. The system 200 can also leverage elements and system components described above in FIG. 1 and below with respect to FIGS. 3A-4B.

The system 200 of FIG. 2A may be used as a general or universal generative content service that is able to draw from a wide range of curated content to provide assistance to a user having a general question. In some instances, the system 200 may also be directed to provide more specific assistance directed to issue creation and issue resolution by coordinating generative content and actions with a corresponding issue tracking platform. The system 200 may be similarly adapted for a range of other platform specific or use-case specific scenarios by allowing the system to leverage content from a wide range of content, which may be curated or adapted to provide specific services and resources. In the following example, various services or modules are depicted as distinct elements for purposes of demonstration. However, in any particular implementation, elements may be combined or integrated together to provide the same or similar services or operations, as described herein.

In the example of FIG. 2A, the system 200 includes an intake service 210, which serves as the gateway or portal for a variety of sources of user input. In accordance with many of the examples provided herein, the intake service 210 may be linked to or operate a generative content interface, which includes an input region or other graphical user interface for receiving user input. Additionally or alternatively, the intake service 210 may receive input from a variety of other sources including, for example a search portal 202 and a chat service 204. Other input sources to the intake service 210 may include email messages.

The search portal 202 may include a document or content search interface element that is incorporated into a graphical user interface or may be a dedicated search interface portal that is configured to provide search results in addition to the generative responses that the system 200 is configured to produce. The chat service 204 may include a chat-based interface that is incorporated into another graphical user interface or platform frontend or, alternatively, may be a dedicated chat-based platform. The chat service 204 may also be instantiated as a webpage or as a chat interface on a web page (e.g., a pop-up chat interface on a web page). Other services that may leverage the system 200 using the intake service 210 include an issue tracking system intake portal, a company directory, a company homepage or web portal, a user homepage, or other services. Independent of the platform or specific interface, a range of external services or frontends may leverage the system 200 by either accessing the intake service 210 via an application programming interface or through a direct call to the intake service 210.

As shown in FIG. 2A, the intake service 210 may include or be coupled to a generative content service 220. The generative content service 220 is configured to provide generative responses or other generative content that leverages content provided by and/or stored in association with one or more distinct content stores 230, 240, 240 (which may be associated with different platforms, content providers, or classes or types of content item). The generative content service 210 may also include services or modules that are able to provide various preprocessing and postprocessing operations described with respect to other system herein.

The intake service 210 may include or be operably coupled to a query analysis service 212. The query analysis service 212 may be configured to analyze a natural language user input provided to the intake service 210 to produce one or more search feature sets. For example, the query analysis service 212 may include multiple query analysis modules 222, 224, which are adapted to produce or generate different feature sets or analyses of the natural language user input provided by the intake service 210. In one example, the query analysis module 222 includes a natural language processor that is adapted to extract key words or phrases from the natural language user input and form a keyword feature set. The analysis modules 222 may perform lemmatization and/or tokenization operations on the natural language user input to obtain the key words or phrases that define the keyword feature set. The analysis module 222 may remove stop words including articles, common verbs, and other words that are predicted to have a minimal impact on the substance of the query. The analysis module 222 may also extract identified tokens or segments of the input that may be subjected to a lemmatization or other service to determine a set of keywords or search terms. In some cases, word embedding operations are also performed, which may result in an expanded feature set that can be used by the system 200. These techniques are provided by way of example and other natural language processing techniques can be used to obtain a set of keywords or search terms. The analysis module 222 may represent the feature set as a list or array of values. The feature set may also be represented as a vector or other multi-dimensional data element. The keyword feature set may be used by a keyword search service or engine to identify relevant content items from one or more data stores, as described herein.

Another analysis module 224 may perform a different analysis to produce a different feature set or representation of the user input. For example, the analysis module 224 may produce a semantic feature set that includes a statement of intent. The semantic feature set may be used by a semantic search service or engine to identify relevant content items from one or more data stores, as described herein.

An intent analysis module 213 may perform an intent analysis on the natural language user input to determine an intent confidence score with respect to each of a set of request classifiers. The request classifiers may generally relate to a type of request that the generative content service can satisfy. For example, the request classifiers may include a first request classifier associated with a request for an action, a second request classifier associated with a request for information, and a third request classifier associated with a request for a contact. Other request classifiers are also contemplated.

Request classifiers may generally correspond to a type of content item that may be used to satisfy the user's request. For example, if the natural language input corresponds to a request for information, the request may be satisfied by providing a document, or content from a document, that includes the requested information. If the natural language input corresponds to a request for a user contact, the request may be satisfied by providing contact information of a user (e.g., an email address, chat handle, telephone number, etc.). If the natural language input corresponds to request for an action, the request may be satisfied by providing (and/or populating) a form that, in the context of a collaboration platform, initiates a workflow to complete the requested action.

As described herein, different types of content, which may each be associated with a type of user request, may be stored and/or categorized separately, such that the generative content service can limit search operations to a type of content that will best satisfy the user's intent. For example, as described above, if a natural language input suggests that a user wants information (e.g., information on how to set up a new laptop), the generative content service may initially (or exclusively) search a knowledge base content store to find the information. In this way, other content that may have a high relevance to the search feature sets, but that have a low relevance to the user's intent (e.g., a form for requesting a new laptop), may be avoided altogether.

By determining intent confidence scores for a natural language input with respect to each of a set of request classifiers, the intent analysis module 213 can tailor its search and generative response operations to best satisfy the user's intent. For example, as noted above, the generative content service may use the intent confidence scores to select or limit the particular content stores that are searched in order to find content items with which to generate a response to the user. More generally, the generative content service may use the intent confidence scores to tailor the way in which it responds to or interacts with the user in order to provide the best response to the user's request. For example, the generative content service may format a response differently based on whether it is providing a user contact, information from a document (e.g., knowledge base content item), or a form. As another example, the generative content service may provide different follow-up options based on the type of response. For example, if a natural language input indicates a request for a user contact, the generative content service may provide a pre-populated email or chat message to an identified user, whereas if the natural language input indicates a request for an action, the generative content service may engage with the user in a chat dialog to elicit information in order to prepopulate an appropriate form. The generative content service may use intent confidence scores with respect to different request classifiers to tailor its operations in various ways, including selecting a search target data store, response type, response formatting, follow-up options, response appearance, selectable options or links (e.g., what types of selectable options or links are included in a response), and so forth.

Intent confidence scores may be generated using a zero-shot classification technique (or any other suitable technique), and may return a score, for the query, for each of a predetermined set of response classifiers. In some cases, the score for each response classifier is between 0 and 1 (with higher values representing higher confidence). If the intent confidence score satisfies an intent confidence condition (e.g., a score greater than or equal to 0.7, or any other suitable condition), the generative content service may attempt to satisfy the user's query in a first manner (e.g., searching in a content store associated with that type of user request). If the intent confidence score does not satisfy the intent confidence condition, the generative content service may attempt to satisfy the user's query in a second manner (e.g., searching in multiple content stores each associated with a different type of user request). Examples of how the generative content service proceeds based on the intent confidence scores are described herein.

In some cases, the zero-shot classification technique, or the intent analysis module 213 more generally, includes or uses a machine learning model that is able to classify the user input as being directed to a particular request type. The model may have been trained using previous input queries and corresponding request classifiers.

In some cases, intent confidence scores (or an intent analysis more generally) may be generated using other techniques. For example, a prompt for a generative output service may be constructed that includes the natural language input, a set of output candidates (e.g., the request classifiers, intent statements that are associated with the request classifiers, or the like), and prompt text. The prompt text may be predetermined text that will cause the generative output service to return a set of intent confidence scores for each of the set of output candidates, based on the natural language input. The prompt may be provided to the generative output service, and the generative output service may return a confidence score for each of the output candidates, with the respective scores representing the confidence that the natural language input is indicative of a user intent for the respective output candidate (e.g., request classifier).

As another example, the natural language input may be processed (e.g., using an LLM or other suitable model) to produce a statement of the user's intent for the input. The statement of the user's intent may be compared to different sets of intent statements, each set corresponding to a request type. For example, a first set of intent statements may be associated with a first request type, a second set of intent statements may be associated with a second request type, and so forth. The statement of the user's intent may be compared against these sets of intent statements, and a confidence score may be generated that represents the similarity between the user's intent and one or more of the intent statements for each response classifier. Thus, for example, if the statement of the user's intent is more similar to intent statements associated with a first response classifier (e.g., a request for an action) than to those associated with a second response classifier (e.g., a request for information), the intent confidence score for the request for an action will be higher than the request for information.

In some cases, a statement of the user's intent is not separately determined, and instead the natural language input is processed to produce a search vector or feature set (e.g., using string normalization, keyword extraction, lemmatization, etc.), and the search vector or feature set is compared against candidate vectors or feature sets associated with the response classifiers (which may themselves be stored or represented in a format that can be compared to the search vector or feature set). In some cases, the confidence scores may be based on a distance between the search vector or feature set and the candidate vectors or feature sets associated with the response identifiers (e.g., a Levenshtein distance, cosine distance, etc.). Other techniques for determining the user's intent and/or generating intent confidence scores are also contemplated, and may include or leverage machine learning models, large language models, neural networks, sentiment analyses, and the like.

The generative content service 220 may implement a content service 226, which is able take the intent confidence scores, the results of the analysis modules 222, 224 (e.g., the keyword and/or semantic feature sets), and/or the natural language user input in order to formulate content requests that are served to one or more of the content stores 230, 240, 250. As described herein, each content store 230, 240, 250 may be associated with a different type or category of content, each of which may be associated with a different platform or software service, and each of which may be used to satisfy a certain type of user intent. For example, the content store 230 may be associated with an issue tracking platform, and may include issue records, forms, workflows, and/or other content that is used by the issue tracking platform to provide the particular functionality of the issue tracking platform. As described herein, in the context of the collaboration platforms described herein, such content may be used to satisfy a user request for an action (e.g., forms may be used to complete or advance actions within the collaboration platform). As one example, a user query may include a request for a new laptop (e.g., "I need a new laptop"). A content request to the content store 230 based on this natural language input (e.g., using the feature sets produced by the query analysis service 212) may return a candidate form that can be used to initiate a request for a new laptop.

The content store 240 may be associated with a knowledge base or document platform (e.g., a content collaboration platform for creating, editing, and accessing user-generated or other documents), and may include documents and/or other content that is used by the knowledge base or content collaboration platform to provide the particular functionality of the knowledge base or content collaboration. As described herein, such content may be used to satisfy a user request for information (e.g., documents or other content in the knowledge base may contain information that is relevant to user queries). As one example, a user query may include a request for information about a company's vacation policy (e.g., "how much vacation do I get?"). A content request to the content store 240 based on this natural language input (e.g., using the feature sets produced by the query analysis service 212) may return a document that outlines the company's vacation policy.

The content store 250 may be a user contact content store, and may include user contact information and/or other content that represents users and/or their relationships to other users or other entities in a collaborative platform. For example, the content store 250 may include contact information (e.g., email addresses, chat handles, telephone numbers, etc.) for various users. The content store 250 may also include or represent relationships between users, such as hierarchical or organizational relationships, teams, departments, and the like. The content store 250 may also include user information that can be used to find or search for particular users, such as job titles, project assignments, office locations, job responsibilities, and the like. As described herein, such content may be used to satisfy a user request for a user contact. As one example, a user query may include a request to contact a local human resources representative to discuss health care benefits (e.g., "who can I talk to in my office about my health insurance?"). A content request to the content store 250 based on this natural language input (e.g., using the feature sets produced by the query analysis service 212) may return one or more candidate user identifiers who satisfy the query criteria.

As described herein, the content service 226 may formulate respective content requests to be provided to each of the respective content stores 230, 240, 250. Each content request may include a feature set or other analysis of the user input, as generated by one or more of the analysis modules 222, 223. For platforms or content stores hosting secure content, the request may also include authentication data including, for example authentication credentials, an authentication token, certificate, or other data element that can be used for authenticating the user (e.g., the user who provided the natural language input). The authentication data may be obtained from a trusted authentication service or passed along by the hosting platform or service. The content service 226 may be provided access on par with or no greater than access granted to the user initiating the request or providing the user input. The content request may also be formulated in accordance with platform or content-store specific schema and, in some implementations, is provided as an application programming interface (API) call. The content requests may be paired or grouped in accordance with common or shared search classifiers such that a shared or common feature set may be used for each of the requests in the group. Grouped requests may be executed concurrently, may be executed in series, or in an order determined by content service 226. Examples of issuing content requests to the content stores 230, 240, 250, including the order or manner in which such requests are issued, and the criteria that determine how they are issued, are described herein with respect to FIGS. 2B-2D.

In response to a respective content request, each platform or content store 230, 240, 250 may conduct a search of its content items in order to provide results that are passed back to the content service 226. The content items may be stored in a shared directory, workspace, or other content partition or group. The items may also be distributed across a platform or content provider.

In the example system 200, each of the content stores (or platforms hosting or associated with the content stores) may be associated with a set of designated content. The designated content may include electronic resources that have been developed or identified as containing accurate and/or verified content. The designated content may also include additional resources including contact information in the form of an electronic contact address (e.g., an email address or chat service user profile, link to user directory entry). The content may be "designated" by providing a particular path or content ID of the content in a registry of the content service 226. In other examples, the content may be designated by the specific platform and identified using a tag or other data attribute that is defined by or used by the respective platform. The designated content may be selected based on a predicted veracity or vetting conducted by platform operators. In some cases, the content sources limit their search operations and results to only designated content. In other cases, the content sources search and provide results from any available content items.

The content items in the content stores may include text content also referred to herein as textual content. The content items may also include structured data including non-textual content including, multimedia content, issue or ticket objects, or platform-specific content. As used herein, the terms "structured content" may be used to refer to non-text content that has been formatted or is stored in accordance with a predefined schema or format. The system 200 may be configured to access and analyze some structured content but other structured content may be considered proprietary or unavailable for system access. For such structured content, the system 200 may pass along a link or reference to the structured content and omit more detailed analysis of the content.

In response to content requests, each platform served with a request may produce a set of results, which may include content items, extracted text, aggregated search results or other forms of content corresponding to the feature sets provided in each respective request.

In some cases, as described herein, only a single content store may be searched in response to a user query, such as when the intent analysis module 213 identifies a high intent confidence score for a request type that is associate with that content store. In other cases, multiple content stores may be searched, such as when no single intent confidence score satisfies a confidence condition. In the latter case, the results returned by the respective content stores may be aggregated by the generative content service 220. The aggregated results may be processed to extract top-scoring or top ranking results, which may be used to formulate a prompt using the prompt service 228.

In some cases, the results from the searches of the content stores may include text snippet portions. The service 220 may, for example, identify text blocks in each returned content item or otherwise referenced in the search results and may extract respective text snippet portions that include a least an extraction threshold number of sentences or phrases. For example, the first two sentences of each text block (e.g., paragraph, section, or other grouping of text) may be extracted as a text snipped portion. In other examples, the first three, four, five or six sentences or phrases are extracted from each respective text block. In some cases, the extraction threshold number of sentences is scaled for each text block such that an approximate percentage or ratio of text is extracted from each text block. In other cases, a natural language processing technique is used to identify topic and supporting sentences, which are extracted as text snippet portions. Other natural language processing techniques may eliminate text that is predicted to be contextual, redundant, or non-essential to the text block and remaining text is designated as the respective text snippet portion.

Results from content requests (e.g., searches) of the content stores (whether from a single content store or multiple content stores) may be analyzed by the generative content service 220 to predict a responsiveness of the results to the natural language input of the user's query. For example, the generative content service 220 may include or reference a response confidence analysis model that ranks at least a subset of the results from the content store searches. The response confidence analysis model may accept, as inputs, text snippets (or other portions) from content items returned by a search of a content store, entire content items, the natural language input, the search feature set(s), and/or the intent confidence score(s) associated with the natural language input. The response confidence analysis model may return a ranking of at least a subset of the results from the first search, the second search, and the third search (or however many searches were performed). The ranking may rank the responses based on their predicted responsiveness to the natural language input. Example criteria for predicting the responsiveness include accuracy, conciseness, and coverage.

Evaluating the results from the searches may include evaluating the responsiveness of the text snippet portions (or other portions of content items that have been returned by the content stores as candidate results to the query) with respect to the natural language user input or a representative thereof. For example, each text snippet portion may be subjected to an embedding operation and/or generate a multi-dimensional vector representation of the text. An example embedding operation may add synonyms and predicted corresponding words to words or phrases of the respective text snippet. Additionally, the text snippets may be represented as a vector or other multi-dimensional data element allowing for comparison to a similarly vectorized or processed representation of the natural language user input. For example, a representative vector may be constructed using a word vectorization service that maps words or phrases into a vector of numbers or other characters. A comparison of each vector or other representation may be performed with respect to the user input to determine a degree of correlation or similarity. In one example implementation, a cosine similarity or other similar comparison is performed between respective vectors and a score or value is determined for each pairing. The evaluated snippets may be ranked or sorted by degree of correlation and a subset of snippets may be selected for use in constructing a prompt. In some cases, a threshold score or other degree of correlation is used to select the subset of snippets. In other cases, a threshold number of top scoring results are selected. In other examples, the top-scoring results that provide a threshold number of characters or aggregated snippet size are selected.

The ranking of results by the response confidence analysis model may also be based at least in part on the respective intent confidence scores associated with the natural language input. In this way, the response confidence analysis model may help identify situations where a better response may be provided by content from a source that was not predicted to best satisfy the user intent. For example, a user may submit a query that is associated with a high intent confidence score (e.g., "I want to take bereavement leave" may have a high intent confidence for requesting an action), but for which no form exists. However, a document in a knowledge base (which was associated with a lower intent confidence score) may have a document describing the types of leaves available to the user in an organization. Thus, in this case, despite the response classifier for "requesting information" (e.g., a knowledge base search) having a lower intent confidence score than "requesting an action" (e.g., an issue tracking platform search), the result from the knowledge base may have a higher response confidence score than that from the issue tracking platform. Thus, the response confidence analysis model may cause the generative content service 220 to produce a generative response based on the response with the higher response confidence score. The response confidence analysis model may include or use machine learning models, large language models, neural networks, sentiment analyses, and the like, in order to rank and/or determine confidence scores of the candidate responses.

The selected results (e.g., the text snippets or other portions of the returned results form a content store search) may then be used by the prompt service 228 to construct a prompt that is designed to provoke a relevant and useful generative response from the generative output service. The prompt service 228 may combine content from the results (e.g., text snippets), context data, at least a portion of the user input, and predetermined prompt text (also referred to as predetermined query prompt text, template prompt text, or simply prompt text) in order to generate or complete the prompt that will be transmitted to the generative output service 270. The predetermined prompt text may include one of a number of predetermined phrases that provide instructions to the generative output service 270 including, without limitation, formatting instructions regarding a preferred length of the response, instructions regarding the tone of the response, instructions regarding the format of the response, instructions regarding prohibited words or phrases to be included in the response, context information that may be specific to the tenant or to the platform, and other predetermined instructions. In some cases, the predetermined prompt text includes a set of example input-output data pairs that may be used to provide example formatting, tone, and style of the expected generative response. In some cases, the predetermined prompt text includes special instructions to help prevent hallucinations in the response or other potential inaccuracies. The predetermined prompt text may also be pre-populated with exemplary content extracted from the platform's content item representing an ideal or reference output, which may reflect a style and tone of the tenant or content hosted on the platform.

In some implementations, the generative content service 220 may also obtain or extract context data that is used to improve or further customize the prompt for a particular user, current session, or use history. In one example, the generative content service 220 may obtain a user profile associated with an authenticated user operating the frontend that produced the user input. The user profile may include information about the user's role, job title, or content permissions classification, which may indicate the type of content that the user is likely to consume or produce. The role classification may be used to construct specific prompt language that is intended to tailor the generative response to the particular user. For example, a user having a role or job title associated with a technical position, the generative content service 220 may add text like "provide an answer understandable to a level 1 engineer." Similarly, for a user having a non-technical role or job title, the generative content service 220 may add text to the prompt like, "provide an answer understandable to person without a technical background." Additionally or alternatively, other context data may be obtained, which may be used to generate specific text designed to prompt a particular level of detail or tone of the generative response. Other context data includes content items that are currently or recently open in the current session, user event logs or other logs that indicate content that has been read or produced by the authenticated user, organizational information that indicates the authenticated user's supervisors and/or reporting employees and current role, and other similar context data. In some cases, a personalized query log is referenced, which includes the user's past queries or search history and an indication of successful (or non-responsive) results may be used as context data. Based on prior search results, the generative content service 220 may further supplement to include language that improved past results or omit language that produced non-responsive or otherwise unsatisfactory results.

In some implementations, the generative content service 220 may generate block-specific tags or text that is associated with each block of text inserted into the prompt. The tag may be string of numbers and/or letters and may be used to identify the content item from which the block of text or segment of text was extracted. The tag may be an unassociated string of characters that does not inherently indicate a source of the text but can be used by the system, via a registry or some other reference object, to identify the source of the text. In other cases, the tag may include at least a portion of the content identifier, name of the content item, or other characters from which the source of the text can be directly inferred without a registry or reference object. In either configuration, the prompt may include predetermined prompt text that includes instructions for maintaining a record of tags which are used to generate the generative response. Accordingly, the generative content service 220 may include a corresponding set of tags in the generative response that indicate which text blocks or snippets of text were used to generate the body of the generative response. This second set or corresponding set of tags may be used by the generative content service 220 or other aspect of the system, to generate links, selectable icons, or other graphical objects that are presented to the user. Selection of the generated objects may cause a redirection of the graphical user interface to the respective content item, whether on the same platform or on a different platform. By using a tagging technique, the user may easily select a generated link in order to review the source material or to perform more extensive research into the subject matter of the generative response. If permitted by the generative output service 270, reference to the content items (e.g., a URL or other addressable location) may be passed to the generative output service 270 using the prompt and the prompt may include instructions to maintain or preserve the reference to the content items, which can be used to generate the links displayed in the interface with the generative response.

In accordance with other examples described herein, the prompt generated by the prompt service 228 may be communicated to the generative output service 270 via the prompt management service 260 or prompt gateway. The prompt management service 260 may manage requests or input from multiple generative services in order to provide a single or shared gateway access to the generative output service 270. In implementations in which the generative output service 270 is an external service, the prompt may be communicated to the external generative output service 270 using an application programming interface (API) call. In some cases, the prompt is provided to the generative output service 270 using a JSON file format or other schema recognized by the generative output service 270. If the generative output service 270 is an integrated service, other techniques may be used to communicate the prompt to the generative output service 270 as provided by the architecture of the platform including passing a reference or pointer to the prompt, writing the prompt to a designated location, or other similar internal data transfer technique. As described throughout herein, the generative output service 270 may include a large language model or other predictive engine that is adapted to produce or synthesize content in response to a given prompt. The generative response is unique to the prompt and different prompts, containing different prompt text, will result in a different generative response.

In response to the prompt, the generative output service 270 sends a generative response to the generative content service 220. The generative content service 220 or a related service may perform post processing on the generative response including validation of the response, filtering operations to remove prohibited or non-preferred terms, eliminate potentially inaccurate phrases or terms, or perform other post-processing operations. As discussed above, the generative content service 220 may also process any tags or similar items returned in the generative response that indicate the source of content that was used for the generative response. The generative content service 220 or a related service may generate links, icons, or other selectable objects to be rendered/displayed in the generative content interface. Subsequent to any post-processing operations, the generative response, or portions thereof, are communicated to the frontend application for display in the generative content interface. In some implementations, the generative content service 220 may also receive express feedback provided via the interface regarding the suitability or accuracy of the results. The generative content service 220 may also provide feedback that results from object selections, dwell time on the generative response, subsequent queries, and other user interaction events that may signal positive or negative feedback, which may be used to train intent recognition modules or other aspects of the system 200 to improve the accuracy and performance of subsequent responses.

In the present example the generative response and/or a postprocessed version of the generative response is passed back to the intake service 210, which may cause display of at least a portion of the generative response in the generative interface or other respective interface. In the example where the input is received via the chat service 204, the generative response may be displayed in a reply or message of the chat interface. Similarly, in the example in which the input was received from a search portal 202, the results may be displayed in a response region or other designated portion of the corresponding search interface. In the example in which the user input is provided to a generative content interface or generative interface, the response is displayed in a corresponding region of that interface. Example responses are depicted in the graphical user interfaces of FIGS. 5A-6B, described below.

The generative content service 220 may also provide or suggest additional actions or link to additional services in response to the generative response. For example, as shown in FIG. 2A, the generative content service 220 may provide links or an interface to a chat service 204 or to other content creation services 214. The chat service 204 may be used to direct the user to a human operator, chatbot, or other additional resources that may be relevant to the generative response and/or user input. The generative content service 220 may also direct the user to external content creation services 214, which may include a documentation service, project management service or issue tracking service. As described in more detail below with respect to FIGS. 7-9, the service may link to an issue-creation form or issue intake portal flow in accordance with the generative response and/or user input. Selectable graphical objects or other interface elements may be displayed or rendered in the generative content interface for providing access to these and other selected services.

The generative content service 220 or a related service may receive feedback or user validation from user accounts that are identified as having a subject matter expertise related to the generative response. The service or system may, in response to receiving a positive feedback from an account flagged as having appropriate subject matter expertise (e.g., associated subject matter expertise has a threshold similarity to the subject matter of the generative response), the service or system may designate the generative response as verified or endorsed. In some cases, a graphical object corresponding to the verification or endorsement is displayed with the generative response in the corresponding interface. In some cases, verified or endorsed content is cached or saved and used for future responses or for use in subsequent prompts as an example input output pair or as an exemplary response.

In some instances, the generative content service 220 may include instructions to provide a response confidence score with any generative response. The response confidence of a generative response score may indicate an estimated confidence in the accuracy or relevancy of the generative response. If the provided response confidence score falls below a threshold or fails to satisfy a confidence criteria, the generative content service 220 may not cause the generative response to be displayed in the generative interface. In one example, a generative response having a confidence interval of less than 50% is not displayed. In some cases, a generative response having a confidence interval of less than 60% is not displayed. In some cases, a generative response having a confidence interval of less than 70% is not displayed. In some cases, a generative response having a confidence interval of less than 80% is not displayed. In some cases, the display of the response is suppressed or otherwise not displayed. In some cases, a message indicating that an answer or response is currently not available or other similar message may be displayed in the generative answer interface.

The system 200 may also include a persistence module 225 that can be used to store data from a particular session or series of sessions with a user. The persistence module 225 may store, for example, recent or selected previously utilized elements of the system 200 including previous user input, previous generative responses, previous content retrieved in response to content requests, and other elements generated in a previous or recent interaction with the system. The previous data elements may be stored as an event log or user interaction log and may be arranged chronologically or by topic. In order to preserve user privacy and/or content confidentiality, the memory or cache of the persistence module 225 may either be partitioned by user or cleared when a session is predicted to be completed.

FIGS. 2B-2D depict example processing operations for identifying content, in a content collaboration platform, that is relevant to a user's query, and generating a response. The processing operations and techniques described with respect to FIGS. 2B-2D may be implemented in or by a system such as the system 200 in FIG. 2A.

As shown, a query 269 may be processed (operation 272) to determine one or more feature sets, such as a keyword feature set and a semantic feature set. The feature sets may be determined, for example, by the query analysis service 212 (FIG. 2A).

The query 269 may also be processed to determine a user intent (operation 272). More particularly, the query may be processed to determine intent confidence scores with respect to a set of request classifiers. Continuing examples from above, the request classifiers may include a first request classifier associated with a request for an action, a second request classifier associated with a request for information, and a third request classifier associated with a request for a contact (among other possible request classifiers). These request classifiers may be associated with different platforms and/or different content stores, such as an issue tracking platform content store 275 (e.g., a forms content store), a document content store 276 (e.g., a knowledge base content store), and user contact content store 277. The content stores 275, 276, 277 may generally correspond to the content stores 230, 240, and 250, respectively, of FIG. 2A. As described herein, the particular content store that is searched initially (or preferentially) may be selected based on the intent confidence scores for each type of classifier, as shown in FIG. 2C. In some cases, other content stores may be searched if a result from a first search operation does not produce a result with a sufficient result confidence, as shown in FIG. 2D.

With reference to FIG. 2B, searches (e.g., content requests) that include one or more of the search feature sets 273, 274 may be issued to the content stores. Each search or content request may return results and confidence scores for each result. For example, the search of the first content store 275 may return results (e.g., forms and/or form identifiers) and confidence scores for each result (item 279); the search of the second content store 276 may return results (e.g., documents or portions of documents) and confidence scores for each result (item 280); the search of the third content store 277 may return results (e.g., user contact information) and confidence scores for each result (item 281).

The results from one or more content store searches may be analyzed (operation 282) to predict their responsiveness to the query 269. The analysis may be performed using a response confidence analysis model, as described with respect to FIG. 2A, and may use inputs such as the search results and their respective confidence scores from the content store search operations (e.g., items 279, 280, 281), as well as the initial query 269 (e.g., the natural language input), an intent confidence score or ranking (of one or more response classifiers), and optionally other information (e.g., search feature sets), represented by item 278. In some cases, as described herein, the result analysis may determine how the response generation process proceeds, and for example, whether a response is produced based on a single search of a single content store, or whether results from multiple content stores are retrieved and/or used to generate a generative response.

Based on the results analysis (operation 282), a generative response 284 may be produced (operation 283). The generative response 284 may be produced by constructing a prompt (e.g., prompt service 228, FIG. 2A), and providing the prompt to a generative output service (e.g., generative output service 270, FIG. 2A). As described herein, the response may be based on and/or include content from the search results. In some cases, the response may include summaries of or portions of content items, links to content items, links to pre-populated or pre-filled forms, requests for additional information (e.g., to refine a search or response, or to further complete a form), a user contact, or the like.

FIG. 2C illustrates an example portion of a generative response process, in which an intent confidence score for a single request classifier satisfies an intent confidence condition. In particular, the intent confidence score for the request classifier associated with a request for action (which may be satisfied by completion and/or submission of a predefined form of an issue tracking platform) satisfies the intent confidence condition. Accordingly, the generative response process proceeds with a search of only the first content store 275 (indicated by bold lines).

After results 279 are returned from the content request, the results may be analyzed to determine response confidence scores (or a ranking of results based on response confidence scores). If the results satisfy a response confidence condition, they may be used to produce the generative response 284.

If the analysis 282 of the results indicates that the results do not satisfy a result confidence condition, the generative response process may attempt to find content that can satisfy the user's request in other content stores. FIG. 2D illustrates an example portion of the generative response process in an example scenario where the results 279 from the initial processing operations (e.g., corresponding to the initial intent confidence score) did not satisfy the response confidence condition (and/or a generative response based on the results 279 did not satisfy a confidence condition). As shown, the generative response process searches the content stores 276, 277 that were not initially searched (e.g., the content stores associated with response classifiers that did not satisfy an intent confidence condition), as indicated by bold lines.

After results 280, 281 are returned from the content requests to the second and third content stores, the results from each content store may be analyzed to determine response confidence scores (or a ranking of results based on response confidence scores). In some cases, one or more of the highest ranking results may be used to produce the generative response 284. In some cases, if none of the results satisfy a result confidence condition, the generative content service may not provide any response, or may provide a response that does not include or is not based on results from the content stores.

In some cases, operations described with respect to FIG. 2D may occur substantially simultaneously with operations described with respect to FIG. 2C. For example, the generative content service may perform searches or issue content requests to all of the available content stores, even if the intent analysis strongly indicates that the query will be satisfied by content from one particular content store. In this way, if the results from the search of the initial selected content store do not produce a suitable result (e.g., the results do not satisfy the response confidence condition and/or a generative response based on the results 279 did not satisfy a confidence condition), the searches of the other content stores will already have been completed and the results ready for analysis. Of course, in some cases, the other content stores (e.g., associated with lower-scoring intent determinations) may not be searched until and unless the initial search operation does not return suitable results.

As yet another example, an intent analysis of the natural language input may not determine a search sequence or process flow, but rather may be used in a wholesale analysis of results from each content store. For example, in response to the query, all content stores may be searched or queried (with the search feature sets) to identify candidate content items that may be responsive to the query. The results may then be analyzed as described herein to determine a ranking of at least a subset of the results from each search, where the ranking is based at least in part the intent confidence scores associated with each content store or platform. For example, results from platforms associated with higher intent confidence scores may be ranked higher than results from lower-ranked platforms, all else being equal.

FIG. 2E depicts an example processing operation for identifying a form in an issue tracking platform. Forms may be defined by or include user-fillable data structures that include input fields. The input fields may be predefined for a given form (and its associated action) based on the particular information that is needed or used in order to effectuate or complete the action. For example, a form for requesting a new laptop may include input fields such as a user identifier (e.g., the user who is requesting the new laptop), a date of the request, an explanation of why the laptop is required, a status of the user's current laptop, a selection of software programs that the user needs on the laptop, and so forth. These fields may be populated manually by a user (e.g., a user requesting the action, a service desk technician, a generative content service, or combinations of these.

Forms may be part of or associated with issue records (which may also be referred to as issue tickets) in an issue tracking platform. As described herein, issue records, and the forms with which they are associated, may be content items that are used in an issue tracking platform, or a collaboration platform more generally, to effectuate or complete an action. In particular, raising an issue may initiate a workflow or procedure that will ultimately accomplish an action requested by a user. For example, a user request for a new laptop corresponds to request for an action, which can be accomplished by generating an appropriate issue record (or issue ticket) within an issue tracking platform. As another example, a user request to authorize a vacation day corresponds to a request for an action, which can also be accomplished by generating an appropriate issue record. When creating an issue record, the issue record may be associated with a particular form (e.g., the issue record may be associated with or may include a request-type identifier, which identifies a particular predefined form). In some cases, the form defines what information the issue record requires, and may cause particular user interface elements to be displayed for that issue record. For example, the particular form that is selected for a given issue record may determine what data entry fields are displayed to a user for creating or completing the issue record.

As described herein, one possible intent that may be inferred from a user's query in a generative content interface is a request for an action. In such cases, the generative content service may preferentially search for a form (or initiate a form completion operation) in order to accomplish the particular action. FIG. 2E illustrates one example processing operation for identifying a form, in an issue tracking platform, that will best satisfy the user's request. This operation may correspond, for example, to searching the issue tracking platform content store 275 as described with respect to FIGS. 2A-2D.

As shown in FIG. 2E, search feature set(s) 271 (e.g., corresponding to the keyword feature set 273 and/or the semantic feature set 274) may be used to search a forms content store 285. The forms content store 285 may store predefined forms (and/or portions of forms) that are used in the issue tracking platform. The forms may include various types of data or other information that can be searched to identify relevant form results. For example, forms may include form titles, form descriptions (e.g., a textual description of the form and/or what the form is used for), input field identifiers and descriptions (e.g., textual names and/or descriptions of the information required in the input fields), form keywords (e.g., lists of keywords that may be associated with the form), and the like. Such information may be part of the form data structure itself, or may be part of a metadata data structure (e.g., a data structure that is associated with the form and provides additional information about the form, its contents, its uses, etc.).

As described above, in some cases, searching among the forms directly may not identify a relevant form. For example, if a user is requesting "bereavement leave," a vacation request form that does not list "bereavement" may not be identified. Accordingly, in some cases, searching the issue tracking platform also includes searching among existing issue records in order to identify a form that may be responsive to a user's request. More particularly, as noted above, issue records may be associated with one or more forms, and may also include additional contextual information about a particular request than just the form itself. Thus, by searching among issue records as well (e.g., textual descriptions or other information that is provided when creating an issue record), it may be possible to find relevant forms that might be overlooked when searching among forms alone. Continuing the example above, while there may be no form that mentions or relates to "bereavement leave," there may be issue records that include a description that is relevant to the user's request (e.g., "user A wants to take off from Aug. 1, 2000 to Aug. 4, 2000 for bereavement leave") and for which a "vacation request form" was used. As noted, the link between an issue record and a form may be via a request-type identifier of the issue, which may correspond to a particular form.

Returning to FIG. 2E, the search feature set(s) 271 (e.g., corresponding to the keyword feature set 273 and/or the semantic feature set 274) may be used to search an issue records content store 286. The issue records content store 286 may store issue records 287 (e.g., 287-1, . . . , 287-n). The issue records 287 may be associated with or include a request type identifier 289 and issue record content 290. As noted above, the request type identifier 289 may correspond to or indicate a particular predefined form (or forms) that were used to complete the issue (e.g., accomplish the request associated with the issue). The issue records 287 may also be associated with issue record content 290, which may include textual descriptions of the issue (e.g., generated by a user such as a service agent or a requesting user), information about the requesting user, relevant dates, an issue status (e.g., open, in progress, resolved, complete, etc.), and the like. As described herein, the request type identifier 289 may be selected by the user who created the issue record. Accordingly, the association between the request type identifier 289 (and its associated form(s)) and the issue record content indicates a high confidence that the selected form will satisfy the user's request.

The search feature set(s) 271 may be used to search the issue records 287 (e.g., the issue record content 290), and identify issue records that may be relevant to the search feature sets, and thus identify the forms (via the request type identifiers 289, for example) that may be useful for addressing the initial user request.

The results of the search of the form content store 285 and of the issue records content store 286 may be analyzed (operation 292). For example, the search operations of the content stores may produce a confidence score for each form identified via the two searches, and the forms may be ranked based on their confidence score. Forms whose confidence scores do not satisfy a confidence condition may be filtered or omitted from the results. In some cases, if no form satisfies a confidence condition, no results (e.g., a null result) will be indicated.

Once the search results are produced (and optionally filtered based on confidence scores or other factors), at least a subset of the results (e.g., forms and/or form identifiers) along with their confidence scores 279 may be passed for further processing (e.g., for analysis at operation 282 in FIG. 2B). As described herein, if a form from the issue tracking platform is ultimately predicted to be responsive to the user's query, the form may be used by the generative content service to respond to the user. The response from the generative content service may include providing a link to the form, partially or fully prepopulating the form, generating an issue record that includes the form, requesting additional information from the user in order to complete the form, or the like.

FIGS. 3A-3B depict system diagrams and network/communication architectures that may support a system as described herein, and in particular, may support the process of generating a generative response for submission to a user. The generative response may be based on or use results from the search operations described herein, or may be based on other information.

Referring to FIG. 3A, the system 300a includes a first set of host servers 302 associated with one or more software platform backends. These software platform backends can be communicably coupled to a second set of host servers 304 purpose configured to process requests and responses to and from one or more generative output services 306.

Specifically, the first set of host servers 302 (which, as described above can include processors, memory, storage, network communications, and any other suitable physical hardware cooperating to instantiate software) can allocate certain resources to instantiate a first and second platform backend, such as a first platform backend 308 and a second platform backend 310. Each of these respective backends can be instantiated by cooperation of processing and memory resources associated to each respective backend. As illustrated, such dedicated resources are identified as the resource allocations 308a and the resource allocations 310a.

Each of these platform backends can be communicably coupled to an authentication gateway 312 configured to verify, by querying a permissions table, directory service, or other authentication system (represented by the database 312a) whether a particular request for generative output from a particular user is authorized.

For example, the user may not have access to information stored in an issue tracking platform. In this example, if the user submits a request that in any way references the issue tracking platform, the authentication gateway 312 can deny the request for insufficient permissions. This example is merely one and is not intended to be limiting; many possible authorization and authentication operations can be performed by the authentication gateway 312. The authentication gateway 312 may be supported by physical hardware resources, such as a processor and memory, represented by the resource allocations 312b.

Once the authentication gateway 312 determines that a request from a user of either platform is authorized to access data or resources implicated in service that request, the request may be passed to a security gateway 314, which may be a software instance supported by physical hardware identified in FIG. 3A as the resource allocations 314a. The security gateway 314 may be configured to determine whether the request itself conforms to one or more policies or rules (data and/or executable representations of which may be stored in a database 316) established by the organization. For example, the organization may prohibit executing prompts for offensive content, value-incompatible content, personally identifying information, health information, trade secret information, unreleased product information, secret project information, and the like. In other cases, a request may be denied by the security gateway 314 if the prompt requests beyond a threshold quantity of data.

Once a particular user-initiated prompt has been sufficiently authorized and cleared against organization-specific generative output rules, the request/prompt can be passed to a preconditioning and hydration service 318 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 318 can be a software instance supported by physical hardware represented by the resource allocations 318a. In some implementations, the hydration service 318 may also be used to rehydrate personally identifiable information (PII) or other potentially sensitive data that has been extracted from a request or data exchange in the system.

One a prompt has been modified, replaced, or hydrated by the preconditioning and hydration service 318, it may be passed to an output gateway 320 (also referred to as a continuation gateway or an output queue). The output gateway 320 may be responsible for enqueuing and/or ordering different requests from different users or different software platforms based on priority, time order, or other metrics. The output gateway 320 can also serve to meter requests to the generative output services 306.

FIG. 3B depicts a functional system diagram of the system 300a depicted in FIG. 3A. In particular, the system 300b is configured to operate as a multiplatform prompt management service supporting and ordering requests from multiple users across multiple platforms. In particular, a user input 322 may be received at a platform frontend 324. The platform frontend 324 passes the input to a prompt management service 326 that formalizes a prompt suitable for input to a generative output service 328, which in turn can provide its output to an output router 330 that may direct generative output to a suitable destination. For example, the output router 330 may execute API requests generated by the generative output service 328, may submit text responses back to the platform frontend 324, may wrap a text output of the generative output service 328 in an API request to update a backend of the platform associated with the platform frontend 324, or may perform other operations.

Specifically, the user input 322 (which may be an engagement with a button, typed text input, spoken input, chat box input, and the like) can be provided to a graphical user interface 332 of the platform frontend 324. The graphical user interface 332 can be communicably coupled to a security gateway 334 of the prompt management service 326 that may be configured to determine whether the user input 322 is authorized to execute and/or complies with organization-specific rules.

The security gateway 334 may provide output to a prompt selector 336 which can be configured to select a prompt template from a database of preconfigured prompts, templatized prompts, or engineered templatized prompts. Once the raw user input is transformed into a string prompt, the prompt may be provided as input to a request queue 338 that orders different user request for input from the generative output service 328. Output of the request queue 338 can be provided as input to a prompt hydrator 340 configured to populate template fields, add context identifiers, supplement the prompt, and perform other normalization operations described herein. In other cases, the prompt hydrator 340 can be configured to segment a single prompt into multiple discrete requests, which may be interdependent or may be independent.

Thereafter, the modified prompt(s) can be provided as input to an output queue at 342 that may serve to meter inputs provided to the generative output service 328.

These foregoing embodiments depicted in FIG. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, although many constructions are possible, FIG. 4A depicts a simplified system diagram and data processing pipeline as described herein. The system 400a receives user input, and constructs a prompt therefrom at operation 402. After constructing a suitable prompt, and populating template fields, selecting appropriate instructions and examples for an LLM to continue, the modified constructed prompt is provided as input to a generative output service 404. A continuation from the generative output service 404 is provided as input to a router 406 configured to classify the output of the generative output service 404 as being directed to one or more destinations. For example, the router 406 may determine that a particular generative output is an API request that should be executed against a particular API (e.g., such as an API of a system or platform as described herein). In this example, the router 406 may direct the output to an API request handler 408. In another example, the router 406 may determine that the generative output may be suitably directed to a graphical user interface/ frontend.

Another example architecture is shown in FIG. 4B, illustrating a system providing prompt management, and in particular multiplatform prompt management as a service. The system 400b is instantiated over cloud resources, which may be provisioned from a pool of resources in one or more locations (e.g., datacenters). In the illustrated embodiment, the provisioned resources are identified as the multi-platform host services 412.

The multi-platform host services 412 can receive input from one or more users in a variety of ways. For example, some users may provide input via an editor region 414 of a frontend, such as described above. Other users may provide input by engaging with other user interface elements 416 unrelated to common or shared features across multiple platforms. Specifically, the second user may provide input to the multi-platform host services 412 by engaging with one or more platform-specific user interface elements. In yet further examples, one or more frontends or backends can be configured to automatically generate one or more prompts for continuation by generative output services as described herein. More generally, in many cases, user input may not be required and prompts may be requested and/or engineered automatically.

The multi-platform host services 412 can include multiple software instances or microservices each configured to receive user inputs and/or proposed prompts and configured to provide, as output, an engineered prompt. In many cases, these instances—shown in the figure as the platform-specific prompt engineering services 418, 420—can be configured to wrap proposed prompts within engineered prompts retrieved from a database such as described above.

In many cases, the platform-specific prompt engineering services 418, 420 can be each configured to authenticate requests received from various sources. In other cases, requests from editor regions or other user interface elements of particular frontends can be first received by one or more authenticator instances, such as the authentication instances 422, 424. In other cases, a single centralized authentication service can provide authentication as a service to each request before it is forwarded to the platform-specific prompt engineering services 418, 420.

Once a prompt has been engineered/supplemented by one of the platform-specific prompt engineering services 418, 420, it may be passed to a request queue/API request handler 426 configured to generate an API request directed to a generative output service 430 including appropriate API tokens and the engineered prompt as a portion of the body of the API request. In some cases, a service proxy 430 can interpose the platform-specific prompt engineering services 418, 420 and the request queue/API request handler 426, so as to further modify or validate prompts prior to wrapping those prompts in an API call to the generative output service 428 by the request queue/API request handler 426 although this is not required of all embodiments.

These foregoing embodiments depicted in FIG. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output service or system may be used by a multiplatform collaboration system as described herein. In this architecture, authentication, validation, and authorization decisions in respect of business rules regarding requests to the generative output service can be centralized, ensuring auditable control over input to a generative output service or service and auditable control over output from the generative output service. In some constructions, authentication to the generative output service's services may be checked multiple times, by multiple services or service proxies. In some cases, a generative output service can be configured to leverage different training data in response to differently-authenticated requests. In other cases, unauthorized requests for information or generative output may be denied before the request is forwarded to a generative output service, thereby protecting tenant-owned information within a secure internal system. It may be appreciated that many constructions are possible.

Additionally, some generative output services can be configured to discard input and output one a request has been serviced, thereby retaining zero data. Such constructions may be useful to generate output in respect of confidential or otherwise sensitive information. In other cases, such a configuration can enable multi-tenant use of the same generative output service or service, without risking that prior requests by one tenant inform future training that in turn informs a generative output provided to a second tenant. Broadly, some generative output services and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output service (especially when accessed in a centralized manner) by a single requester. Many constructions are possible.

Generative Interface Examples

FIGS. 5A-6B are directed to example graphical user interfaces that demonstrate functionality of a generative interface, as described herein. As described previously, a collaboration platform may include or be integrated with a generative interface that can be used to create generative content. In the examples described below the generative interface may be incorporated into a generative interface panel of the graphical user interface. However, other graphical user interface elements may be used depending on the implementation including, for example, floating window elements, dedicated interface regions, and other types of graphical user interfaces.

Generally, the generative interface may be used to create generative content or generative answers that are responsive to a natural language user input. The generative interface may also be operative as a content-creation and modification service that can be used to create, edit, or adapt content for use with the collaboration system. The generative interface may be operably coupled to or include a language model platform, as described herein, which may be used to automatically generate content in response to text-based prompts and other user input. As described herein, a generative content interface may be operated by a generative content service that is adapted to access and use content from multiple platforms to produce generative responses and ultimately address a user's request.

As described herein, a collaboration platform or service may include an editor that is configured to receive user input and generate user-generated content that is saved as a content item. The terms "collaboration platform" or "collaboration service" may be used to refer to a platform or service that includes a knowledge base (or documentation) platform or service configured to manage electronic documents or pages created by the system users; an issue tracking platform or service that is configured to manage or track issues or tickets in accordance with an issue or ticket workflow; a source-code management platform or service that is configured to manage source code and other aspects of a software product; a manufacturing resource planning platform or service configured to manage inventory, purchases, sales activity or other aspects of a company or enterprise; a contact platform or data store that stores information about system users; and/or other types of platforms or services. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

FIG. 5A depicts an example graphical user interface 500 of a frontend of a content collaboration platform. The content collaboration platform may allow users to create, modify, and access documents (e.g., user generated documents). As used herein, a content collaboration platform may be an example of a knowledge base platform. For example, documents created and/or stored in association with the content collaboration platform may make up (or be contained in) a knowledge base that is used by the generative content service as described herein (e.g., to identify documents that may be responsive to a user's query). The graphical user interface 500 of the content collaboration platform is one example environment from which the generative content service may be accessed, but, as noted herein, it may be accessed from other environments or interfaces as well (e.g., from an issue tracking platform, a messaging platform, a web portal, a chat service, etc.).

The graphical user interface 500 may be provided by a client application (e.g., a fronted application) operating on a client device that is operably coupled to a backend of the content collaboration platform using a computer network. The client application may be a dedicated client application or may be a browser application that accesses the backend of the content collaboration platform using a web-based protocol. As described herein, the client application may operate a frontend of the content collaboration platform and is operably coupled to a backend of the content collaboration platform operating on a server. The following example includes an interface for providing generative services and, more particularly, providing a generative content interface that can be used to produce synthesized or generative content in response to a user input. The techniques and functionality described here can be applied to a variety of different platforms. In the following example, the content collaboration platform is a documentation platform configured to manage content items like user-generated pages or electronic documents.

As shown in FIG. 5A, the graphical user interface 500 includes an editor region 502, also referred to herein as an editor panel or editor pane, that includes user-generated content of the content item. The user-generated content may include text, images, audio and video clips, and other multi-media content. The user may transition the graphical user interface 500 into an editor mode by selecting the edit control 512 on the control bar 510. In the editor mode, the region 502 operates as an editor region and receives user input including text input from a keyboard, object insertions for images and other media, creation of embedded content, comments, labels, tags, and other electronic content. The user may transition the graphical user interface 500 into a content viewer mode by selecting the publish control 514 on the control bar 510. User selection of the publish control 514 may cause the content of the page or electronic document to be saved on the content collaboration platform backend and the page or electronic document may be accessible to other users of the system having been authenticated and having a permissions profile that is consistent with a permissions profile of the page or electronic document. The user may also create new pages or documents by selecting the create control 516, which may initiate the creation of a new page or document which may be populated with user-generated text, links, images, audio, videos, and other content. As shown in the example control bar 510, other controls may also be provided in the graphical user interface including space selection, setting controls, user profile settings, notifications, and other control input for the frontend application.

In general, the user-generated content may be saved in accordance with a platform-specific markup language schema. An example of a platform-specific markup language schema is an Atlassian Document Format (ADF). The term platform-specific schema may be used to refer to a schema that is generally used with a particular platform but may also be used on other platforms having a similar rendering engine or editor functionality and may not be restricted to solely one platform. The user-generated content may be stored by the backend application (e.g., in a document or knowledge base data store) and content may be indexed and a portion of the text content may be stored in an index store, which may allow for efficient and accurate content searching and extraction. In some instances, the page or document may also be designated for use by the generative service, as described above with respect to FIG. 2A.

User-generated pages for a particular document space may be accessible via a navigational panel 504, which include a hierarchical element tree of selectable elements, also referred to as a page tree or document tree. Each element of the hierarchical element tree may be selectable to cause to display of a respective page or document in the editor or content viewing panel 502. Additionally, each of the selectable elements may be dragged and dropped within the navigational panel 504 to a new location within the tree, thereby causing a change or modification in the dependency relationship between the pages or documents.

As shown in the example of FIG. 5A, the graphical user interface 500 includes a generative content interface 520, which may be displayed in response to an invocation or instantiation of a generative service or search service. In the present example, the generative service or other respective service may be invoked and the interface 520 displayed in response to a user input provided to the search control 530, which in this case is a search input or text input field or region. In this particular example, the search control 530 (search input field) receives natural language user input 532-1, which includes the interrogatory "what is the vacation policy?" In other examples, another search control or graphical element may be used to invoke the service used to cause display of the interface 520. Also, while the present example depicts the interface 520 as a floating window that overlaps or overlays the content panel 502 and a portion of the navigation panel 504, in other implementations the interface 520 may occupy an entirety of the content panel 502 or may occupy a substantial entirety of the graphical user interface.

In accordance with the examples provided above, particularly with respect to FIG. 2A, a user input 532-1 provided to the search control 530 (search input control) may result in the display of a generative response 542, which may take the form of a generative answer responsive to an interrogatory of the user input 532-1. The generative response 542 may be synthesized using content from one or more data stores, and may be specifically tailored for satisfying the user's request. For example, the generative response 542 may be generated by and/or using the processes described with respect to FIGS. 2B-2E.

The generative response 542 may be presented in a chat or messaging format in which the user is identified by icon or indicia 524. In some implementations, the generative response 542 also includes an indicia, which may provide an appearance similar to a user icon or indicia 524 to simulate a conversation with another user or human assistant. A detailed description of example techniques for producing the generative response are provided above and are not repeated with respect to this figure to reduce redundancy.

The generative response 542 is displayed in a response region 540 which may include other generative results and other related content. In this example the response region 540 also includes a set of selectable objects 544 (e.g., links, icons, or other graphical elements) that correspond to the generative response 542. As described previously, the selectable objects 544 may correspond to content items having content that was extracted and used to formulate or synthesize the generative response 542. Selection of the selectable objects 544 may cause the graphical user interface 500 to be redirected to a respective platform and content item that corresponds to the respective selectable object 544. The response region 540 also includes controls 546 that may be used to provide feedback on the quality or accuracy of the generative response 542. In some cases, the controls 546 include a text input field for correcting or editing the generative response 542, which may be used to improve future results. In some cases, the controls 546 may also include the ability to validate or verify the content by endorsing the answer. Validated or verified generative content may be stored and used for subsequent responses. In some cases, the reputation score or subject matter expertise of the validating or verifying user is referenced before the content is designated as validated or verified. In some cases, users must have a sufficient reputation score or designated subject matter expertise before validation controls are active or effectual on the answer.

The interface 520 may also include one or more insertion controls 526 that allow insertion of all or a portion of the generative response 542 to be inserted into user generated content of an editor region 502 of a graphical user interface 500. The insertion controls 526 may also be selectable to cause the generative response 542 or a link to the generative content to be copied, which may be inserted or pasted into a region of the graphical user interface 500 or a graphical user interface of another platform. The interface 520 may also allow for selection of a portion of the generative response 542 to be selected and inserted using the insertion control 526 or other user-selectable object or control.

The generative interface 520 may also include an input field 522, which may be used to receive new inquires or follow-up inquiries to obtain more detailed information or direct the inquiry into a particular subject matter. As described previously, the generative service may include or access a persistence module, which may store recent or selected previously used elements of the system including previous user input, previous generative responses, previous content retrieved in response to content requests, and other elements generated in a previous or recent interaction with the system. The persistence module may allow the user to input a shorthand or briefly reference previous inputs or generative responses without having to provide a full redundant recitation to form a complete question or inquiry. For example, the user may type into the input field 522 simply, "what is my remaining vacation?" In response, the generative service may reference the persistence module and may draw from the previous user input to identify information that can be used to complete the inquiry, like what account is being referenced and for what program.

FIG. 5A illustrates an example in which the generative content service successfully predicted the intent of the user's query. In particular, FIG. 5A illustrates an example where an intent confidence analysis was performed on the natural language input "what is the vacation policy?," and the intent confidence score associated with a request for information satisfied the intent confidence condition. Accordingly, the generative content service preferentially (and optionally exclusively) searched a knowledge base data store to identify a relevant document. Upon analyzing the results and predicting that they would be responsive to the user's request, a generative answer was produced based on information in the document. As described herein, portions of other documents that may have been relevant to the user's query (e.g., identified in a search of the knowledge base data store) may also be used to produce the generative answer.

Figure 5B:
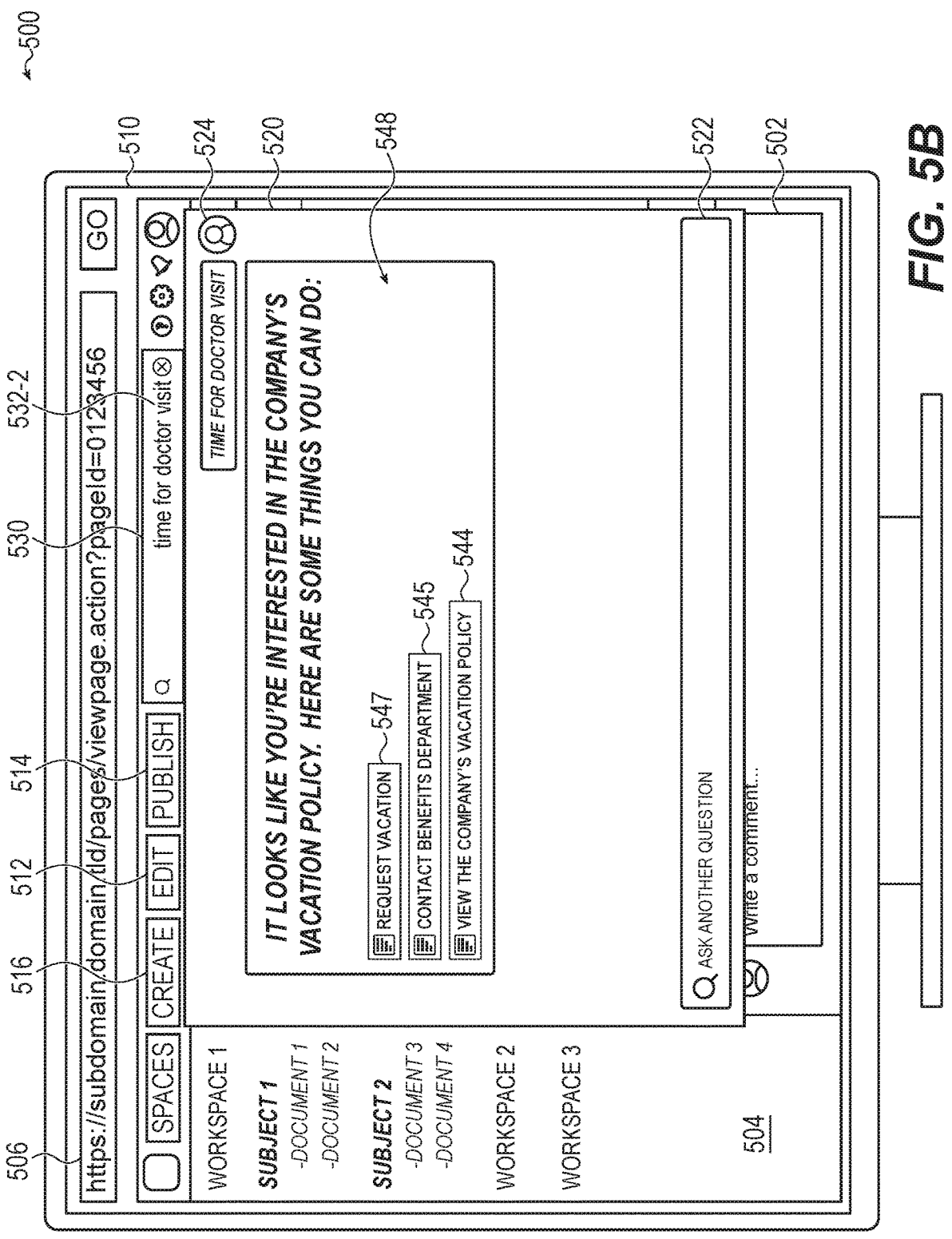

FIG. 5B illustrates another example of the generative interface 520 providing a generative response to a user query. In this example, the generative content service may not have been able to identify the user's intent with sufficient certainty to limit its search to a single knowledge base. In particular, the user query 532-2 "time for doctor visit" may not have been suitably specific to produce a sufficiently high intent confidence score for any one request classifier (e.g., request for action, request for information, request for contact). In this example, the generative content service may therefore search multiple content stores and provide a response 548 that includes information from and/or references to multiple content items (e.g., the content items that were determined to have a sufficient response confidence score). The response may include selectable objects (e.g., links) that correspond to certain content items or actions based on content items. For example, the response 548 may include a link 544 to a document (e.g., a document from a knowledge base data store) that provides information relevant to the query 532-2. The response 548 may also include a request element 547 that will initiate a request for vacation, such as by creating an issue record that is based on or uses a predefined form (which was identified by searching an issue tracking platform). The request element 547 may alternatively act as a link to the form, which may be at least partially pre-populated by the generative content service based on information known about the user who issued the query (e.g., as a result of the user being logged in to the collaboration platform). The response 548 may also include a contact element 545 that will initiate a message (e.g., email, chat message, text message, telephone call, etc.) to a particular user, team, or other group of contacts. The contacts associated with user contacts that were identified by searching a user contact data store. In some cases, a user selection of the contact element 545 may cause contact information of one or more individuals to be displayed to the requesting user (optionally with selectable elements that will initiate contact with those users in a selected manner). When presented with the response in FIG. 5B, the user may select one or more of the selectable elements, and/or provide an additional or follow-up query in the input field 522.

Figure 5C:
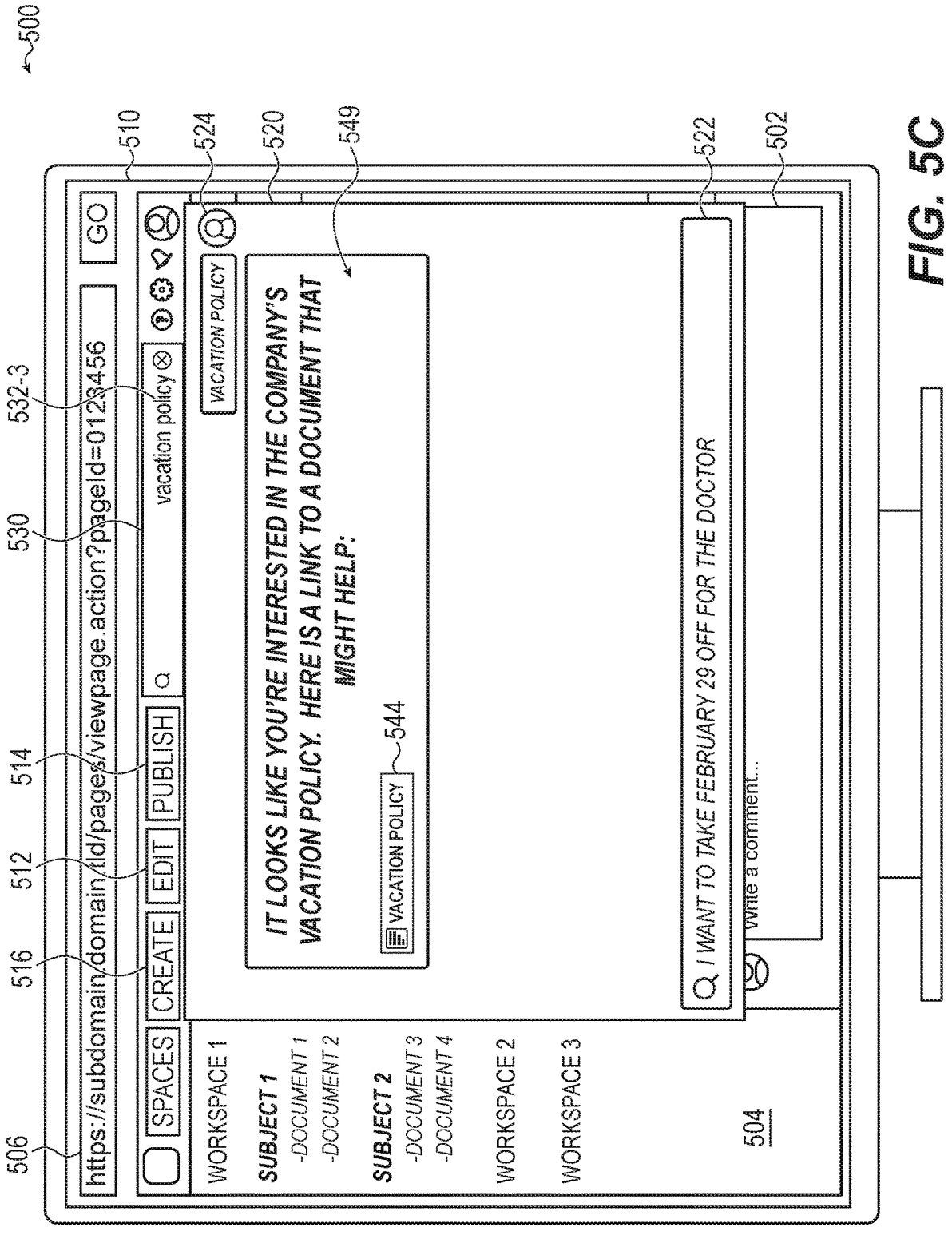
Figure 5D:
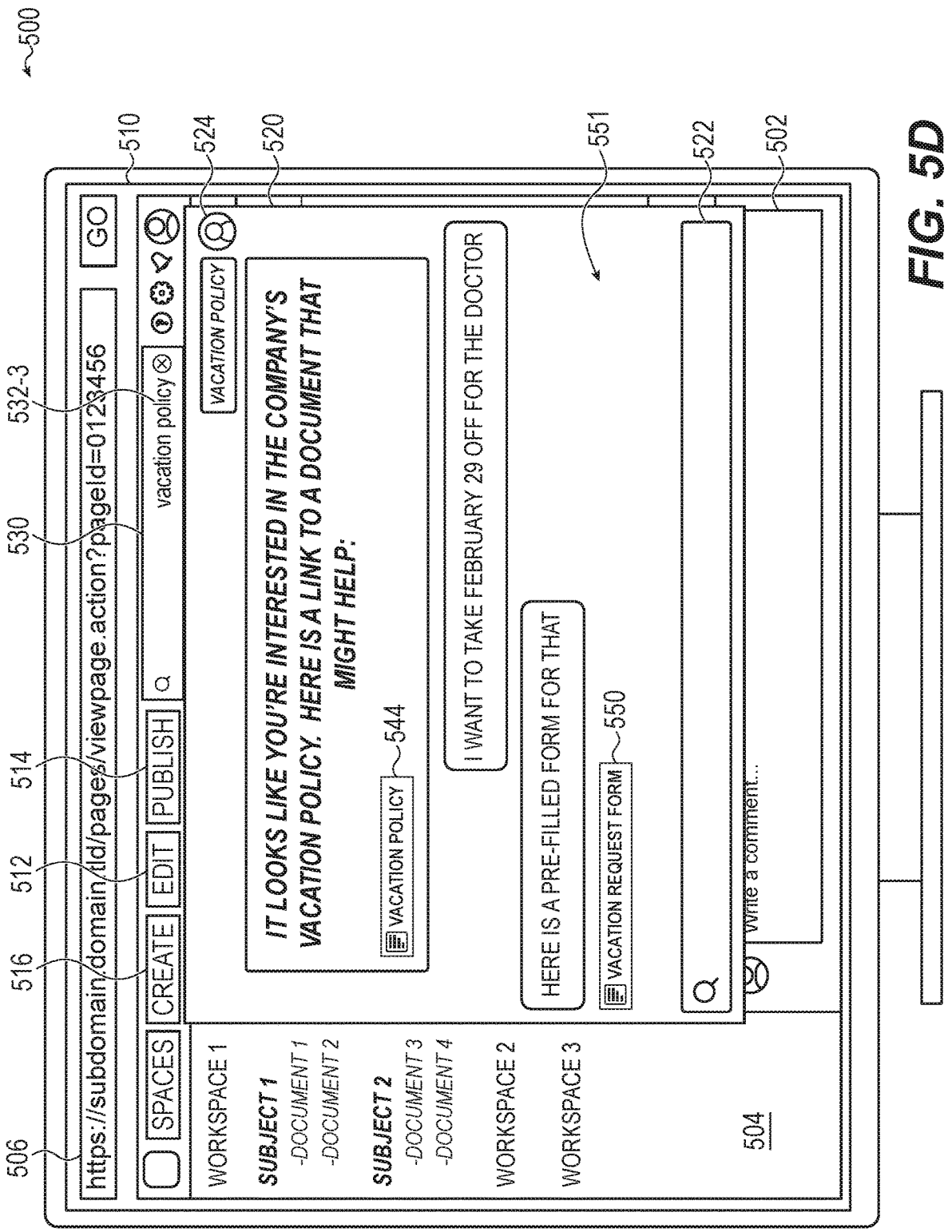

FIGS. 5C-5D illustrate another example of the generative interface 520 providing a generative response to a user query 532-3, and illustrating an exchange where the user intent may change during an interaction with the generative content service. In this example, the user provided a natural language input 532-3 of "vacation policy," which the generative content service predicted was indicative of an intent to request information. The generative content service identified an appropriate document, and provided a response 549 with a link 544 to that document. In some cases, the response 549 may also include a summary of and/or snippets from the document.

Upon receiving the response 549, and optionally viewing the document via the link 544, the user may issue another natural language input (e.g., "I want to take February 29 off for the doctor") to the generative content interface, via the input field 522. As described herein, this natural language input may act as another input to a query processing process, such as described with respect to FIGS. 2B-2E. In particular, in response to the new query, the generative content service may process the query in the same or similar manner as the initial query (optionally informed at least in part based on the history of the instant interaction with the user), including performing an intent analysis on the natural language input to determine an intent confidence score with respect to each of a set of request classifiers. In this case, the generative content service may predict that the user's query indicates an intent to request an action. As a result, the generative content service may search an issue tracking platform in order to find a form that may help satisfy the user's request for an action. As shown in FIG. 5D, the generative content service may identify a "vacation request form" (e.g., using a search operation as described with respect to FIG. 2E), and provide a link 550 to the vacation request form in the response.

As described herein, the generative content service may prepopulate an identified form with information about the user and/or the user's request. In the example of FIG. 5D, the generative content service may use information that is known about the requesting user (e.g., the user's identity and/or a user identifier) and optionally information that is obtained via the user's interactions with the generative content interface. Thus, the prepopulated vacation request form provided by the generative content service may be prepopulated with information such as an identifier of the user (which is known, for example, from login records of the requesting user), the number of remaining vacation days that the user is entitled to (which may be obtained by retrieving vacation records for the user), the requested day off (February 29, which was extracted from the user's input), whether the request is for paid or unpaid leave (which may be inferred, for example, from the reason provided in the user's input), and a reason for the request.

The response 551 may include a link 550 that the user can select to view the prepopulated form (or a prepopulated issue record that is based on or includes the form). The user may then review the prepopulated form, make any necessary changes to the prepopulated input fields (e.g., correcting or changing the data, such as the requested day off, the reason, etc.), and submit the form (or the issue record). FIG. 8C illustrates an example form (in that case, for initiating an issue with an account problem) that may be displayed to a user in response to the user selecting a form link provided by a generative content service. Some or all of the fields of the form 706a may be prepopulated by the generative content service, as described herein, based on information about the user that is accessible by the system and/or user input to the generative content interface.

In some cases, submitting the form or the issue record will initiate a workflow or procedure that will ultimately accomplish an action requested by a user. For example, submitting the form or issue record may cause an issue to be created, which may then become an action item for an individual, team, department, or the like. Advancing the issue through the associated workflow may ultimately lead to the issue being completed or resolved, and thus the action that was requested by the user being completed. For example, the workflow may include the issue being assigned to an individual, the individual performing one or more actions (e.g., reviewing the request and approving the vacation time), and the individual or the issue tracking platform changing a status of the issue to "complete" or "resolved" or another suitable status indicating that the issue has been addressed or completed.

While the foregoing example relies on a vacation request form for illustrative purposes, this is merely one example form that may be provided and prepopulated by the generative content service. In some cases, forms may be generated for or by organizations in order to satisfy the particular needs of that organization. Thus, the particular actions that forms are designed to handle, the data structures and/or input fields of a form, and other form content may vary based on the unique needs of any given organization, user group, or purpose for which a collaboration platform is being used.

Figure 5E:
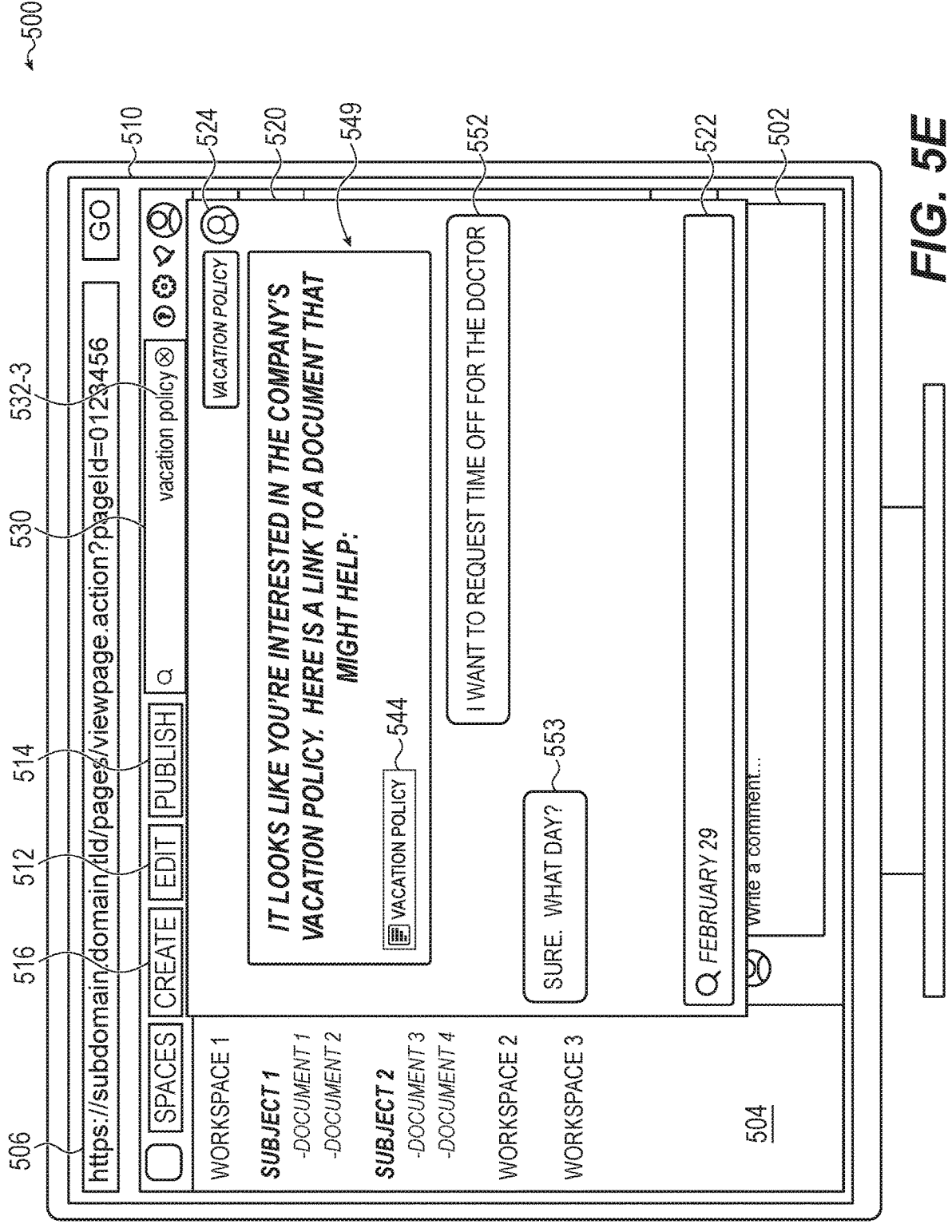
Figure 5F:
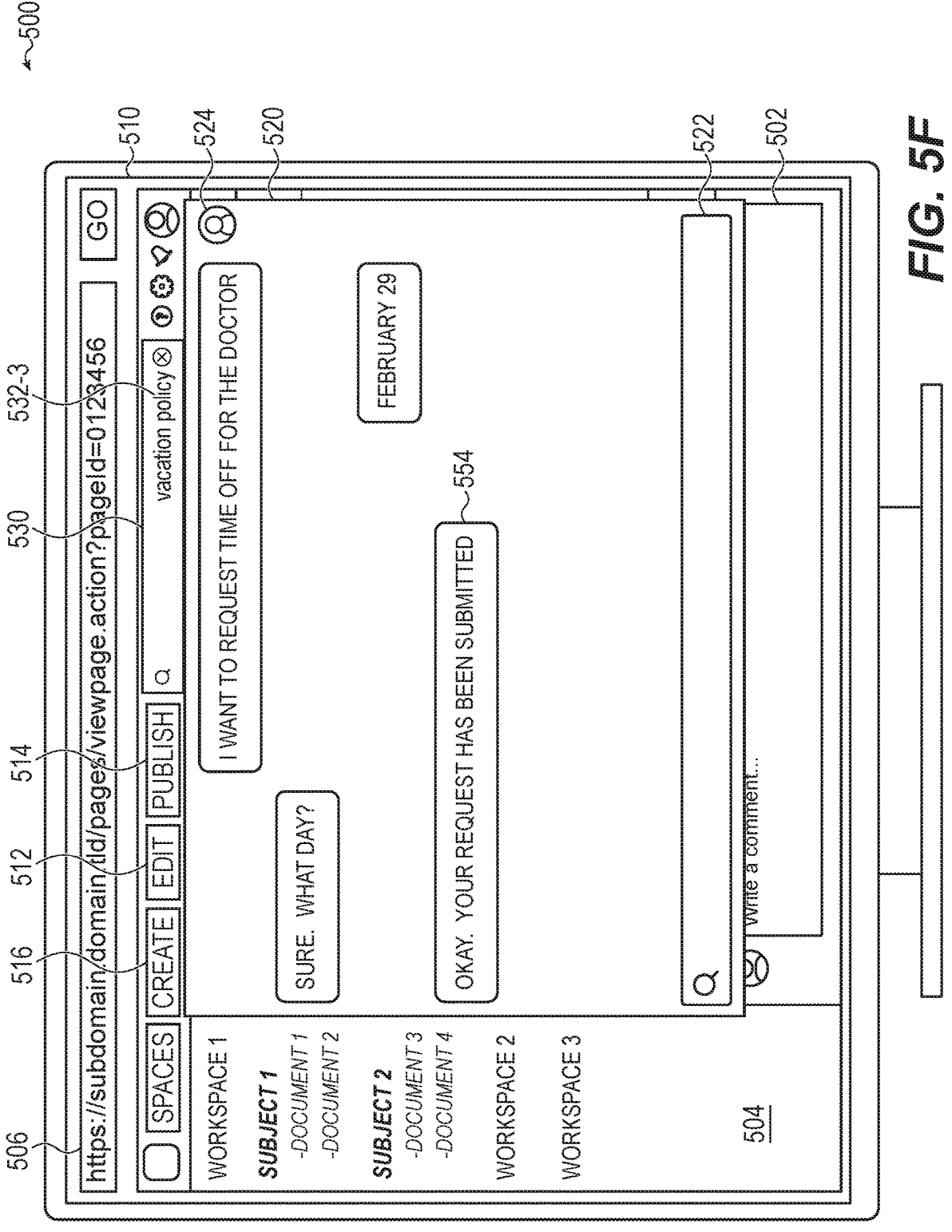

FIGS. 5E-5F illustrate another example of the generative interface 520 providing a generative response to a user query 532-3, and illustrating an exchange where the generative content service elicits information from the user to further populate a form. In this example, like FIG. 5C, the user provided a natural language input 532-3 of "vacation policy," which the generative content service predicted was indicative of an intent to request information. The generative content service identified an appropriate document (e.g., a vacation policy document), and provided a response 549 with a link 544 to that document. In some cases, the response 549 may also include a summary of and/or snippets from the document.

Upon receiving the response 549, and optionally viewing the document via the link 544, the user may issue another natural language input 552 (e.g., "I want to request time off for the doctor") to the generative content interface. As described herein, this natural language input may act as another input to a query processing process, such as described with respect to FIGS. 2B-2E. In particular, in response to the new query, the generative content service may process the query in the same or similar manner as the initial query (optionally informed at least in part based on the history of the instant interaction with the user), including performing an intent analysis on the natural language input to determine an intent confidence score with respect to each of a set of request classifiers. In this case, the generative content service may predict that the user's query indicates an intent to request an action. As a result, the generative content service may search an issue tracking platform in order to find a form that may help satisfy the user's request for an action.

In this case, instead of (or in addition to) simply presenting a link to the form or issue record (which may be prepopulated, as described above), the generative content service may elicit further information that can be used to complete the form or issue record. For example, as shown in FIG. 5E, the generative content service may issue a prompt 553 requesting information that is necessary to complete the form (e.g., the day that is being requested for vacation). Notably, this response may be determined by identifying an input field in the relevant form that could not be prepopulated based on the user's previous inputs or retrieved from records related to the user. Thus, in response to determining that an input field of the form lacked appropriate date, the generative content service asked the user for the needed information. As shown in FIG. 5E, the user may provide the requested information (e.g., the date) in the input field 522.

The generative content service may receive the date, and optionally request any additional information that may be necessary to complete the form. Once the form (and/or the issue record based on or including the form) is completed, the generative content service may submit the form or issue record or otherwise take an appropriate action to begin the workflow associated with the form or issue record. FIG. 5F illustrates the generative content service providing an indication 554 to the user that the request has been submitted.

FIG. 6A depicts another example graphical user interface 600 having a generative content interface 620 displaying a generative response 642 in a response region 640, similar to the previous example. A description of other elements of the graphical user interface 600 that are shared with the previous example are not repeated to reduce redundancy and improve clarity.

While FIGS. 5A-5F illustrate examples where an initial query either had a low confidence score (e.g., no single request classifier had a sufficient intent confidence score), or the initial query was associated with a request for information (e.g., corresponding to a search of a knowledge base content store). FIG. 6A illustrates an example response that may be produced when an intent confidence score for a request for an action (e.g., corresponding to a search of an issue platform content store) is high. For example, in FIG. 6A, the generative content service determined a high intent confidence that the query 632 "raise a request for a new laptop" signified an intent to perform an action, via a form, to raise a request for a laptop. Further, the generative content service identified a form (e.g., using the technique described with respect to FIG. 2E) that is associated with such a request. Thus, the response 642 includes a selectable element 646 that links to the form (or an issue record), which may be prepopulated with information as described above. In another example, the generative content service may complete the form or issue record (optionally including eliciting additional information from the user), as described above.

FIG. 6B illustrates another example response that may be produced by the generative content service in cases where the generative content service searches for content items in multiple content stores regardless of the intent confidence score of the user input, and then analyzes all of the results (in conjunction with the intent confidence score for each content store) to predict their responsiveness to the user query. Such operations are described, for example, with respect to FIGS. 2B-2D.

Returning to FIG. 6B, in response to the user query 632-2 "how do I authorize a new laptop," the generative content service may analyze the query to determine intent confidence scores for the request classifiers, and may search the candidate data stores (e.g., knowledge base data store, issue tracking platform data store, and user contact data store) for candidate results. The generative content service then analyzes the results (using the intent confidence scores for each of the request types/content stores) to rank and/or filter the results. As shown in FIG. 6B, the response 643 may include a generative response portion 649 that is based on information in the content items returned by the content store searches. As described herein, the generative response portion 649 may be based on or include information from multiple content items, including documents, forms, issue records, user contact information, and the like. The response 643 may also include selectable elements that link to or otherwise provide access to content items that were identified by the content store searches. For example, the selectable elements may include a link to a laptop policy document 647, a button to raise a request (e.g., complete/submit a form and/or an issue record), a link to a hardware help document 644, and a button to contact an IT team 645. The user may select any one or multiple of these selectable elements to view the associated content, initiate a request (e.g., form or issue ticket), contact an individual or team, or the like.

FIG. 7 shows an example workflow 700 for an example issue creation flow using an intake portal or other similar issue reporting software. Through the following example, the selection and use of forms is shown as it relates to issues managed by an issue tracking platform. With regard to the other examples described herein, stored issues may be associated with form identifier (which may correspond to or be a request type identifier), which can be used by the systems described herein to generate a form link as part of a generative content service or generative content interface.

With regard to FIG. 7, a user may use the system 700 to generate tickets or issues to assist with a problem or other task that needs to be addressed. Following authentication, a user (e.g., a service agent or a customer) may access the help desk portal 702. An example graphical user interface is presented in FIGS. 8A-8C. As shown in FIG. 8A, a home page of the help desk portal 702 may include sub-portals, which are defined by a series of interfaces defined in accordance with a project or intake category. Selecting an intake category may cause the portal to route a user to different features of the help desk. For example, the help desk portal 702 may include an ITSM portal 802 where a user may seek IT-related assistance. Similarly, the help desk may include portals 804 for different departments of an enterprise, including human resources, finances, and so on. The help desk portal 702 may also include a search bar 806 to facilitate finding of information, such as documents relating to a knowledge base.

Upon selecting a sub-portal, such as the ITSM portal 802, an interface for raising an issue (e.g., raising a request) is presented, as shown in FIG. 8B. The interface may include multiple input items that corresponds to fields, such as a request type field 812, a requestor field 814, a summary field 816, and a description field 818. Upon selecting the request type field 812, the user may be presented with a menu of intake categories. This menu of intake categories may correspond with the menu 704 of FIG. 7. As shown in FIGS. 7 and 8B, the menu of intake categories allows users to select a request that best fits their needs. For example, "FIX AN ACCOUNT PROBLEM," "GET A GUEST WIFI ACCOUNT," "GET IT HELP," "NEW MOBILE DEVICE," and "ONBOARD NEW EMPLOYEES" may each correspond to different requests. Each of these requests may correspond to intake interfaces 704a-d in FIG. 7.

Upon selection of an intake interface (e.g., 704a, 704b, 704c, or 704d), a backend application may retrieve a form 706a, 706b, 706c, 706d that corresponds to the intake interface. Each of these forms may be created by an administrator via a request creator form interface 708 and may be identified or retrieved using a form identifier. In some embodiments, each form is unique to the intake interface and includes input items that correspond to field elements from the request item builder and which is tailored to the user's issue category. An example form (e.g., 706a) is presented in FIG. 8C.

As shown in FIG. 8C, the form is tailored to relevant information relating to a "FIX AN ACCOUNT PROBLEM" issue. For example, the form may include a user field 820, a summary field 822, a description field 824, a department number field 826, an actual start 828, and an affected hardware field 830. As shown in the figure, certain fields may be required, such as the summary field 822, the user field 820, and the department number field 826. As explained above, each of these fields may be tailored to the particular problem or request.

Once a user (e.g., a customer user, a service agent) fills out and submits the form (e.g., via "SEND" button 832), the service management system may transmit the data to an issue tracking system, which generates an issue record (which may also be referred to as an issue ticket or issue item) based on the data from the form. As described herein, the form may be completely or partially filled and the issue record may be generated by a generative content service. Also described herein, the fields of a form may be populated by a user in response to being provided with the form (and/or the fields of the form) in the context of a generative content service.

As shown in FIG. 7, a service agent may have access to an issue tracking portal 710, which may be a graphical user interface of the issue tracking platform. At the issue tracking portal, a user may view the data input into the form from the help desk, view the status of the ticket, view/edit other information, and the like. An example issue tracking portal interface is presented in FIG. 9.

As shown in FIG. 9, the issue tracking portal 710 may display an issue item and relevant tracking information. For example, the data input in the form 706a may be displayed in a first display area 902. In some cases, users (e.g., agents, administrators) may edit these fields as more information is received. In some cases, the intake interfaces may include hidden fields. These hidden fields may be displayed to users in the first display area 902.

As discussed previously, the issue tracking platform may store or track the issue-creation form that was used to create respective issues or tickets. The issue-creation form that was used to create the issue may be stored as a form identifier or form ID and associated with the issue or ticket in the issue tracking platform. The issue tracking platform or the issue tracking portal 710 may also gather other data (e.g., from user event logs or databases coupled to the issue tracking system), including similar requests 904 and activity 906. In many cases, enterprises use a service-level agreement (SLA), which specifies the process, timelines, and metrics by which services, such as IT, are provided. The issue tracking system may include issue item metric regions, such as regions 908 and 910, which may track metrics according to the SLA. For example, upon generating an issue item, the issue tracking system may automatically set a time for reply and completion that may correspond to the SLA. Similarly, region 910 may include editable field items that may be used to resolve the issue. For example, an issue item may be assigned to particular service agents, the urgency of the request may be set, and the like. The issue tracking portal 710 may also include other fields 912 which may be used by service agents to track metrics, add labels, track time, and the like.

The issue tracking platform may process each of the issues or tickets in accordance with a workflow or series of predefined states that the issue must traverse in order to be resolved by the issue tracking platform. In some embodiments, at the intake interface builder interface, a workflow can be defined contemporaneously with the intake interface and with the issue item view in an issue tracking platform. When an issue is created 712, a workflow for resolving the issue is generated (e.g., via a backend application of the service management portal, such as the issue tracking system). As a first step, the issue may be assigned to a service agent or other users. In some embodiments, the request type and/or other fields from the intake interface may determine the assigning step. For example, a group of users may be assigned to particular intake categories. As another example, a group of users may be assigned to a project where the particular request type can be used. As yet another example, a particular data input to a field (e.g., "AFFECTED HARD-WARE") may determine a user or a group of users to be assigned to the issue.

Once an issue item is assigned, the user or group of users assigned to the item may review the issue. On review of the issue, the assigned users may resolve the issue or may transfer the issue, as an example. Upon transferring, updated assignees may review the issue again to ensure proper routing of the issue item. In some cases, the issue may be canceled or it may be linked to another issue for a combined resolution. In some cases, depending on the complexity and/or the type of request, the workflow may include additional steps or less steps. More generally, the request type may dictate the number of steps and workflow used for each of the issue items. Accordingly, building an intake interface may determine the fields displayed in the help desk, the fields visible in the issue tracking system, and the workflow associated with the issue item.

FIG. 10 shows a sample electrical block diagram of an electronic device 1000 that may perform the operations described herein. The electronic device 1000 may in some cases take the form of any of the electronic devices described with reference to FIGS. 1-9, including client devices, and/or servers or other computing devices associated with the collaboration system 100. The electronic device 1000 can include one or more of a processing unit 1002, a memory 1004 or storage device, input devices 1006, a display 1008, output devices 1010, and a power source 1012. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism 1014 can provide communication between the processing unit 1002, the power source 1012, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., an input device 1006) may be controlled by a first processing unit and other components of the electronic device 1000 (e.g., the display 1008) may be controlled by a second processing unit, where the first and second processing units may or may not be in communication with each other.

The power source 1012 can be implemented with any device capable of providing energy to the electronic device 1000. For example, the power source 1012 may be one or more batteries or rechargeable batteries. Additionally, or alternatively, the power source 1012 can be a power connector or power cord that connects the electronic device 1000 to another power source, such as a wall outlet.

The memory 1004 can store electronic data that can be used by the electronic device 1000. For example, the memory 1004 can store electronic data or content such as, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, flash memory, removable memory, other types of storage elements, or combinations of such devices.

In various embodiments, the display 1008 provides a graphical output, for example associated with an operating system, user interface, and/or applications of the electronic device 1000 (e.g., a chat user interface, an issue-tracking user interface, an issue-discovery user interface, etc.). In one embodiment, the display 1008 includes one or more sensors and is configured as a touch-sensitive (e.g., single-touch, multi-touch) and/or force-sensitive display to receive inputs from a user. For example, the display 1008 may be integrated with a touch sensor (e.g., a capacitive touch sensor) and/or a force sensor to provide a touch- and/or force-sensitive display. The display 1008 is operably coupled to the processing unit 1002 of the electronic device 1000.

The display 1008 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1008 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002.

As discussed above, in some cases, the input device(s) 1006 include a touch sensor (e.g., a capacitive touch sensor) integrated with the display 1008 to provide a touch-sensitive display. Similarly, in some cases, the input device(s) 1006 include a force sensor (e.g., a capacitive force sensor) integrated with the display 1008 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1002 may be operably coupled to the input devices 1006 and the output devices 1010. The processing unit 1002 may be adapted to exchange signals with the input devices 1006 and the output devices 1010. For example, the processing unit 1002 may receive an input signal from an input device 1006 that corresponds to an input detected by the input device 1006. The processing unit 1002 may interpret the received input signal to determine whether to provide and/or change one or more outputs in response to the input signal. The processing unit 1002 may then send an output signal to one or more of the output devices 1010, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for providing a generative response to a user, the method comprising:

causing display of a graphical user interface of a frontend application of a content collaboration platform on a client device, the graphical user interface including a generative content interface;

in response to a natural language user input provided to a generative content interface:

performing a query analysis on the natural language user input to obtain a search feature set;

performing an intent analysis on the natural language user input to determine an intent confidence score with respect to each of a set of request classifiers, the set of request classifiers comprising a first request classifier associated with a request for an action, a second request classifier associated with a request for information, and a third request classifier associated with a request for a contact;

in accordance with a determination that a first intent confidence score associated with the first request classifier satisfies an intent confidence condition:

performing a first search of an issue tracking platform content store using the search feature set, including performing a search of a set of predefined forms and performing a search of a set of issue records, wherein respective issue records in the set of issue records are associated with respective predefined forms of the set of predefined forms; and causing a first response to be presented, in the generative content interface, the first response including content associated with a result from the first search; and in accordance with a determination that no respective intent confidence score satisfies the intent confidence condition:

performing a second search of the issue tracking platform content store using the search feature set;

performing a third search of a knowledge base content store using the search feature set;

performing a fourth search of a user contact content store using the search feature set; and causing a second response to be presented, in the generative content interface, the second response including content associated with at least one result from the second search, the third search, or the fourth search.

2. The method of claim 1, wherein:

performing the search of the set of predefined forms includes searching the set of predefined forms, using the search feature set, to identify a first set of candidate predefined forms;

performing the search of the set of issue records includes:

searching the set of issue records, using the search feature set, to identify a set of candidate issue records; and identifying, in an issue record of the set of candidate issue records, an identifier of a second set of candidate predefined forms; and the method further includes receiving, from a response confidence analysis model, a ranking of at least a subset of the first set of candidate predefined forms and at least a subset of the second set of candidate predefined forms; and the content associated with the result from the first search includes content associated with a highest ranking candidate predefined form.

3. The method of claim 1, wherein:

the natural language user input is provided by a user;

the result from the first search includes an identifier of a predefined form of the set of predefined forms;

the predefined form defines a user-fillable data structure having a set of input fields; and the method further comprises:

retrieving user data associated with the user; and populating an input field of the set of input fields of the predefined form with the user data.

4. The method of claim 3, wherein:

the user data is first user data;

the input field is a first input field; and the first response further includes a prompt requesting second user data from the user, the second user data corresponding to a second input field of the set of input fields of the predefined form; and the method further includes:

receiving, in the generative content interface, second user data from the user; and populating the second input field of the set of input fields of the predefined form with the second user data.

5. The method of claim 4, further comprising, in response to a determination that the predefined form has been populated, automatically creating an issue record, in the issue tracking platform content store, that includes the predefined form.

6. The method of claim 1, further comprising:

providing, as input to a response confidence analysis model that is configured to predict a responsiveness of results from the first search, the second search, and the third search to the natural language user input:

results from the second search;

results from the third search; and results from the fourth search;

receiving, from the response confidence analysis model, a ranking of at least a subset of the results from the second search, the third search, and the fourth search; and causing a response to be presented, in the generative content interface, the response including content associated with a highest ranking search result.

7. The method of claim 1, wherein:

the result from the first search includes an identifier of a predefined form of the set of predefined forms; and the first response includes:

a summary of the predefined form; and a link to the predefined form.

8. A computer-implemented method for providing a generative response using content selected from a set of candidate content stores, the method comprising:

causing display of a graphical user interface of a frontend application of a content collaboration platform on a client device, the graphical user interface including a generative content interface;

in response to a natural language user input provided to a generative content interface:

performing a query analysis on the natural language user input to obtain a search feature set;

performing an intent analysis on the natural language user input to determine an intent confidence score with respect to each of a set of request classifiers, the set of request classifiers comprising a first request classifier associated with a request for an action, a second request classifier associated with a request for information, and a third request classifier associated with a request for a contact;

in accordance with a determination that a first intent confidence score associated with the first request classifier satisfies an intent confidence condition, performing a first search of an issue tracking platform content store using the search feature set, performing the first search including performing a search of a set of predefined forms and performing a search of a set of issue records, wherein respective issue records in the set of issue records are associated with respective predefined forms of the set of predefined forms;

in accordance with a determination that a result of the first search satisfies a result confidence condition, causing a first response to be presented in the generative content interface, the first response including content from the issue tracking platform content store;

in accordance with a determination that the result of the first search fails to satisfy the result confidence condition:

performing a second search of a knowledge base content store using the search feature set;

performing a third search of a user contact content store using the search feature set; and causing a second response to be presented in the generative content interface, the second response including content from at least one of the knowledge base content store or the user contact content store.

9. The method of claim 8, wherein:

the natural language user input is provided by a user;

the result from the first search includes an identifier of a predefined form of the set of predefined forms;

the predefined form defines a user-fillable data structure having a set of input fields; and the method further comprises:

retrieving user data associated with the user; and populating an input field of the set of input fields of the predefined form with the user data.

10. The method of claim 9, wherein:

the user data is first user data;

the input field is a first input field;

the first response further includes a prompt requesting second user data from the user, the second user data corresponding to a second input field of the set of input fields of the predefined form; and the method further includes:

receiving, in the generative content interface, second user data from the user; and populating the second input field of the set of input fields of the predefined form with the second user data.

11. The method of claim 8, wherein:

the search feature set is a keyword feature set including a set of keywords extracted from the natural language user input;

the query analysis is a first query analysis;

the method further includes performing a second query analysis on the natural language user input to obtain a semantic feature set; and performing the first search further includes searching the issue tracking platform content store using the semantic feature set.

12. The method of claim 8, wherein:

the result from the first search includes an identifier of a predefined form of the set of predefined forms; and the first response includes:

a summary of the predefined form; and a link to the predefined form.

13. A computer-implemented method for providing a generative response using content selected from a set of candidate content stores, the method comprising:

causing display of a graphical user interface of a frontend application of a content collaboration platform on a client device;

in response to a natural language user input provided to a generative content interface:

performing a query analysis on the natural language user input to obtain a search feature set;

performing an intent analysis on the natural language user input to determine an intent confidence score with respect to each of a set of request classifiers, the set of request classifiers comprising a first request classifier associated with a request for an action, a second request classifier associated with a request for information, and a third request classifier associated with a request for a contact;

performing a first search of an issue tracking platform content store of the set of conadiate content stores, using the search feature set, to identify a candidate form;

performing a second search of a knowledge base content store of the set of candidate content stores, using the search feature set, to identify a candidate knowledge base document;

performing a third search of user contact content store of the set of candidate content stores, using the search feature set, to identify a candidate user contact;

providing, as input to a response confidence analysis model that is configured to predict a responsiveness of results from the first search, the second search, and the third search to the natural language user input:

results from the first search and a first intent confidence score associated with the first request classifier;

results from the second search and a second intent confidence score associated with the second request classifier; and results from the third search and a third intent confidence score associated with the third request classifier;

receiving, from the response confidence analysis model, a ranking of at least a subset of the results from the first search, the second search, and the third search, the ranking based at least in part the first, second, and third intent confidence scores; and causing a response to be presented, in the generative content interface, the response including content associated with a highest ranking search result.

14. The method of claim 13, wherein performing the first search of the issue tracking platform content store comprises:

performing a search of a set of predefined forms, using the search feature set, to identify a first set of candidate predefined forms;

performing a search of a set of issue records, using the search feature set, to identify a set of candidate issue records; and identifying, in an issue record of the set of candidate issue records, an identifier of a second set of candidate predefined forms.

15. The method of claim 14, further comprising:

receiving, from a response confidence analysis model, a ranking of at least a subset of the first set of candidate predefined forms and at least a subset of the second set of candidate predefined forms; and the content associated with the highest ranking search result includes content associated with a highest ranking candidate predefined form.

16. The method of claim 13, wherein:

the natural language user input is provided by a user;

the results from the first search include an identifier of a predefined form of the set of predefined forms;

the predefined form defines a user-fillable data structure having a set of input fields; and the method further comprises:

retrieving user data associated with the user; and populating an input field of the set of input fields of the predefined form with the user data.

17. A computer-implemented method for providing, in response to a user query, a generative response including an identifier of a predefined form, the predefined form having a user-fillable data structure, the method comprising:

causing display of a graphical user interface of a frontend application of a content collaboration platform on a client device;

in response to a natural language user input provided to a generative content interface:

analyzing the natural language user input to obtain a search feature set;

using the search feature set, searching a first content store of an issue tracking platform to identify a set of predefined forms responsive to the natural language user input, each predefined form of the set of predefined forms including a respective user-fillable data structure;

in response to a determination that a highest search confidence score associated with the set of predefined forms satisfies a confidence criteria, causing a first response to be provided in the generative content interface, the first response including an identifier of a first predefined form of the set of predefined forms associated with the highest search confidence score; and in response to a determination that a highest search confidence score associated with the set of predefined forms fails to satisfy the confidence criteria:

using the search feature set, searching a second content store of the issue tracking platform to identify an issue record related to the search feature set;

identifying, in the issue record, an identifier of a second predefined form that was used in a completion of an issue associated with the issue record and that is responsive to the natural language user input; and causing a second response to be provided in the generative content interface, the second response including an identifier of the second predefined form.

18. The method of claim 17, wherein:

the issue record includes a user-generated description of the issue associated with the issue record; and searching the second content store to identify the issue record related to the search feature set comprises searching, with the search feature set, the user-generated description of the issue associated with the issue record.

19. The method of claim 18, wherein searching the second content store to identify the issue record related to the search feature set comprises performing a search of issue records associated with a completed issue status.

20. The method of claim 17, wherein:

the natural language user input is provided by a user; and the method further comprises:

retrieving user data associated with the user;

populating a first input field of the first predefined form with the user data;

prompting the user for second user data;

receiving, in the generative content interface, the second user data;

populating a second input field of the first predefined form with the second user data; and in response to a determination that the first predefined form has been populated, automatically creating a new issue record, in the issue tracking platform, that includes the first predefined form.

\* \* \* \* \*